United States Patent
Hua et al.

(10) Patent No.: US 10,985,857 B2
(45) Date of Patent: Apr. 20, 2021

(54) METHOD AND APPARATUS FOR DEVICE-TO-DEVICE INTER-CELL INTERFERENCE COORDINATION

(71) Applicant: Huawei Technologies Co., Ltd., Guangdong (CN)

(72) Inventors: Yao Hua, Shenzhen (CN); Zhenshan Zhao, Shenzhen (CN); Guanglin Han, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/971,468

(22) Filed: May 4, 2018

(65) Prior Publication Data

US 2018/0254842 A1    Sep. 6, 2018

Related U.S. Application Data

(63) Continuation of application No. PCT/CN2015/094054, filed on Nov. 6, 2015.

(51) Int. Cl.
*H04J 11/00* (2006.01)
*H04W 88/02* (2009.01)
(Continued)

(52) U.S. Cl.
CPC .......... *H04J 11/005* (2013.01); *H04W 24/10* (2013.01); *H04W 52/243* (2013.01);
(Continued)

(58) Field of Classification Search
CPC ... H04J 11/005; H04W 24/10; H04W 52/243; H04W 72/082; H04W 52/383; H04W 88/02; H04W 52/0238
See application file for complete search history.

(56) References Cited

U.S. PATENT DOCUMENTS

2009/0325625 A1    12/2009   Hugl et al.
2014/0094162 A1     4/2014   Heo et al.
(Continued)

FOREIGN PATENT DOCUMENTS

CA       2932387 A1     5/2013
CN     102792745 A     11/2012
(Continued)

*Primary Examiner* — Hassan Kizou
*Assistant Examiner* — Abdullahi Ahmed
(74) *Attorney, Agent, or Firm* — Kilpatrick Townsend & Stockton LLP

(57) ABSTRACT

Embodiments of the present disclosure relate to the communications field, and disclose a method and an apparatus for device-to-device inter-cell interference coordination. The method in the present disclosure includes: receiving, by a first terminal when the first terminal becomes a detection terminal, configuration information sent by a first base station, where the configuration information includes a resource usage detection parameter, and the resource usage detection parameter is used to configure a resource usage detection manner for the first terminal; detecting, by the first terminal based on the resource usage detection parameter, resource usage information corresponding to a resource location; reporting, by the first terminal, the resource usage information to the first base station, so that the first base station adjusts, based on the resource usage information, a D2D data transmission mode for the first terminal or a second terminal using the resource location.

12 Claims, 33 Drawing Sheets

---

101 — When a first terminal becomes a detection terminal, the first terminal receives configuration information sent by a first base station 102 — The first terminal detects, based on a resource usage detection parameter, resource usage information corresponding to a resource location 103 — The first terminal reports the resource usage information to the first base station

(51) Int. Cl.
  *H04W 24/10* (2009.01)
  *H04W 52/24* (2009.01)
  *H04W 52/38* (2009.01)
  *H04W 72/08* (2009.01)
  *H04W 52/02* (2009.01)
  *H04W 88/04* (2009.01)
  *H04W 92/18* (2009.01)

(52) U.S. Cl.
  CPC ....... *H04W 52/383* (2013.01); *H04W 72/082* (2013.01); *H04W 88/02* (2013.01); *H04J 2211/005* (2013.01); *H04W 52/0238* (2013.01); *H04W 88/04* (2013.01); *H04W 92/18* (2013.01)

(56) References Cited

U.S. PATENT DOCUMENTS

| | | | |
|---|---|---|---|
| 2014/0248901 A1 | 9/2014 | Johnsson et al. | |
| 2015/0222401 A1 | 8/2015 | Xu et al. | |
| 2015/0312915 A1* | 10/2015 | Li | H04W 52/281 455/452.1 |
| 2016/0100355 A1 | 4/2016 | Chen et al. | |
| 2016/0234873 A1* | 8/2016 | Ryu | H04W 76/14 |
| 2016/0261757 A1* | 9/2016 | Rajadurai | H04M 15/85 |
| 2016/0278115 A1* | 9/2016 | Shrader | H04W 72/1268 |
| 2016/0309355 A1* | 10/2016 | Seo | H04W 72/048 |
| 2017/0142741 A1* | 5/2017 | Kaur | H04W 56/002 |
| 2018/0115911 A1 | 4/2018 | Huang et al. | |
| 2019/0021111 A1* | 1/2019 | Tang | H04W 24/00 |

FOREIGN PATENT DOCUMENTS

| | | |
|---|---|---|
| CN | 102883451 A | 1/2013 |
| CN | 103686691 A | 3/2014 |
| CN | 103947135 A | 7/2014 |
| CN | 104144437 A | 11/2014 |
| CN | 104202821 A | 12/2014 |
| CN | 104272850 A | 1/2015 |
| CN | 104904289 A | 9/2015 |
| CN | 104936165 A | 9/2015 |
| CN | 104956703 A | 9/2015 |
| EP | 3166234 B1 | 5/2017 |
| WO | 2013028044 A2 | 2/2013 |
| WO | 2013155265 A1 | 10/2013 |
| WO | 2014195765 A1 | 12/2014 |
| WO | 2015014395 A1 | 2/2015 |
| WO | 2015088276 A1 | 6/2015 |
| WO | 2015143170 A1 | 9/2015 |

* cited by examiner

METHOD AND APPARATUS FOR DEVICE-TO-DEVICE INTER-CELL INTERFERENCE COORDINATION

CROSS-REFERENCE TO RELATED APPLICATIONS

This application is a continuation of International Application No. PCT/CN2015/094054, filed on Nov. 6, 2015, the disclosure of which is hereby incorporated by reference in its entirety.

TECHNICAL FIELD

The present application relates to the field of communications technologies, and in particular, to a method and an apparatus for device-to-device inter-cell interference coordination.

BACKGROUND

Device-to-device (D2D) is an end-to-end direct communications technology. That is, forwarding by a base station is no longer required in communication between terminals, and the base station only needs to perform resource configuration, scheduling, coordination, and the like to assist in direct communication between the terminals. To enable D2D communication between terminals in neighboring cells, base stations need to exchange resource pool information, and a base station needs to broadcast resource pool information of a current cell served by the base station and a neighboring cell of the current cell. A terminal transmits or monitors a signal in a corresponding resource pool based on the resource pool information broadcast by the base station, so that the terminal has an opportunity to monitor a resource pool of the neighboring cell, to implement inter-cell D2D transmission. However, resource pools of neighboring cells often overlap. In this case, all terminals in a same resource pool and in the neighboring cells are performing data transmission, and there is relatively strong interference on data received by the terminals in the same resource pool and in the neighboring cells, namely, inter-cell interference. In the prior art, an inter-cell interference coordination (ICIC) technology is used to reduce inter-cell interference. That is, in a Long Term Evolution (LTE) system, signaling at an interface between evolved NodeBs (The interface between eNodeBs, X2) is standardized. Base stations corresponding to neighboring cells may exchange, by using the X2 interface, relative narrowband transmission power (RNTP), overload indicator (OI), and high interference indicator (HII) information of current cells of the base stations. The RNTP, OI, and HII information indicate, in a form of a bitmap, whether transmit power on a resource block in a current cell exceeds a threshold. When a base station serving a neighboring cell schedules a resource to be used by a terminal in the cell, the base station learns, based on RNTP information, transmit power on the resource in a neighboring cell of the cell, determines a possible resource usage level of the neighboring cell, and schedules the resource with reference to the possible resource usage level of the neighboring cell, to avoid inter-cell interference.

The prior art has at least the following problem: When terminals perform D2D communication at a cell edge, a D2D link is far away from a base station, and the base station cannot accurately learn signal quality of the D2D link. Therefore, the base station cannot measure RNTP, OI, and HII information of the D2D link, and cannot instruct, in a timely and accurate manner, a base station in a neighboring cell to adjust a resource scheduling manner. As a result, inter-cell interference cannot be accurately reduced.

SUMMARY

Embodiments of the present disclosure provide a method and an apparatus for device-to-device inter-cell interference coordination, so as to resolve a problem that: when terminals perform D2D communication at a cell edge, a base station cannot accurately learn signal quality of a D2D link, and inter-cell interference cannot be accurately reduced.

To achieve the foregoing objective, the following technical solutions are used in the embodiments of the present disclosure.

According to a first aspect, an embodiment of the present disclosure provides a method for device-to-device inter-cell interference coordination, including:

receiving, by the first terminal when the first terminal becomes a detection terminal, configuration information sent by a first base station, where the configuration information includes a resource usage detection parameter, the detection terminal is configured to measure a resource usage level on a device-to-device D2D link corresponding to the detection terminal, and the resource usage detection parameter is used to configure a resource usage detection manner for the first terminal;

detecting, by the first terminal based on the resource usage detection parameter, resource usage information corresponding to a resource location, where the resource location is a resource location at which the first terminal currently performs D2D data transmission, or information about the resource location is carried in the configuration information; and reporting, by the first terminal, the resource usage information to the first base station, so that the first base station adjusts, based on the resource usage information, a D2D data transmission mode for the first terminal or a second terminal using the resource location.

With reference to the first aspect, in a first possible implementation of the first aspect, before the receiving, by the first terminal when the first terminal becomes a detection terminal, configuration information, a resource usage detection parameter, and resource usage information sent by a first base station, the method further includes:

determining, by the first terminal based on a parameter of the preset condition, whether the first terminal can become the detection terminal, where the parameter of the preset condition is sent by the first base station by using broadcast information, or the parameter of the preset condition is preset by the first terminal.

With reference to the first possible implementation of the first aspect, in a second possible implementation of the first aspect, the preset condition includes a first preset condition, the first preset condition includes a condition for determining that the first terminal is located at an edge of a cell in which the first terminal is currently located, and a parameter of the first preset condition includes a signal power threshold used by the first terminal to receive a signal of the first base station.

With reference to the second possible implementation of the first aspect, in a third possible implementation of the first aspect, the determining, by the first terminal based on a parameter of the preset condition, whether the first terminal can become the detection terminal includes:

determining, by the first terminal based on the signal power threshold, whether the first terminal is located at the edge of the cell in which the first terminal is currently located; and when the first terminal is located at the edge of the cell in which the first terminal is currently located, determining, by the first terminal, that the first terminal becomes the detection terminal.

With reference to any one of the first to the third possible implementations of the first aspect, in a fourth possible implementation of the first aspect, the preset condition includes a second preset condition, the second preset condition includes whether the first terminal receives a data packet that is sent by using a resource in a resource list, a parameter of the second preset condition includes that the resource list is a resource list in which there is an orthogonal relationship between a resource frequency of a resource of a second base station and a resource frequency of the first base station, the second base station is corresponding to a neighboring cell of a cell corresponding to the first base station, and the resource list is sent by the first base station in a broadcast mode; and determining, by the first terminal based on the second preset condition, whether the first terminal can become the detection terminal includes:

when the first terminal receives the data packet that is sent by using the resource in the resource list, determining, by the first terminal, that the first terminal becomes the detection terminal.

With reference to any one of the first to the fourth possible implementations of the first aspect, in a fifth possible implementation of the first aspect, the preset condition includes a third preset condition, a parameter of the third preset condition includes a preset threshold and a relationship between a random number and the preset threshold, and the random number is generated by the first terminal;

before the determining, by the first terminal based on a parameter of the preset condition, whether the first terminal can become the detection terminal, the method includes:

generating, by the first terminal, the random number by using a preset random sequence; and the determining, by the first terminal based on a parameter of the preset condition, whether the first terminal can become the detection terminal includes:

determining, by the first terminal, whether the random number and the preset threshold meet the relationship between the random number and the preset threshold; and if the random number and the preset threshold meet the relationship between the random number and the preset threshold, determining, by the first terminal, that the first terminal becomes the detection terminal.

With reference to any one of the first to the fifth possible implementations of the first aspect, in a sixth possible implementation of the first aspect, before the determining, by the first terminal based on the preset condition, whether the first terminal can become the detection terminal, the method further includes:

determining, by the first terminal, whether broadcast information that carries a first temporary identifier and that is sent by another terminal is received, where the first temporary identifier is added, after it is determined that the another terminal is the detection terminal, to the broadcast information sent by the another terminal; and if the first terminal does not receive the broadcast information that carries the first temporary identifier, performing, by the first terminal, the step of determining, by the first terminal based on a parameter of the preset condition, whether the first terminal can become the detection terminal.

With reference to any one of the first to the sixth possible implementations of the first aspect, in a seventh possible implementation of the first aspect, before the detecting, by the first terminal based on the resource usage detection parameter, resource usage information corresponding to a resource location, the method further includes:

sending, by the first terminal, request information to the first base station, so as to request the first base station to allow the first terminal to become the detection terminal; and receiving, by the first terminal, an instruction that is sent by the first base station for allowing the first terminal to be the detection terminal.

With reference to the first aspect, in an eighth possible implementation of the first aspect, the configuration information further includes a second temporary identifier configured by the first base station for the first terminal, and the method further includes:

adding, by the first terminal, the second temporary identifier to a data packet to be sent by the first terminal.

With reference to the first aspect, in a ninth possible implementation of the first aspect, the configuration information further includes a second temporary identifier configured by the first base station for the first terminal and a broadcast resource location at which the second temporary identifier is broadcast, and the method further includes:

periodically broadcasting, by the first terminal, the second temporary identifier at the broadcast resource location.

With reference to the first aspect, in a tenth possible implementation of the first aspect, the resource usage detection parameter further includes a manner of triggering reporting of the resource usage information, a resource usage detection threshold, and a resource usage statistics manner; the resource usage detection threshold includes at least one of an interference power threshold, an interference data packet percentage threshold, a receive power threshold, or a received data packet percentage threshold; and the manner of triggering reporting of the resource usage information includes periodic triggering and event triggering; and when the manner of triggering reporting of the resource usage information is the periodic triggering, the resource usage detection parameter further includes a reporting period.

With reference to the tenth possible implementation of the first aspect, in an eleventh possible implementation of the first aspect, when the manner of triggering reporting of the resource usage information is the periodic triggering, the detecting, by the first terminal based on the resource usage detection parameter, resource usage information corresponding to a resource location includes:

in each reporting period, determining, by the first terminal, whether receive power of a data packet that fails to be received is greater than the interference power threshold; or determining, by the first terminal, whether a percentage of data packets that fail to be received is greater than the interference data packet percentage threshold; or determining, by the first terminal, whether receive power of a received data packet is greater than the receive power threshold; or determining, by the first terminal, whether a percentage of received data packets is greater than the received data packet percentage threshold; and when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, determining that there is interference.

With reference to the eleventh possible implementation of the first aspect, in a twelfth possible implementation of the first aspect, when the manner of triggering reporting of the resource usage information is the event triggering, the detecting, by the first terminal based on the resource usage detection parameter, resource usage information corresponding to the resource location includes:

determining, by the first terminal, whether receive power of a data packet that fails to be received is greater than the interference power threshold; or determining, by the first terminal, whether a percentage of data packets that fail to be received is greater than the interference data packet percentage threshold; or determining, by the first terminal, whether receive power of a received data packet is greater than the receive power threshold; or determining, by the first terminal, whether a percentage of received data packets is greater than the received data packet percentage threshold; and when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold, determining that there is interference.

With reference to the first aspect, in a thirteenth possible implementation of the first aspect, the adjusting a D2D data transmission mode for a second resource includes: re-allocating a resource and/or adjusting D2D data transmit power for the second terminal; or notifying the second terminal of an interference degree or a usage degree of a currently used resource, and instructing the second terminal to adjust a used transmission resource and/or transmit power based on the interference degree or the usage degree.

With reference to the thirteenth possible implementation of the first aspect, in a fourteenth possible implementation of the first aspect, the second terminal may also be the first terminal if the resource location at which the first terminal reports the resource usage information is a resource location used by the first terminal for D2D data transmission.

With reference to the fourteenth possible implementation of the first aspect, in a fifteenth possible implementation of the first aspect, the interference degree or the usage degree includes a resource usage parameter sequence, each parameter in the resource usage parameter sequence is corresponding to one of all resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the fifteenth possible implementation of the first aspect, in a sixteenth possible implementation of the first aspect, after the reporting, by the first terminal, the resource usage information to the first base station, the method further includes:

receiving, by the first terminal, interference degrees or usage degrees, at all resource locations, that are sent by the base station by using broadcast information; or receiving, by the first terminal, paging signaling sent by the base station, where the paging signaling carries an interference degree or a usage degree of a resource currently used by the first terminal; or receiving, by the first terminal, dedicated signaling sent by the base station, where the dedicated signaling carries a D2D data transmission resource re-allocated for the first terminal and/or a power adjustment value for sending D2D data; and adjusting, by the first terminal, a resource location at which the first terminal performs D2D data transmission and/or D2D data transmit power based on the broadcast information, the paging signaling, or the dedicated signaling.

With reference to the sixteenth possible implementation of the first aspect, in a seventeenth possible implementation of the first aspect, the adjusting, by the first terminal based on the broadcast information, a resource location at which the first terminal performs D2D data transmission includes:

determining, by the first terminal based on the interference degrees or the usage degrees, a resource without interference or with a lowest interference degree or usage degree; and adjusting, by the first terminal, the resource location of the first terminal to a location of the resource without interference or with the lowest interference degree or usage degree.

With reference to the sixteenth possible implementation of the first aspect, in an eighteenth possible implementation of the first aspect, adjusting, by the first terminal, the resource location at which the first terminal performs D2D data transmission and/or the D2D data transmit power based on the interference degrees or the usage degrees includes:

determining, by the first terminal based on the interference degrees or the usage degrees, that there is interference at a resource location at which the first terminal is currently located; and when there is interference at the resource location at which the first terminal is currently located, adjusting, by the first terminal, transmit power for sending a data packet by the first terminal; or when there is interference at the resource location at which the first terminal is currently located, detecting, by the first terminal, whether there is an idle resource in a coverage area of the first terminal; and when there is an idle resource in the coverage area of the first terminal, adjusting, by the first terminal, the resource location of the first terminal to a location of the idle resource; or when there is an idle resource in the coverage area of the first terminal, sending, by the first terminal, a scheduling request to the base station, where the scheduling request carries information about the idle resource; and receiving, by the first terminal, response information sent by the base station, where the response information carries location information of a resource obtained after scheduling is performed for the first terminal and/or information about transmit power for sending a data packet.

According to a second aspect, an embodiment of the present disclosure provides a method for device-to-device inter-cell interference coordination, including:

receiving, by a base station, resource usage information, corresponding to a resource location, that is reported by a first terminal, where the resource location is a resource location at which the first terminal currently performs device-to-device D2D data transmission, or information about the resource location is carried in the configuration information, and the resource usage information is sent after the first terminal becomes a detection terminal;

determining, by the base station, an interference degree or a usage degree at the resource location based on the resource usage information; and re-allocating, by the base station, a D2D data transmission resource and/or adjusting D2D data transmit power, based on the interference degree or the usage degree, for the first terminal or a second terminal using the resource location for data transmission; or notifying the first terminal or the second terminal of an interference degree or a usage degree of a currently used resource.

With reference to the second aspect, in a first possible implementation of the second aspect, before the receiving, by a base station, resource usage information, corresponding to a resource location, that is reported by a first terminal, the method further includes:

sending, by the base station, the configuration information to the first terminal, where the configuration information includes a resource usage detection parameter, the detection terminal is configured to measure a resource usage level on a D2D link corresponding to the detection terminal, and the resource usage detection parameter is used to configure a resource usage detection manner for the first terminal.

With reference to the first possible implementation of the second aspect, in a second possible implementation of the second aspect, before the sending, by the base station, the configuration information to the first terminal, the method further includes:

sending, by the base station, broadcast information to the first terminal, where the broadcast information includes a parameter of a preset condition for becoming the detection terminal, so that the first terminal determines, based on the preset condition, whether the first terminal becomes the detection terminal; and the parameter of the preset condition includes at least one of the following: a signal power threshold used by the first terminal to receive a signal of the first base station; a resource list in which there is an orthogonal relationship between a resource frequency of a resource of a neighboring base station and a resource frequency of the first base station, where the neighboring base station is corresponding to a neighboring cell of a cell corresponding to the first base station; or a preset threshold and a relationship between a random number and the preset threshold, where the random number is one of items generated by the first terminal.

With reference to any one of the second aspect or the possible implementations of the second aspect, in a third possible implementation of the second aspect, before the receiving, by a base station, resource usage information, at the resource location, that is reported by the first terminal, the method further includes:

receiving, by the base station, request information sent by the first terminal, where the request information is used to request the base station to allow the first terminal to be the detection terminal;

determining, by the base station, whether to allow the first terminal to be the detection terminal; and when determining to allow the first terminal to be the detection terminal, sending, by the base station to the first terminal, an instruction for allowing the first terminal to be the detection terminal.

With reference to the third possible implementation of the second aspect, in a fourth possible implementation of the second aspect, the instruction for allowing the first terminal to be the detection terminal carries a temporary identifier allocated by the base station to the first terminal, or a size of the instruction for allowing the first terminal to be the detection terminal is 1 bit.

With reference to the second aspect, in a fifth possible implementation of the second aspect, before the sending, by the base station, the configuration information to the first terminal, the method further includes determining, by the base station based on the information sent by the first terminal to the base station, whether the terminal is located at an edge of a cell corresponding to the base station;

when the base station determines that the first terminal is located at the edge of the cell corresponding to the base station, determining, by the base station, whether data information of the first terminal includes a temporary identifier of an existing detection terminal; and when the information sent by the first terminal to the base station does not include a temporary identifier of an existing detection terminal, determining, by the base station, that the first terminal is the detection terminal.

With reference to the second aspect, in a sixth possible implementation of the second aspect, before the re-allocating, by the base station, a D2D data transmission resource and/or adjusting D2D data transmit power, based on the interference degree or the usage degree, for a second terminal using the resource location for data transmission; or notifying the second terminal of an interference degree or a usage degree of a currently used resource, the method further includes:

determining, by the base station, whether data sent by the second terminal carries a temporary identifier of the first terminal; and if the data sent by the second terminal carries the temporary identifier of the first terminal, determining, by the base station based on the interference degree or the usage degree, at the resource location, that is reported by the first terminal, an interference degree or a usage degree at a location of a resource currently used by the second terminal.

With reference to the sixth possible implementation of the second aspect, in a seventh possible implementation of the second aspect, the re-allocating, by the base station, a D2D data transmission resource and/or adjusting D2D data transmit power, based on the interference degree or the usage degree, for the first terminal or a second terminal using the resource location for data transmission includes:

sending, by the base station, paging signaling to the first terminal or the second terminal, where the paging signaling carries the D2D data transmission resource re-allocated for the first terminal or the second terminal and/or a power adjustment value for adjusting the D2D data transmit power; or sending, by the base station, paging signaling to the first terminal or the second terminal; and after the first terminal or the second terminal responds to the paging signaling, sending, by the base station, dedicated signaling to the first terminal or the second terminal, where the dedicated signaling carries the D2D data transmission resource re-allocated for the first terminal or the second terminal and/or a power adjustment value for adjusting the D2D data transmit power.

With reference to the sixth possible implementation of the second aspect, in an eighth possible implementation of the second aspect, the notifying, by the base station, the second terminal of an interference degree or a usage degree of a currently used resource includes:

sending, by the base station, interference degrees or usage degrees of all resources by using broadcast information, so that the second terminal determines, based on the interference degrees or the usage degrees, an adjusted resource location, and/or adjusted transmit power for sending a D2D data packet; or paging, by the base station, the first terminal or the second terminal by using paging signaling, where the paging signaling carries the interference degree or the usage degree of the resource currently used by the second terminal.

With reference to the eighth possible implementation of the second aspect, in a ninth possible implementation of the second aspect, the interference degree or the usage degree includes a resource usage parameter sequence, each parameter in the resource usage parameter sequence is corresponding to one of all the resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the ninth possible implementation of the second aspect, in a tenth possible implementation of the second aspect, after the sending, by the base station, interference degrees or usage degrees of all resources by using broadcast information, or the paging, by the base station, the second terminal by using paging signaling, the method further includes:

receiving, by the base station, resource request information sent by the first terminal or the second terminal, where the resource request information carries information, detected by the second terminal, about an idle resource in an area of a cell corresponding to the base station;

determining, by the base station based on the interference degrees or the usage degrees of all the resources and the information about the idle resource, location information of a resource obtained after scheduling is performed for the second terminal and/or information about transmit power for sending a data packet; and sending, by the base station, response information to the second terminal, where the response information carries location information of a resource re-scheduled by the base station for the second terminal and/or information about transmit power, adjusted by the base station for the second terminal, for sending a data packet.

With reference to the second aspect, in an eleventh possible implementation of the second aspect, the resource usage detection parameter further includes a manner of triggering reporting of the resource usage information, a resource usage detection threshold, and a resource usage statistics manner; the resource usage detection threshold includes at least one of an interference power threshold, an interference data packet percentage threshold, a receive power threshold, or a received data packet percentage threshold; and the manner of triggering reporting of the resource usage information includes periodic triggering and event triggering; and when the manner of triggering reporting of the resource usage information is the periodic triggering, the resource usage detection parameter further includes a reporting period.

According to a third aspect, an embodiment of the present disclosure provides a method for device-to-device inter-cell interference coordination, including:

receiving, by a first terminal, broadcast information of another terminal;

when the first terminal determines that the first terminal is located at an edge of a cell in which the first terminal is currently located, parsing, by the first terminal, the received broadcast information, and determining whether the information carries a temporary identifier;

when the broadcast information carries the temporary identifier, adding, by the first terminal, the temporary identifier to scheduling request signaling or data to be sent to the base station; and sending, by the first terminal to the base station, the scheduling request signaling or the data to be sent to the base station, so that the base station determines, based on the temporary identifier, an interference degree or a usage degree at a resource location at which the first terminal is located, and performs scheduling for the first terminal based on the interference degree or the usage degree.

With reference to the third aspect, in a first possible implementation of the third aspect, before the adding, by the first terminal, the temporary identifier to the scheduling request signaling or data to be sent to the base station, the method further includes:

determining, by the first terminal, whether a quantity of temporary identifiers is greater than 1; and when the quantity of temporary identifiers is greater than 1, determining, by the first terminal, receive power for receiving a data packet corresponding to the temporary identifiers; and the adding, by the first terminal, the temporary identifier to scheduling request signaling or data to be sent to a base station includes:

adding, by the first terminal to the scheduling request signaling or the data to be sent to the base station, a temporary identifier carried in the data packet whose receive power is highest.

With reference to the third aspect, in a second possible implementation of the third aspect, the interference degree or the usage degree includes a resource usage parameter sequence, each parameter in the resource usage parameter sequence is corresponding to one of all resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the second possible implementation of the third aspect, in a third possible implementation of the third aspect, the method further includes:

receiving, by the first terminal, interference degrees or usage degrees, at all resource locations, that are sent by the base station by using broadcast information; or receiving, by the first terminal, paging signaling sent by the base station, where the paging signaling carries an interference degree or a usage degree of a resource currently used by the first terminal; or receiving dedicated signaling sent by the base station, where the dedicated signaling carries a transmission resource re-allocated for the first terminal and/or a transmit power adjustment value; and adjusting, by the first terminal, a resource location at which the first terminal performs device-to-device D2D data transmission and/or D2D data transmit power based on the broadcast information, the paging signaling, or the dedicated signaling.

With reference to the third possible implementation of the third aspect, in a fourth possible implementation of the third aspect, the adjusting, by the first terminal based on the broadcast information, a resource location at which the first terminal performs D2D data transmission includes:

determining, by the first terminal based on the interference degrees or the usage degrees, a resource without interference or with a lowest interference degree or usage degree; and adjusting, by the first terminal, the resource location of the first terminal to a location of the resource without interference or with the lowest interference degree or usage degree.

With reference to the third possible implementation of the third aspect, in a fifth possible implementation of the third aspect, adjusting, by the first terminal, the resource location at which the first terminal performs D2D data transmission and/or the D2D data transmit power based on the interference degrees or the usage degrees includes:

determining, by the first terminal based on the interference degrees or the usage degrees, that there is interference at a resource location at which the first terminal is currently located; and when there is interference at the resource location at which the first terminal is currently located, adjusting, by the first terminal, transmit power for sending a data packet by the first terminal; or when there is interference at the resource location at which the first terminal is currently located, detecting, by the first terminal, whether there is an idle resource in a coverage area of the first terminal; and when there is an idle resource in the coverage area of the first terminal, adjusting, by the first terminal, the resource location of the first terminal to a location of the idle resource; or when there is an idle resource in the coverage area of the first terminal, sending, by the first terminal, a scheduling request to the base station, where the scheduling request carries information about the idle resource; and receiving, by the first terminal, response information sent by the base station, where the response information carries location information of a resource obtained after scheduling is performed for the first terminal and/or information about transmit power for sending a data packet.

According to a fourth aspect, an embodiment of the present disclosure provides an apparatus for device-to-device inter-cell interference coordination, including:

a receiving unit, configured to: when the first terminal becomes a detection terminal, receive configuration information sent by a first base station, where the configuration information includes a resource usage detection parameter, the detection terminal is configured to measure a resource usage level on a device-to-device D2D link corresponding to the detection terminal, and the resource usage detection parameter is used to configure a resource usage detection manner for the first terminal;

a detection unit, configured to detect, based on the resource usage detection parameter, resource usage information corresponding to a resource location, where the resource location is a resource location at which the first terminal currently performs D2D data transmission, or information about the resource location is carried in the configuration information; and a sending unit, configured to report the resource usage information to the first base station, so that the first base station adjusts, based on the resource usage information, a D2D data transmission mode for the first terminal or a second terminal using the resource location.

With reference to the fourth aspect, in a first possible implementation of the fourth aspect, the apparatus further includes:

a judgment unit, configured to determine, based on a parameter of the preset condition, whether the first terminal can become the detection terminal, where the parameter of the preset condition is sent by the first base station by using broadcast information, or the parameter of the preset condition is preset by the first terminal.

With reference to the first possible implementation of the fourth aspect, in a second possible implementation of the fourth aspect, the preset condition includes a first preset condition, the first preset condition includes a condition for determining that the first terminal is located at an edge of a cell in which the first terminal is currently located, and a parameter of the first preset condition includes a signal power threshold used by the first terminal to receive a signal of the first base station.

With reference to the second possible implementation of the fourth aspect, in a third possible implementation of the fourth aspect, the judgment unit is specifically configured to determine, based on the signal power threshold, whether the first terminal is located at the edge of the cell in which the first terminal is currently located; and configured to: when the first terminal is located at the edge of the cell in which the first terminal is currently located, determine that the first terminal becomes the detection terminal.

With reference to any one of the first to the third possible implementations of the fourth aspect, in a fourth possible implementation of the fourth aspect, the preset condition includes a second preset condition, the second preset condition includes whether the first terminal receives a data packet that is sent by using a resource in a resource list, a parameter of the second preset condition includes that the resource list is a resource list in which there is an orthogonal relationship between a resource frequency of a resource of a second base station and a resource frequency of the first base station, the second base station is corresponding to a neighboring cell of a cell corresponding to the first base station, and the resource list is sent by the first base station in a broadcast mode; and the judgment unit is specifically configured to: when the first terminal receives the data packet that is sent by using the resource in the resource list, determine that the first terminal becomes the detection terminal.

With reference to any one of the first to the fourth possible implementations of the fourth aspect, in a fifth possible implementation of the fourth aspect, the preset condition includes a third preset condition, a parameter of the third preset condition includes a preset threshold and a relationship between a random number and the preset threshold, the random number is generated by the first terminal, and the apparatus further includes:

a generation unit, configured to generate the random number by using a preset random sequence; and the judgment unit is specifically configured to determine whether the random number and the preset threshold meet the relationship between the random number and the preset threshold; and configured to: if the random number and the preset threshold meet the relationship between the random number and the preset threshold, determine that the first terminal becomes the detection terminal.

With reference to any one of the first to the fifth possible implementations of the fourth aspect, in a sixth possible implementation of the fourth aspect, the judgment unit is further configured to determine whether broadcast information that carries a first temporary identifier and that is sent by another terminal is received, where the first temporary identifier is added, after it is determined that the another terminal is the detection terminal, to the broadcast information sent by the another terminal; and configured to: if the first terminal does not receive the broadcast information that carries the first temporary identifier, perform the step of determining, by the first terminal based on a parameter of the preset condition, whether the first terminal can become the detection terminal.

With reference to any one of the first to the sixth possible implementations of the fourth aspect, in a seventh possible implementation of the fourth aspect, the sending unit is further configured to send request information to the first base station, so as to request the first base station to allow the first terminal to become the detection terminal; and the receiving unit is further configured to receive an instruction that is sent by the first base station for allowing the first terminal to be the detection terminal.

With reference to the fourth aspect, in an eighth possible implementation of the fourth aspect, the configuration information further includes a second temporary identifier configured by the first base station for the first terminal, and the apparatus further includes:

an adding unit, configured to add the second temporary identifier to a data packet to be sent by the first terminal.

With reference to the fourth aspect, in a ninth possible implementation of the fourth aspect, the configuration information further includes a second temporary identifier configured by the first base station for the first terminal and a broadcast resource location at which the second temporary identifier is broadcast; and the sending unit is further configured to periodically broadcast the second temporary identifier at the broadcast resource location.

With reference to the fourth aspect, in a tenth possible implementation of the fourth aspect, the resource usage detection parameter further includes a manner of triggering reporting of the resource usage information, a resource usage detection threshold, and a resource usage statistics manner; the resource usage detection threshold includes at least one of an interference power threshold, an interference data packet percentage threshold, a receive power threshold, or a received data packet percentage threshold; the manner of triggering reporting of the resource usage information includes periodic triggering and event triggering; and when the manner of triggering reporting of the resource usage information is the periodic triggering, the resource usage detection parameter further includes a reporting period.

With reference to the tenth possible implementation of the fourth aspect, in an eleventh possible implementation of the fourth aspect, when the manner of triggering reporting of the resource usage information is the periodic triggering, the detection unit is specifically configured to: in each reporting period, determine whether receive power of a data packet that fails to be received is greater than the interference power threshold; or determine, by the first terminal, whether a percentage of data packets that fail to be received is greater than the interference data packet percentage threshold; or determine, by the first terminal, whether receive power of a received data packet is greater than the receive power threshold; or determine, by the first terminal, whether a percentage of received data packets is greater than the received data packet percentage threshold; and configured to: when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, determine that there is interference.

With reference to the eleventh possible implementation of the fourth aspect, in a twelfth possible implementation of the fourth aspect, when the manner of triggering reporting of the resource usage information is the event triggering, the detection unit is specifically configured to: determine whether receive power of a data packet that fails to be received is greater than the interference power threshold; or determine, by the first terminal, whether a percentage of data packets that fail to be received is greater than the interference data packet percentage threshold; or determine, by the first terminal, whether receive power of a received data packet is greater than the receive power threshold; or determine, by the first terminal, whether a percentage of received data packets is greater than the received data packet percentage threshold; and configured to: when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, determine that there is interference.

With reference to the fourth aspect, in a thirteenth possible implementation of the fourth aspect, the adjusting a D2D data transmission mode for a second resource includes: re-allocating a resource and/or adjusting D2D data transmit power for the second terminal; or notifying the second terminal of an interference degree or a usage degree of a currently used resource, and instructing the second terminal to adjust a used transmission resource and/or transmit power based on the interference degree or the usage degree.

With reference to the thirteenth possible implementation of the fourth aspect, in a fourteenth possible implementation of the fourth aspect, the second terminal may also be the first terminal if the resource location at which the first terminal reports the resource usage information is a resource location used by the first terminal for D2D data transmission.

With reference to the fourteenth possible implementation of the fourth aspect, in a fifteenth possible implementation of the fourth aspect, the interference degree or the usage degree includes a resource usage parameter sequence, each parameter in the resource usage parameter sequence is corresponding to one of all resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the fifteenth possible implementation of the fourth aspect, in a sixteenth possible implementation of the fourth aspect, the receiving unit is further configured to: receive interference degrees or usage degrees, at all resource locations, that are sent by the base station by using broadcast information; or receive paging signaling sent by the base station, where the paging signaling carries an interference degree or a usage degree of a resource currently used by the first terminal; or receive dedicated signaling sent by the base station, where the dedicated signaling carries a D2D data transmission resource re-allocated for the first terminal and/or a power adjustment value for sending D2D data; and the apparatus further includes:

an adjustment unit, configured to adjust a resource location at which the first terminal performs D2D data transmission and/or D2D data transmit power based on the broadcast information, the paging signaling, or the dedicated signaling.

With reference to the sixteenth possible implementation of the fourth aspect, in a seventeenth possible implementation of the fourth aspect, the adjustment unit is specifically configured to determine, based on the interference degrees or the usage degrees, a resource without interference or with a lowest interference degree or usage degree; and configured to adjust the resource location of the first terminal to a location of the resource without interference or with the lowest interference degree or usage degree.

With reference to the sixteenth possible implementation of the fourth aspect, in an eighteenth possible implementation of the fourth aspect, the adjustment unit is specifically configured to determine, based on the interference degrees or the usage degrees, that there is interference at a resource location at which the first terminal is currently located; and configured to: when there is interference at the resource location at which the first terminal is currently located, adjust transmit power for sending a data packet by the first terminal; or when there is interference at the resource location at which the first terminal is currently located, detect whether there is an idle resource in a coverage area of the first terminal; and configured to: when there is an idle resource in the coverage area of the first terminal, adjust the resource location of the first terminal to a location of the idle resource; or when there is an idle resource in the coverage area of the first terminal, send a scheduling request to the base station, where the scheduling request carries information about the idle resource; and configured to receive response information sent by the base station, where the response information carries location information of a resource obtained after scheduling is performed for the first terminal and/or information about transmit power for sending a data packet.

According to a fifth aspect, an embodiment of the present disclosure provides an apparatus for device-to-device inter-cell interference coordination, including:

a receiving unit, configured to receive resource usage information, corresponding to a resource location, that is reported by a first terminal, where the resource location is a resource location at which the first terminal currently performs device-to-device D2D data transmission, or information about the resource location is carried in the configuration information, and the resource usage information is sent after the first terminal becomes a detection terminal;

a determining unit, configured to determine an interference degree or a usage degree at the resource location based on the resource usage information; and a processing unit, configured to re-allocate a D2D data transmission resource and/or adjust D2D data transmit power, based on the interference degree or the usage degree, for the first terminal or a second terminal using the resource location for data transmission; or notify the first terminal or the second terminal of an interference degree or a usage degree of a currently used resource.

With reference to the fifth aspect, in a first possible implementation of the fifth aspect, the apparatus further includes:

a sending unit, configured to send the configuration information to the first terminal, where the configuration information includes a resource usage detection parameter, the detection terminal is configured to measure a resource usage level on a D2D link corresponding to the detection terminal, and the resource usage detection parameter is used to configure a resource usage detection manner for the first terminal.

With reference to the first possible implementation of the fifth aspect, in a second possible implementation of the fifth aspect, the sending unit is further configured to send broadcast information to the first terminal, where the broadcast information includes a parameter of a preset condition for becoming the detection terminal, so that the first terminal determines, based on the preset condition, whether the first terminal becomes the detection terminal; and the parameter of the preset condition includes at least one of the following: a signal power threshold used by the first terminal to receive a signal of the first base station; a resource list in which there is an orthogonal relationship between a resource frequency of a resource of a neighboring base station and a resource frequency of the first base station, where the neighboring base station is corresponding to a neighboring cell of a cell corresponding to the first base station; or a preset threshold and a relationship between a random number and the preset threshold, where the random number is one of items generated by the first terminal.

With reference to any one of the fifth aspect or the possible implementations of the fifth aspect, in a third possible implementation of the fifth aspect, the sending unit is further configured to receive request information sent by the first terminal, where the request information is used to request the base station to allow the first terminal to be the detection terminal;

the determining unit is further configured to determine whether the first terminal is allowed to be the detection terminal; and the sending unit is further configured to: when it is determined that the first terminal is allowed to be the detection terminal, send, to the first terminal, an instruction for allowing the first terminal to be the detection terminal.

With reference to the third possible implementation of the fifth aspect, in a fourth possible implementation of the fifth aspect, the instruction for allowing the first terminal to be the detection terminal carries a temporary identifier allocated by the base station to the first terminal, or a size of the instruction for allowing the first terminal to be the detection terminal is 1 bit.

With reference to the fifth aspect, in a fifth possible implementation of the fifth aspect, the determining unit is further configured to determine, based on the information sent by the first terminal to the base station, whether the terminal is located at an edge of a cell corresponding to the base station; and the apparatus further includes:

a judgment unit, configured to: when the base station determines that the first terminal is located at the edge of the cell corresponding to the base station, determine whether data information of the first terminal includes a temporary identifier of an existing detection terminal; and the determining unit is further configured to: when the information sent by the first terminal to the base station does not include a temporary identifier of an existing detection terminal, determine that the first terminal is the detection terminal.

With reference to the fifth aspect, in a sixth possible implementation of the fifth aspect, the processing unit is specifically configured to determine whether data sent by the second terminal carries a temporary identifier of the first terminal; and configured to: if the data sent by the second terminal carries the temporary identifier of the first terminal, determine, based on the interference degree or the usage degree, at the resource location, that is reported by the first terminal, an interference degree or a usage degree at a location of a resource currently used by the second terminal.

With reference to the sixth possible implementation of the fifth aspect, in a seventh possible implementation of the fifth aspect, the processing unit is specifically configured to: send paging signaling to the first terminal or the second terminal, where the paging signaling carries the D2D data transmission resource re-allocated for the first terminal or the second terminal and/or a power adjustment value for adjusting the D2D data transmit power; or send paging signaling to the first terminal or the second terminal; and configured to: after the first terminal or the second terminal responds to the paging signaling, send dedicated signaling to the first terminal or the second terminal, where the dedicated signaling carries the D2D data transmission resource re-allocated for the first terminal or the second terminal and/or a power adjustment value for adjusting the D2D data transmit power.

With reference to the sixth possible implementation of the fifth aspect, in an eighth possible implementation of the fifth aspect, the processing unit is specifically configured to: send interference degrees or usage degrees of all resources by using broadcast information, so that the second terminal determines, based on the interference degrees or the usage degrees, an adjusted resource location, and/or adjusted transmit power for sending a D2D data packet; or page the first terminal or the second terminal by using paging signaling, where the paging signaling carries the interference degree or the usage degree of the resource currently used by the second terminal.

With reference to the eighth possible implementation of the fifth aspect, in a ninth possible implementation of the fifth aspect, the interference degree or the usage degree includes a resource usage parameter sequence, each parameter in the resource usage parameter sequence is corresponding to one of all the resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the ninth possible implementation of the fifth aspect, in a tenth possible implementation of the fifth aspect, the receiving unit is further configured to receive resource request information sent by the first terminal or the second terminal, where the resource request information carries information, detected by the second terminal, about an idle resource in an area of a cell corresponding to the base station;

the determining unit is further configured to determine, based on the interference degrees or the usage degrees of all the resources and the information about the idle resource, location information of a resource obtained after scheduling is performed for the second terminal and/or information about transmit power for sending a data packet; and the sending unit is further configured to send response information to the second terminal, where the response information carries location information of a resource re- scheduled by the base station for the second terminal and/or information about transmit power, adjusted by the base station for the second terminal, for sending a data packet.

With reference to the fifth aspect, in an eleventh possible implementation of the fifth aspect, the resource usage detection parameter further includes a manner of triggering reporting of the resource usage information, a resource usage detection threshold, and a resource usage statistics manner; the resource usage detection threshold includes at least one of an interference power threshold, an interference data packet percentage threshold, a receive power threshold, or a received data packet percentage threshold; the manner of triggering reporting of the resource usage information includes periodic triggering and event triggering; and when the manner of triggering reporting of the resource usage information is the periodic triggering, the resource usage detection parameter further includes a reporting period.

According to a sixth aspect, an embodiment of the present disclosure provides an apparatus for device-to-device inter-cell interference coordination, including:

a receiving unit, configured to receive broadcast information of another terminal;

a judgment unit, configured to: when the first terminal determines that the first terminal is located at an edge of a cell in which the first terminal is currently located, parse the received broadcast information, and determine whether the information carries a temporary identifier;

an adding unit, configured to: when the broadcast information carries the temporary identifier, add the temporary identifier to scheduling request signaling or data to be sent to the base station; and a sending unit, configured to send, to the base station, the scheduling request signaling or the data to be sent to the base station, so that the base station determines, based on the temporary identifier, an interference degree or a usage degree at a resource location at which the first terminal is located, and performs scheduling for the first terminal based on the interference degree or the usage degree.

With reference to the sixth aspect, in a first possible implementation of the sixth aspect, the judgment unit is further configured to determine whether a quantity of temporary identifiers is greater than 1, and the apparatus further includes:

a determining unit, configured to: when the quantity of temporary identifiers is greater than 1, determine receive power for receiving a data packet corresponding to the temporary identifiers; and the adding unit is specifically configured to add, to the scheduling request signaling or the data to be sent to the base station, a temporary identifier carried in the data packet whose receive power is highest.

With reference to the sixth aspect, in a second possible implementation of the sixth aspect, the interference degree or the usage degree includes a resource usage parameter sequence, each parameter in the resource usage parameter sequence is corresponding to one of all resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the second possible implementation of the sixth aspect, in a third possible implementation of the sixth aspect, the receiving unit is further configured to: receive interference degrees or usage degrees, at all resource locations, that are sent by the base station by using broadcast information; or receive paging signaling sent by the base station, where the paging signaling carries an interference degree or a usage degree of a resource currently used by the first terminal; or receive dedicated signaling sent by the base station, where the dedicated signaling carries a transmission resource re-allocated for the first terminal and/or a transmit power adjustment value; and the apparatus further includes:

an adjustment unit, configured to adjust a resource location at which the first terminal performs device-to-device D2D data transmission and/or D2D data transmit power based on the broadcast information, the paging signaling, or the dedicated signaling.

With reference to the third possible implementation of the sixth aspect, in a fourth possible implementation of the sixth aspect, the adjustment unit is specifically configured to determine, by the first terminal based on the interference degrees or the usage degrees, a resource without interference or with a lowest interference degree or usage degree; and configured to adjust the resource location of the first terminal to a location of the resource without interference or with the lowest interference degree or usage degree.

With reference to the third possible implementation of the sixth aspect, in a fifth possible implementation of the sixth aspect, the adjustment unit is specifically configured to determine, based on the interference degrees or the usage degrees, that there is interference at a resource location at which the first terminal is currently located; and configured to: when there is interference at the resource location at which the first terminal is currently located, adjust transmit power for sending a data packet by the first terminal; or when there is interference at the resource location at which the first terminal is currently located, detect whether there is an idle resource in a coverage area of the first terminal; and configured to: when there is an idle resource in the coverage area of the first terminal, adjust the resource location of the first terminal to a location of the idle resource; or when there is an idle resource in the coverage area of the first terminal, send a scheduling request to the base station, where the scheduling request carries information about the idle resource; and configured to receive response information sent by the base station, where the response information carries location information of a resource obtained after scheduling is performed for the first terminal and/or information about transmit power for sending a data packet.

According to a seventh aspect, an embodiment of the present disclosure provides a terminal for device-to-device inter-cell interference coordination, and the terminal includes at least a communications unit and a processing unit, where the communications unit is configured to: when the first terminal becomes a detection terminal, receive configuration information sent by a first base station, where the configuration information includes a resource usage detection parameter, the detection terminal is configured to measure a resource usage level on a device-to-device D2D link corresponding to the detection terminal, and the resource usage detection parameter is used to configure a resource usage detection manner for the first terminal;

the processing unit is configured to detect, based on the resource usage detection parameter, resource usage information corresponding to a resource location, where the resource location is a resource location at which the first terminal currently performs D2D data transmission, or information about the resource location is carried in the configuration information; and the communications unit is further configured to report the resource usage information to the first base station, so that the first base station adjusts, based on the resource usage information, a D2D data transmission mode for the first terminal or a second terminal using the resource location.

With reference to the seventh aspect, in a first possible implementation of the seventh aspect, the processing unit is further configured to determine, based on a parameter of the preset condition, whether the first terminal can become the detection terminal; and the parameter of the preset condition is sent by the first base station by using broadcast information, or the parameter of the preset condition is preset by the first terminal.

With reference to the first possible implementation of the seventh aspect, in a second possible implementation of the seventh aspect, the preset condition includes a first preset condition, the first preset condition includes a condition for determining that the first terminal is located at an edge of a cell in which the first terminal is currently located, and a parameter of the first preset condition includes a signal power threshold used by the first terminal to receive a signal of the first base station.

With reference to the second possible implementation of the seventh aspect, in a third possible implementation of the seventh aspect, the processing unit is further configured to determine, based on the signal power threshold, whether the first terminal is located at the edge of the cell in which the first terminal is currently located; and configured to: when the first terminal is located at the edge of the cell in which the first terminal is currently located, determine that the first terminal becomes the detection terminal.

With reference to any one of the first to the third possible implementations of the seventh aspect, in a fourth possible implementation of the seventh aspect, the preset condition includes a second preset condition, the second preset condition includes whether the first terminal receives a data packet that is sent by using a resource in a resource list, a parameter of the second preset condition includes that the resource list is a resource list in which there is an orthogonal relationship between a resource frequency of a resource of a second base station and a resource frequency of the first base station, the second base station is corresponding to a neighboring cell of a cell corresponding to the first base station, and the resource list is sent by the first base station in a broadcast mode; and the processing unit is further configured to: when the first terminal receives the data packet that is sent by using the resource in the resource list, determine that the first terminal becomes the detection terminal.

With reference to any one of the first to the fourth possible implementations of the seventh aspect, in a fifth possible implementation of the seventh aspect, the preset condition includes a third preset condition, a parameter of the third preset condition includes a preset threshold and a relationship between a random number and the preset threshold, and the random number is generated by the first terminal;

the processing unit is further configured to generate, by the first terminal, the random number by using a preset random sequence; and configured to determine whether the random number and the preset threshold meet the relationship between the random number and the preset threshold; and configured to: if the random number and the preset threshold meet the relationship between the random number and the preset threshold, determine that the first terminal becomes the detection terminal.

With reference to any one of the first to the fifth possible implementations of the seventh aspect, in a sixth possible implementation of the seventh aspect, the processing unit is further configured to determine whether broadcast information that carries a first temporary identifier and that is sent by another terminal is received, where the first temporary identifier is added, after it is determined that the another terminal is the detection terminal, to the broadcast information sent by the another terminal; and configured to: if the first terminal does not receive the broadcast information that carries the first temporary identifier, perform the step of determining, by the first terminal based on a parameter of the preset condition, whether the first terminal can become the detection terminal.

With reference to any one of the first to the sixth possible implementations of the seventh aspect, in a seventh possible implementation of the seventh aspect, the communications unit is further configured to send request information to the first base station, so as to request the first base station to allow the first terminal to become the detection terminal; and configured to receive an instruction that is sent by the first base station for allowing the first terminal to be the detection terminal.

With reference to the seventh aspect, in an eighth possible implementation of the seventh aspect, the configuration information further includes a second temporary identifier configured by the first base station for the first terminal; and the processing unit is further configured to add the second temporary identifier to a data packet to be sent by the first terminal.

With reference to the seventh aspect, in a ninth possible implementation of the seventh aspect, the configuration information further includes a second temporary identifier configured by the first base station for the first terminal and a broadcast resource location at which the second temporary identifier is broadcast; and the communications unit is further configured to periodically broadcast the second temporary identifier at the broadcast resource location.

With reference to the seventh aspect, in a tenth possible implementation of the seventh aspect, the resource usage detection parameter further includes a manner of triggering reporting of the resource usage information, a resource usage detection threshold, and a resource usage statistics manner; the resource usage detection threshold includes at least one of an interference power threshold, an interference data packet percentage threshold, a receive power threshold, or a received data packet percentage threshold; the manner of triggering reporting of the resource usage information includes periodic triggering and event triggering; and when the manner of triggering reporting of the resource usage information is the periodic triggering, the resource usage detection parameter further includes a reporting period.

With reference to the tenth possible implementation of the seventh aspect, in an eleventh possible implementation of the seventh aspect, when the manner of triggering reporting of the resource usage information is the periodic triggering, the processing unit is further configured to: in each reporting period, determine whether receive power of a data packet that fails to be received is greater than the interference power threshold; or determine, by the first terminal, whether a percentage of data packets that fail to be received is greater than the interference data packet percentage threshold; or determine, by the first terminal, whether receive power of a received data packet is greater than the receive power threshold; or determine, by the first terminal, whether a percentage of received data packets is greater than the received data packet percentage threshold; and configured to: when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, determine that there is interference.

With reference to the eleventh possible implementation of the seventh aspect, in a twelfth possible implementation of the seventh aspect, when the manner of triggering reporting of the resource usage information is the event triggering, the processing unit is further configured to: determine whether receive power of a data packet that fails to be received is greater than the interference power threshold; or determine, by the first terminal, whether a percentage of data packets that fail to be received is greater than the interference data packet percentage threshold; or determine, by the first terminal, whether receive power of a received data packet is greater than the receive power threshold; or determine, by the first terminal, whether a percentage of received data packets is greater than the received data packet percentage threshold; and configured to: when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, determine that there is interference.

With reference to the seventh aspect, in a thirteenth possible implementation of the seventh aspect, the adjusting a D2D data transmission mode for a second resource includes: re-allocating a resource and/or adjusting D2D data transmit power for the second terminal; or notifying the second terminal of an interference degree or a usage degree of a currently used resource, and instructing the second terminal to adjust a used transmission resource and/or transmit power based on the interference degree or the usage degree.

With reference to the thirteenth possible implementation of the seventh aspect, in a fourteenth possible implementation of the seventh aspect, the second terminal may also be the first terminal if the resource location at which the first terminal reports the resource usage information is a resource location used by the first terminal for D2D data transmission.

With reference to the fourteenth possible implementation of the seventh aspect, in a fifteenth possible implementation of the seventh aspect, the interference degree or the usage degree includes a resource usage parameter sequence, each parameter in the resource usage parameter sequence is corresponding to one of all resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the fifteenth possible implementation of the seventh aspect, in a sixteenth possible implementation of the seventh aspect, the communications unit is further configured to: receive interference degrees or usage degrees, at all resource locations, that are sent by the base station by using broadcast information; or receive paging signaling sent by the base station, where the paging signaling carries an interference degree or a usage degree of a resource currently used by the first terminal; or receive dedicated signaling sent by the base station, where the dedicated signaling carries a D2D data transmission resource re-allocated for the first terminal and/or a power adjustment value for sending D2D data; and configured to adjust a resource location at which the first terminal performs D2D data transmission and/or D2D data transmit power based on the broadcast information, the paging signaling, or the dedicated signaling.

With reference to the sixteenth possible implementation of the seventh aspect, in a seventeenth possible implementation of the seventh aspect, the processing unit is further configured to determine, by the first terminal based on the interference degrees or the usage degrees, a resource without interference or with a lowest interference degree or usage degree; and configured to adjust the resource location of the first terminal to a location of the resource without interference or with the lowest interference degree or usage degree.

With reference to the sixteenth possible implementation of the seventh aspect, in an eighteenth possible implementation of the seventh aspect, the processing unit is further configured to determine, based on the interference degrees or the usage degrees, that there is interference at a resource location at which the first terminal is currently located; and configured to: when there is interference at the resource location at which the first terminal is currently located, adjust transmit power for sending a data packet by the first terminal; or when there is interference at the resource location at which the first terminal is currently located, detect whether there is an idle resource in a coverage area of the first terminal; and configured to: when there is an idle resource in the coverage area of the first terminal, adjust the resource location of the first terminal to a location of the idle resource; or the communications unit is further configured to send a scheduling request to the base station when there is an idle resource in the coverage area of the first terminal, where the scheduling request carries information about the idle resource; and configured to receive response information sent by the base station, where the response information carries location information of a resource obtained after scheduling is performed for the first terminal and/or information about transmit power for sending a data packet.

According to an eighth aspect, an embodiment of the present disclosure provides a base station for device-to-device inter-cell interference coordination, and the base station includes at least a processing unit and an interface circuit, where the processing unit is configured to receive, by using the interface circuit, resource usage information, corresponding to a resource location, that is reported by a first terminal, where the resource location is a resource location at which the first terminal currently performs device-to-device D2D data transmission, or information about the resource location is carried in the configuration information, and the resource usage information is sent after the first terminal becomes a detection terminal; and configured to determine an interference degree or a usage degree at the resource location based on the resource usage information; and configured to re-allocate a D2D data transmission resource and/or adjust D2D data transmit power, based on the interference degree or the usage degree, for the first terminal or a second terminal using the resource location for data transmission; or notify the first terminal or the second terminal of an interference degree or a usage degree of a currently used resource.

With reference to the eighth aspect, in a first possible implementation of the eighth aspect, the processing unit is further configured to send the configuration information to the first terminal by using the interface circuit, the configuration information includes a resource usage detection parameter, the detection terminal is configured to measure a resource usage level on a D2D link corresponding to the detection terminal, and the resource usage detection parameter is used to configure a resource usage detection manner for the first terminal.

With reference to the first possible implementation of the eighth aspect, in a second possible implementation of the eighth aspect, the processing unit is further configured to send broadcast information to the first terminal by using the interface circuit, where the broadcast information includes a parameter of a preset condition for becoming the detection terminal, so that the first terminal determines, based on the preset condition, whether the first terminal becomes the detection terminal; and the parameter of the preset condition includes at least one of the following: a signal power threshold used by the first terminal to receive a signal of the first base station; a resource list in which there is an orthogonal relationship between a resource frequency of a resource of a neighboring base station and a resource frequency of the first base station, where the neighboring base station is corresponding to a neighboring cell of a cell corresponding to the first base station; or a preset threshold and a relationship between a random number and the preset threshold, where the random number is one of items generated by the first terminal.

With reference to any one of the eighth aspect or the possible implementations of the eighth aspect, in a third possible implementation of the eighth aspect, the processing unit is further configured to receive, by using the interface circuit, request information sent by the first terminal, where the request information is used to request the base station to allow the first terminal to be the detection terminal; and configured to determine whether the first terminal is allowed to be the detection terminal; and configured to: when it is determined that the first terminal is allowed to be the detection terminal, send, to the first terminal by using the interface circuit, an instruction for allowing the first terminal to be the detection terminal.

With reference to the third possible implementation of the eighth aspect, in a fourth possible implementation of the eighth aspect, the instruction for allowing the first terminal to be the detection terminal carries a temporary identifier allocated by the base station to the first terminal, or a size of the instruction for allowing the first terminal to be the detection terminal is 1 bit.

With reference to the eighth aspect, in a fifth possible implementation of the eighth aspect, the processing unit is further configured to determine, based on the information sent by the first terminal to the base station, whether the terminal is located at an edge of a cell corresponding to the base station; and configured to: when the base station determines that the first terminal is located at the edge of the cell corresponding to the base station, determine whether data information of the first terminal includes a temporary identifier of an existing detection terminal; and configured to: when the information sent by the first terminal to the base station does not include a temporary identifier of an existing detection terminal, determine that the first terminal is the detection terminal.

With reference to the eighth aspect, in a sixth possible implementation of the eighth aspect, the processing unit is further configured to determine whether data sent by the second terminal carries a temporary identifier of the first terminal; and configured to: if the data sent by the second terminal carries the temporary identifier of the first terminal, determine, based on the interference degree or the usage degree, at the resource location, that is reported by the first terminal, an interference degree or a usage degree at a location of a resource currently used by the second terminal.

With reference to the sixth possible implementation of the eighth aspect, in a seventh possible implementation of the eighth aspect, the processing unit is further configured to: send paging signaling to the first terminal or the second terminal by using the interface circuit, where the paging signaling carries the D2D data transmission resource re-allocated for the first terminal or the second terminal and/or a power adjustment value for adjusting the D2D data transmit power; or send paging signaling to the first terminal or the second terminal; and configured to: after the first terminal or the second terminal responds to the paging signaling, send dedicated signaling to the first terminal or the second terminal by using the interface circuit, where the dedicated signaling carries the D2D data transmission resource re-allocated for the first terminal or the second terminal and/or a power adjustment value for adjusting the D2D data transmit power.

With reference to the sixth possible implementation of the eighth aspect, in an eighth possible implementation of the eighth aspect, the processing unit is further configured to: send, by using the interface circuit, interference degrees or usage degrees of all resources by using broadcast information, so that the second terminal determines, based on the interference degrees or the usage degrees, an adjusted resource location, and/or adjusted transmit power for sending a D2D data packet; or page the first terminal or the second terminal by using paging signaling, where the paging signaling carries the interference degree or the usage degree of the resource currently used by the second terminal.

With reference to the eighth possible implementation of the eighth aspect, in a ninth possible implementation of the eighth aspect, the interference degree or the usage degree includes a resource usage parameter sequence, each parameter in the resource usage parameter sequence is corresponding to one of all the resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the ninth possible implementation of the eighth aspect, in a tenth possible implementation of the eighth aspect, the processing unit is further configured to receive, by using the interface circuit, resource request information sent by the first terminal or the second terminal, where the resource request information carries information, detected by the second terminal, about an idle resource in an area of a cell corresponding to the base station; and configured to determine, based on the interference degrees or the usage degrees of all the resources and the information about the idle resource, location information of a resource obtained after scheduling is performed for the second terminal and/or information about transmit power for sending a data packet; and configured to send, by using the interface circuit, response information to the second terminal, where the response information carries location information of a resource re-scheduled by the base station for the second terminal and/or information about transmit power, adjusted by the base station for the second terminal, for sending a data packet.

With reference to the eighth aspect, in an eleventh possible implementation of the eighth aspect, the resource usage detection parameter further includes a manner of triggering reporting of the resource usage information, a resource usage detection threshold, and a resource usage statistics manner; the resource usage detection threshold includes at least one of an interference power threshold, an interference data packet percentage threshold, a receive power threshold, or a received data packet percentage threshold; the manner of triggering reporting of the resource usage information includes periodic triggering and event triggering; and when the manner of triggering reporting of the resource usage information is the periodic triggering, the resource usage detection parameter further includes a reporting period.

According to a ninth aspect, an embodiment of the present disclosure provides a terminal for device-to-device inter-cell interference coordination, and the terminal includes at least a communications unit and a processing unit, where the communications unit is configured to receive broadcast information of another terminal;

the processing unit is configured to: when the first terminal determines that the first terminal is located at an edge of a cell in which the first terminal is currently located, parse the received broadcast information, and determine whether the information carries a temporary identifier; and configured to: when the broadcast information carries the temporary identifier, add the temporary identifier to scheduling request signaling or data to be sent to the base station; and the communications unit is further configured to send, to the base station, the scheduling request signaling or the data to be sent to the base station, so that the base station determines, based on the temporary identifier, an interference degree or a usage degree at a resource location at which the first terminal is located, and performs scheduling for the first terminal based on the interference degree or the usage degree.

With reference to the ninth aspect, in a first possible implementation of the ninth aspect, the processing unit is further configured to determine whether a quantity of temporary identifiers is greater than 1; and configured to: when the quantity of temporary identifiers is greater than 1, determine receive power for receiving a data packet corresponding to the temporary identifiers; and configured to add, to the scheduling request signaling or the data to be sent to the base station, a temporary identifier carried in the data packet whose receive power is highest.

With reference to the ninth aspect, in a second possible implementation of the ninth aspect, the interference degree or the usage degree includes a resource usage parameter sequence, each parameter in the resource usage parameter sequence is corresponding to one of all resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

With reference to the second possible implementation of the ninth aspect, in a third possible implementation of the ninth aspect, the communications unit is further configured to: receive interference degrees or usage degrees, at all resource locations, that are sent by the base station by using broadcast information; or receive, by the first terminal, paging signaling sent by the base station, where the paging signaling carries an interference degree or a usage degree of a resource currently used by the first terminal; or receive dedicated signaling sent by the base station, where the dedicated signaling carries a transmission resource re-allocated for the first terminal and/or a transmit power adjustment value; and the processing unit is further configured to adjust a resource location at which the first terminal performs device-to-device D2D data transmission and/or D2D data transmit power based on the broadcast information, the paging signaling, or the dedicated signaling.

With reference to the third possible implementation of the ninth aspect, in a fourth possible implementation of the ninth aspect, the processing unit is further configured to determine, by the first terminal based on the interference degrees or the usage degrees, a resource without interference or with a lowest interference degree or usage degree; and configured to adjust the resource location of the first terminal to a location of the resource without interference or with the lowest interference degree or usage degree.

With reference to the third possible implementation of the ninth aspect, in a fifth possible implementation of the ninth aspect, the processing unit is further configured to determine, based on the interference degrees or the usage degrees, that there is interference at a resource location at which the first terminal is currently located; and configured to: when there is interference at the resource location at which the first terminal is currently located, adjust transmit power for sending a data packet by the first terminal; or when there is interference at the resource location at which the first terminal is currently located, detect whether there is an idle resource in a coverage area of the first terminal; and configured to: when there is an idle resource in the coverage area of the first terminal, adjust the resource location of the first terminal to a location of the idle resource; and the communications unit is further configured to send a scheduling request to the base station when there is an idle resource in the coverage area of the first terminal, where the scheduling request carries information about the idle resource; and configured to receive response information sent by the base station, where the response information carries location information of a resource obtained after scheduling is performed for the first terminal and/or information about transmit power for sending a data packet.

According to the method and apparatus, provided in the embodiments of the present disclosure, for device-to-device inter-cell interference coordination, in the embodiments of the present disclosure, a terminal is used as a detection terminal, and the detection terminal detects a resource configured by a base station or a current D2D data transmission resource, to obtain resource usage information, and reports the resource usage information to the base station; the base station can accurately notify a resource usage status based on the resource usage information reported by the detection terminal, and further adjust, in a timely manner, a D2D data transmission mode for a second terminal using the resource location, thereby reducing interference on a D2D link of a terminal in a cell in which the terminal is located, and effectively improving suppression on inter-cell interference on the D2D link.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

Figure 1:
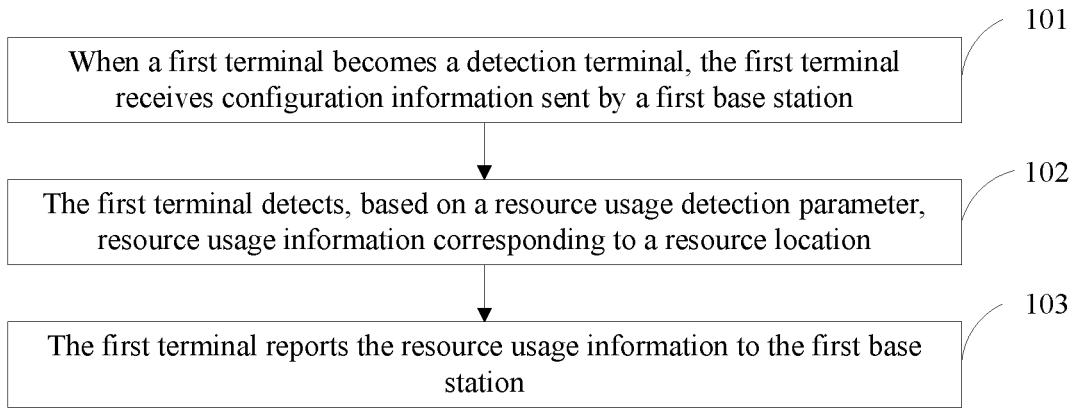
FIG. 1 is a method flowchart of a method for device-to-device inter-cell interference coordination according to the present disclosure.

An embodiment of the present disclosure provides a method for device-to-device inter-cell interference coordination. As shown in FIG. 1, the method includes the following steps.

101. When the first terminal becomes a detection terminal, the first terminal receives configuration information sent by a first base station.

The configuration information includes a resource usage detection parameter. The detection terminal is configured to measure a resource usage level on a D2D link corresponding to the detection terminal. The resource usage detection parameter is used to configure a resource usage detection manner for the first terminal.

It should be noted that the resource usage detection parameter further includes a manner of triggering reporting of the resource usage information, a resource usage detection threshold, and a resource usage statistics manner; the resource usage detection threshold includes at least one of an interference power threshold, an interference data packet percentage threshold, a receive power threshold, or a received data packet percentage threshold; the manner of triggering reporting of the resource usage information includes periodic triggering and event triggering; and when the manner of triggering reporting of the resource usage information is the periodic triggering, the resource usage detection parameter further includes a reporting period. When the triggering manner is the event triggering, statistics are reported after the statistics amount exceeds the resource usage detection threshold. When the triggering manner is the periodic triggering, statistics are reported in each statistics period after the statistics amount exceeds the resource usage detection threshold.

Specifically, if the manner of triggering reporting of the resource usage information is the periodic triggering, the resource usage statistics manner may be the following information in a specified reporting period: interference power, interference frequency, a quantity of times of interference, interference duration, data receiving power, data packet receiving frequency, a quantity of times of receiving data packets, a percentage of a data packet receiving resource in all resources, and the like.

If the manner of triggering reporting of the resource usage information is the event triggering, the resource usage statistics manner should be an event in which statistics can be collected merely by using a data packet as a statistics granularity, and includes but is not limited to the following events: Receive power of a data packet that fails to be received exceeds a resource usage detection power threshold, or a quantity of data packets, in several data packets that are continuously received on a D2D link, that fail to be received is greater than the interference data packet threshold. The resource usage detection threshold is a threshold for detection that can be independently performed based on a single data packet or several continuous data packets, for example, an interference power threshold and a threshold of a quantity of interference times of a single data packet, a threshold of a quantity of data packets continuously lost due to interference, data receiving power, data packet receiving frequency, a quantity of times of receiving data packets, and a percentage of a data packet receiving resource in all resources. Examples are not listed one by one herein. When the resource usage level measured by the first terminal reaches the resource usage detection threshold, interference statistics reporting is triggered.

102. The first terminal detects, based on the resource usage detection parameter, resource usage information corresponding to a resource location.

The resource location is a resource location at which the first terminal currently performs D2D data transmission, or information about the resource location is carried in the configuration information.

103. The first terminal reports the resource usage information to the first base station.

The first terminal reports the resource usage information to the first base station, so that the first base station adjusts a D2D data transmission mode for the second terminal based on the resource usage information.

It should be noted that the adjusting a D2D data transmission mode for a second resource includes: re-allocating a resource and/or adjusting D2D data transmit power for the second terminal; or notifying the second terminal of an interference degree or a usage degree of a currently used resource, and instructing the second terminal to adjust a used transmission resource and/or transmit power based on the interference degree or the usage degree. The second terminal may also be the first terminal if the resource location at which the first terminal reports the resource usage information is a resource location used by the first terminal for D2D data transmission.

Specifically, the reported resource usage information may be a value with a size of 1 bit to 4 bits, to indicate an overall resource usage level of a detected resource. When the first terminal recognizes an identity of a cell or an operator from which interference comes, the first terminal may add a measured interference-cell identity (ID) or public land mobile network identity (PLMN ID) to the reported resource usage information. The resource usage information may be reported by using dedicated uplink signaling, such as RRC signaling on an LTE network; or may be reported by using a dedicated data packet, such as a data packet dedicated for a Media Access Control (MAC) communication edge (CE) on an LTE network; or the resource usage information may be carried in other signaling, for example, carried in a buffer status report (BSR). This is not limited herein.

It should be noted that the interference degree or the usage degree includes a resource usage parameter sequence, each parameter in the resource usage parameter sequence is corresponding to one of all the resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

It should be noted that, when it is determined that the first terminal no longer needs to serve as the detection terminal, the first terminal stops broadcasting, at the allocated resource location, a temporary identifier indicating that the first terminal serves as a detection terminal, and no longer performs resource usage detection and resource usage information reporting. A manner of determining that the first terminal no longer needs to serve as the detection terminal includes: It is detected that reference signal received power (RSRP) is higher than a preset threshold; it is detected that the first terminal is no longer at the resource location that requires interference detection; a time for switching to a neighboring cell is greater than a preset threshold; no data packet is received from a neighboring cell within a specific period of time; information about another detection terminal is detected; or the like. This is not limited herein.

In this embodiment of the present disclosure, a terminal is used as a detection terminal, and the detection terminal detects a resource configured by a base station or a current D2D data transmission resource, to obtain resource usage information, and reports the resource usage information to the base station; the base station can accurately notify a resource usage status based on the resource usage information reported by the detection terminal, and further adjust, in a timely manner, a D2D data transmission mode for the detection terminal or a second terminal using the resource location, thereby reducing interference on a D2D link of a terminal in a cell in which the terminal is located, and effectively improving suppression on inter-cell interference on the D2D link.

Figure 2:
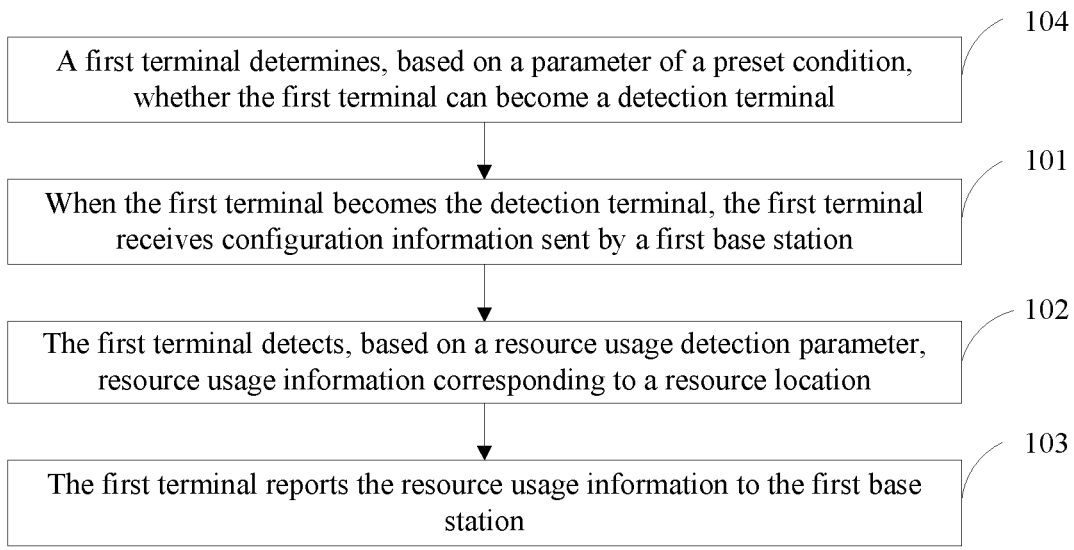
FIG. 2 is a method flowchart of another method for device-to-device inter-cell interference coordination according to the present disclosure.

In an implementation of this embodiment of the present disclosure, based on the method shown in FIG. 1, as shown in FIG. 2, step 104 may be performed before step 101.

104. The first terminal determines, based on a parameter of the preset condition, whether the first terminal can become the detection terminal.

The parameter of the preset condition is sent by the first base station by using broadcast information, or the parameter of the preset condition is preset by the first terminal. The broadcast information includes a first preset condition for becoming the detection terminal. The preset condition may be: The first terminal detects that an RSRP value or a reference signal received quality (RSRQ) value of the cell in which the first terminal is located is higher than a preset lower limit; the first terminal detects that an RSRP value or an RSRQ value of a neighboring cell is higher than a preset upper limit; the first terminal receives a data packet from a neighboring cell in a resource pool that is the same as that of the neighboring cell; no information about another detection terminal is received; or the like.

In this implementation, the base station broadcasts the preset condition for becoming the detection terminal, or the first terminal presets the preset condition for becoming the detection terminal, and the first terminal may determine, based on information measured by the first terminal, whether the first terminal can become the detection terminal.

Figure 3:
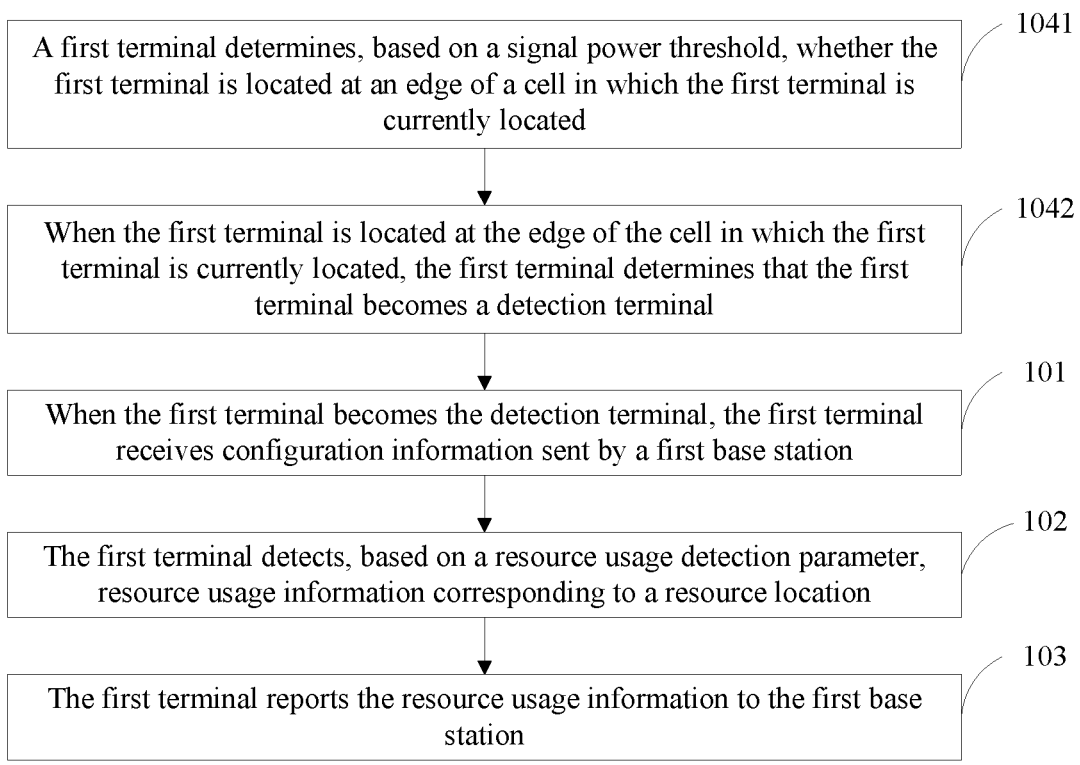
FIG. 3 is a method flowchart of another method for device-to-device inter-cell interference coordination according to the present disclosure.

In another implementation of this embodiment of the present disclosure, the preset condition includes a first preset condition, the first preset condition includes a condition for determining that the first terminal is located at an edge of a cell in which the first terminal is currently located, and a parameter of the first preset condition includes a signal power threshold used by the first terminal to receive a signal of the first base station. Based on the method shown in FIG. 2, as shown in FIG. 3, step 104 may specifically include step 1041 and step 1042.

1041. The first terminal determines, based on the signal power threshold, whether the first terminal is located at an edge of a cell in which the first terminal is currently located.

1042. When the first terminal is located at the edge of the cell in which the first terminal is currently located, the first terminal determines that the first terminal becomes the detection terminal.

It should be noted that the first terminal may alternatively determine whether RSRP, RSRQ, or the like of the first terminal reaches a preset threshold, to determine whether the first terminal is located at the edge of the cell in which the first terminal is currently located; or the first terminal determines, based on a cell ID list of a neighboring cell and whether an RSRP or RSRQ value of each neighboring cell reaches a second preset upper limit, to determine whether the first terminal is located at the edge of the cell in which the first terminal is currently located. This is not limited herein.

There is inter-cell interference in an edge area of a cell. Therefore, in this implementation, only when the first terminal is located at the cell edge, the first terminal determines whether the first terminal can become the detection terminal, thereby simplifying a processing procedure of terminal data.

Figure 4:
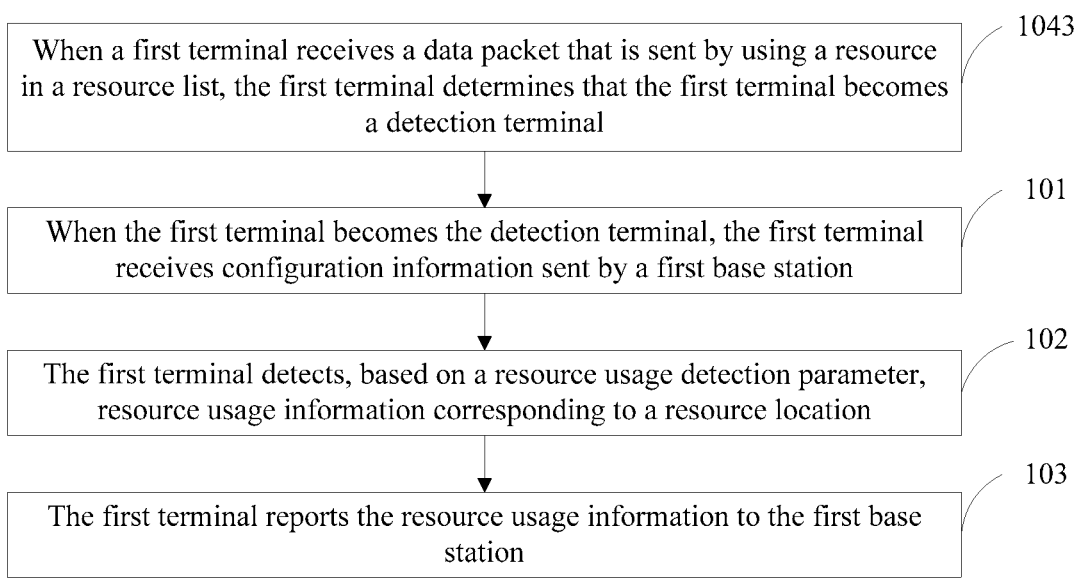
FIG. 4 is a method flowchart of another method for device-to-device inter-cell interference coordination according to the present disclosure.

In another implementation of this embodiment of the present disclosure, the preset condition includes a second preset condition, the second preset condition includes whether the first terminal receives a data packet that is sent by using a resource in a resource list, a parameter of the second preset condition includes that the resource list is a resource list in which there is an orthogonal relationship between a resource frequency of a resource of a second base station and a resource frequency of the first base station, the second base station is corresponding to a neighboring cell of a cell corresponding to the first base station, and the resource list is sent by the first base station in a broadcast mode. Based on the method shown in FIG. 2, as shown in FIG. 4, step 104 may specifically include step 1043.

1043. When the first terminal receives a data packet that is sent by using a resource in the resource list, the first terminal determines that the first terminal becomes the detection terminal.

Figure 5:
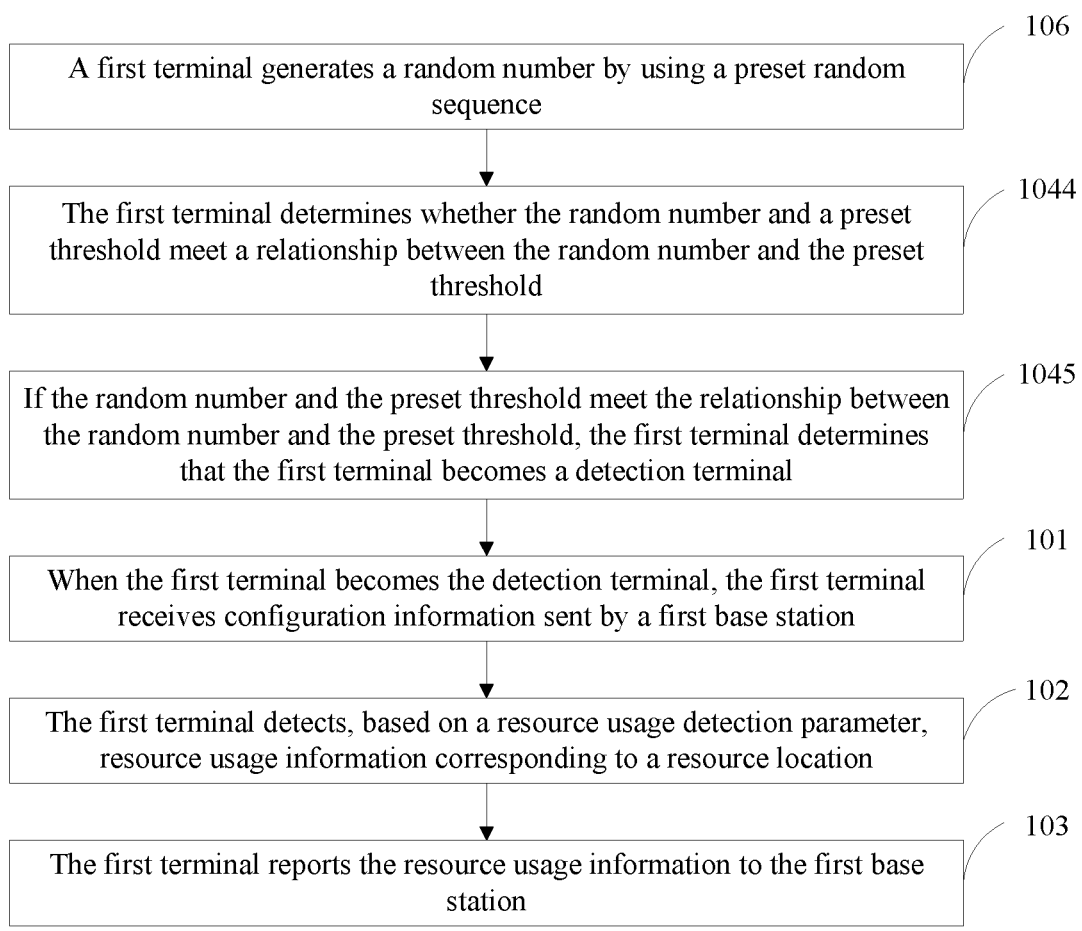
FIG. 5 is a method flowchart of another method for device-to-device inter-cell interference coordination according to the present disclosure.

In another implementation of this embodiment of the present disclosure, the preset condition includes a third preset condition, a parameter of the third preset condition includes a preset threshold and a relationship between a random number and the preset threshold, and the random number is generated by the first terminal. Based on the method shown in FIG. 2, as shown in FIG. 5, step 106 is performed before step 104, and step 104 may specifically include step 1044 and step 1045.

106. The first terminal generates the random number by using a preset random sequence.

1044. The first terminal determines whether the random number and the preset threshold meet a relationship between the random number and the preset threshold.

The relationship between the random number and the preset threshold may be: The random number is greater than the preset threshold, the random number is less than the preset threshold, or the like.

1045. If the random number and the preset threshold meet the relationship between the random number and the preset threshold, the first terminal determines that the first terminal becomes the detection terminal.

In this implementation, a quantity of detection terminals may be further reduced, and a data processing procedure may be further simplified.

It should be noted that, when the resource location is the resource location at which the first terminal currently performs D2D data transmission, the first terminal may determine, based on the preset condition, whether the first terminal can become the detection terminal, that is, the first terminal determines, based on the configuration information broadcast by the base station and the preset condition of the detection terminal, whether to become the detection terminal. In this case, the configuration information in step 101 may be sent to the first terminal in a broadcast mode. After the first terminal determines that the first terminal can become the detection terminal, the first terminal can become the detection terminal without a need to notify the base station for permission. This significantly reduces signaling overheads of configuring the detection terminal by the base station. In addition, each detection terminal detects only a transmission resource usage status of the detection terminal. Each terminal does not need to inform another terminal of a detection capability of the terminal, thereby reducing overheads of detecting a resource usage status. The first terminal detects only the resource location at which the first terminal currently performs D2D data transmission, and subsequently reports the resource usage information corresponding to the resource location at which the first terminal currently performs D2D data transmission. The base station may adjust a D2D data transmission mode for the first terminal based on the information reported by the first terminal. A specific adjustment process is the same as a data processing procedure shown in FIG. 21 to FIG. 26 of the following embodiments.

Figure 6:
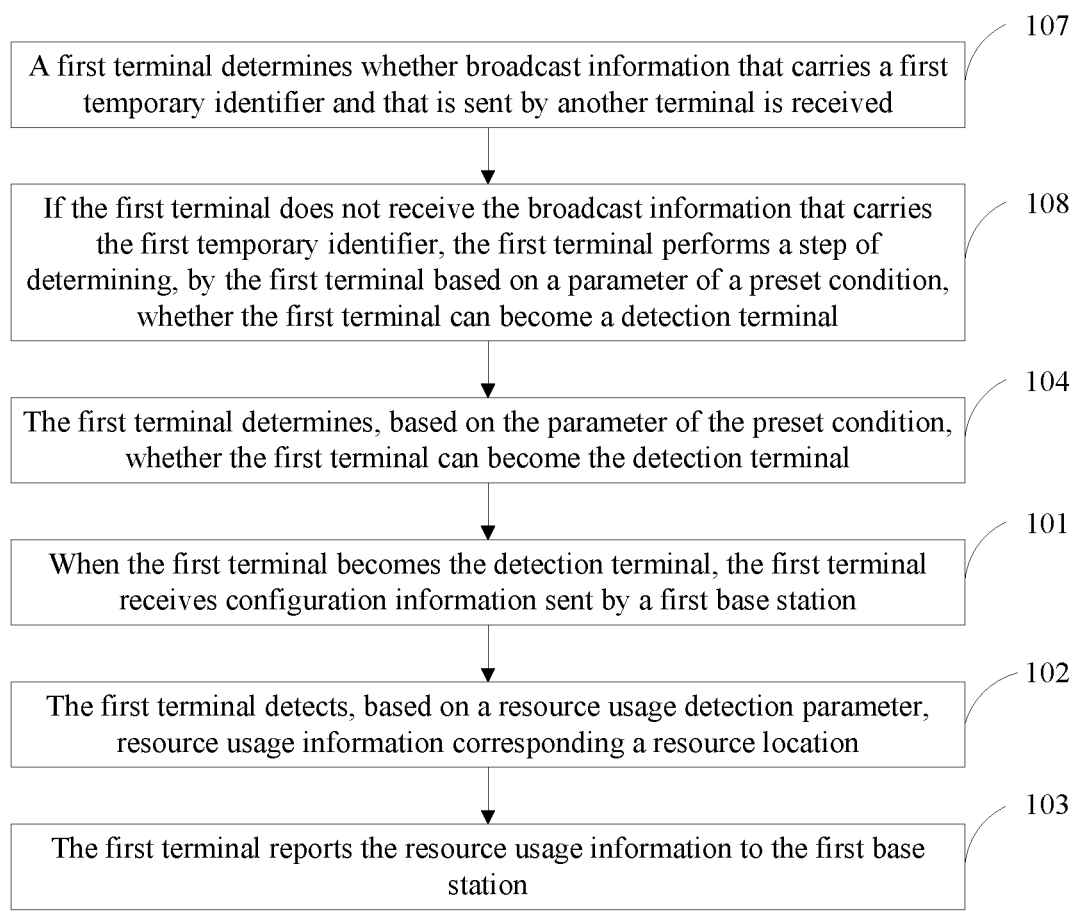
FIG. 6 is a method flowchart of another method for device-to-device inter-cell interference coordination according to the present disclosure.

In another implementation of this embodiment of the present disclosure, based on the method shown in FIG. 2, as shown in FIG. 6, step 107 and step 108 are performed before step 104.

107. The first terminal determines whether broadcast information that carries a first temporary identifier and that is sent by another terminal is received.

The first temporary identifier is added, after it is determined that the another terminal is the detection terminal, to the broadcast information sent by the another terminal.

108. If the first terminal does not receive the broadcast information that carries the first temporary identifier, the first terminal performs the step of determining, by the first terminal based on a parameter of the preset condition, whether the first terminal can become the detection terminal.

If the first terminal receives a temporary identifier that is added to a sent broadcast message by another detection terminal, it indicates that the first terminal is in a detection area of the another detection terminal. In this case, the first terminal does not need to become the detection terminal, because there is already a detection terminal in an area in which the first terminal is located, and a surrounding user can avoid interference depending on resource usage detection performed by the detection terminal. If the first terminal does not receive a temporary identifier that is added to a sent broadcast message by another detection terminal, it indicates that there is no other detection terminal in an area in which the first terminal is located, and the first terminal can become the detection terminal.

In this implementation, the first terminal may determine whether the first terminal receives the temporary identifier, to determine whether there is already a detection terminal in the area in which the first terminal is located. If there is already a detection terminal, the first terminal does not need to further serve as a detection terminal to detect interference, thereby simplifying a data processing procedure.

Figure 7:
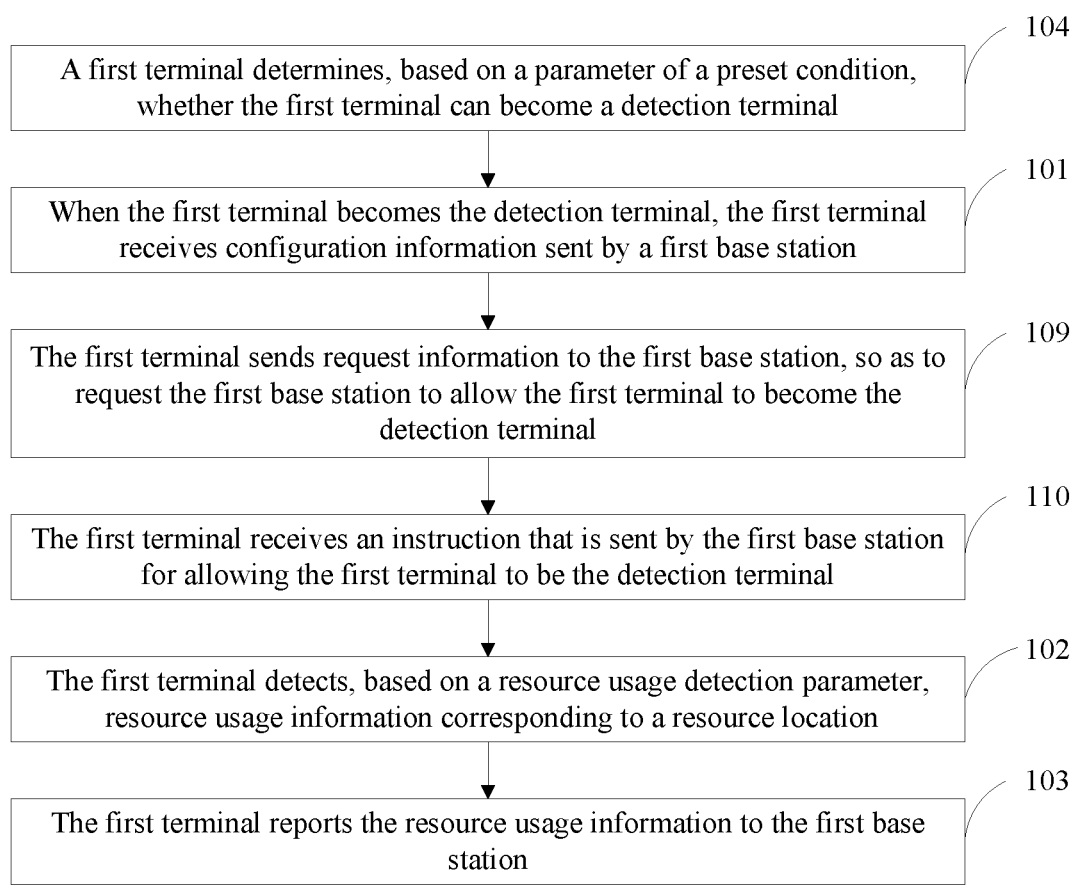
FIG. 7 is a method flowchart of another method for device-to-device inter-cell interference coordination according to the present disclosure.

In another implementation of this embodiment of the present disclosure, based on the method shown in FIG. 2, as shown in FIG. 7, step 109 and step 110 are performed before step 102.

109. The first terminal sends request information to the first base station, so as to request the first base station to allow the first terminal to become the detection terminal.

The request information may carry the following information: a measured cell RSRP value; an ID of a neighboring cell or a PLMN in which a measured RSRP value is higher than a preset threshold, and the measured RSRP value; an ID of a neighboring cell or a PLMN from which a data packet of the neighboring cell is received; or the like.

110. The first terminal receives an instruction that is sent by the first base station for allowing the first terminal to be the detection terminal.

In this implementation, when the first terminal meets the condition for becoming the detection terminal, the first terminal sends the request information to the base station, and can become the detection terminal only after the base station provides an acknowledgment. According to this step, the base station controls a quantity and distribution of detection terminals, to avoid an excessively large quantity of detection terminals and uneven distribution of detection terminals. This ensures accurate resource usage detection, and also reduces a quantity of detection terminals and simplifies a data processing procedure.

In another implementation of this embodiment of the present disclosure, the configuration information further includes a second temporary identifier configured by the first base station for the first terminal. Based on the method shown in FIG. 1, step 111 is performed.

111. The first terminal adds the second temporary identifier to a data packet to be sent by the first terminal.

The first terminal adds the second temporary identifier to the data packet to be sent by the first terminal, so that the second terminal can detect the temporary identifier.

In another implementation of this embodiment of the present disclosure, the configuration information further includes a second temporary identifier configured by the first base station for the first terminal and a broadcast resource location at which the second temporary identifier is broadcast. Based on the method shown in FIG. 1, the following step may be further performed according to the method embodiment in this embodiment of the present disclosure.

112. The first terminal periodically broadcasts the second temporary identifier at the broadcast resource location.

Information about the broadcast resource location may be a D2D transmission resource location, and includes but is not limited to the following information: a frequency-domain location, a time-domain location, a used frequency hopping manner, and a transmission ID period.

In the implementations shown in step 111 and step 112, the second terminal in a detection area of the detection terminal can obtain the temporary identifier of the detection terminal and report the temporary identifier to the base station, so that the base station can accurately determine an interference degree or a usage degree at a location at which the second terminal is located, and perform scheduling for the second terminal at the resource location based on the interference degree or the usage degree.

Figure 8:
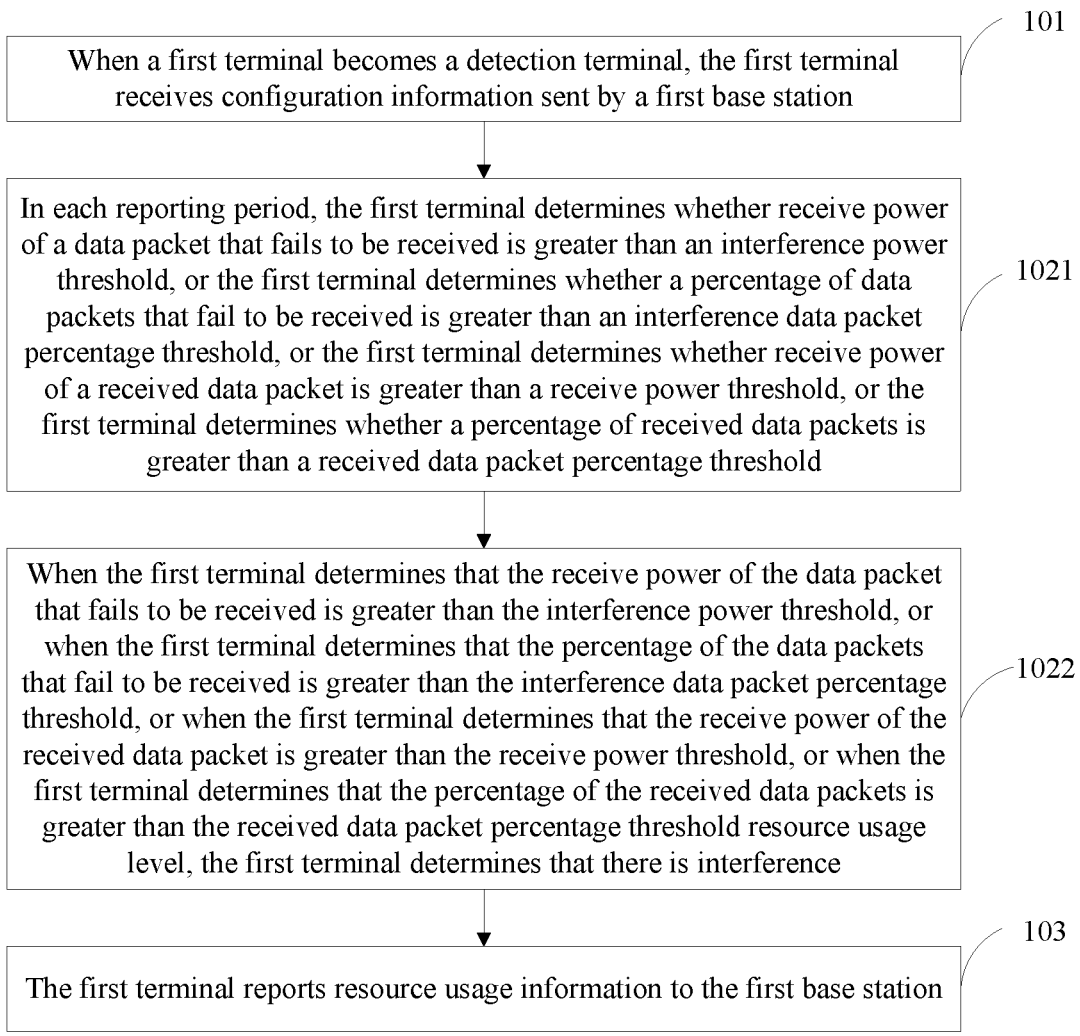
FIG. 8 is a method flowchart of another method for device-to-device inter-cell interference coordination according to the present disclosure.

In another implementation of this embodiment of the present disclosure, when the manner of triggering reporting of the resource usage information is the periodic triggering, based on FIG. 1, as shown in FIG. 8, step 102 specifically includes the following steps.

1021. In each reporting period, the first terminal determines whether receive power of a data packet that fails to be received is greater than the interference power threshold, or the first terminal determines whether a percentage of data packets that fail to be received is greater than the interference data packet percentage threshold, or the first terminal determines whether receive power of a received data packet is greater than the receive power threshold, or the first terminal determines whether a percentage of received data packets is greater than the received data packet percentage threshold.

1022. When the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, the first terminal determines that there is interference.

Figure 9:
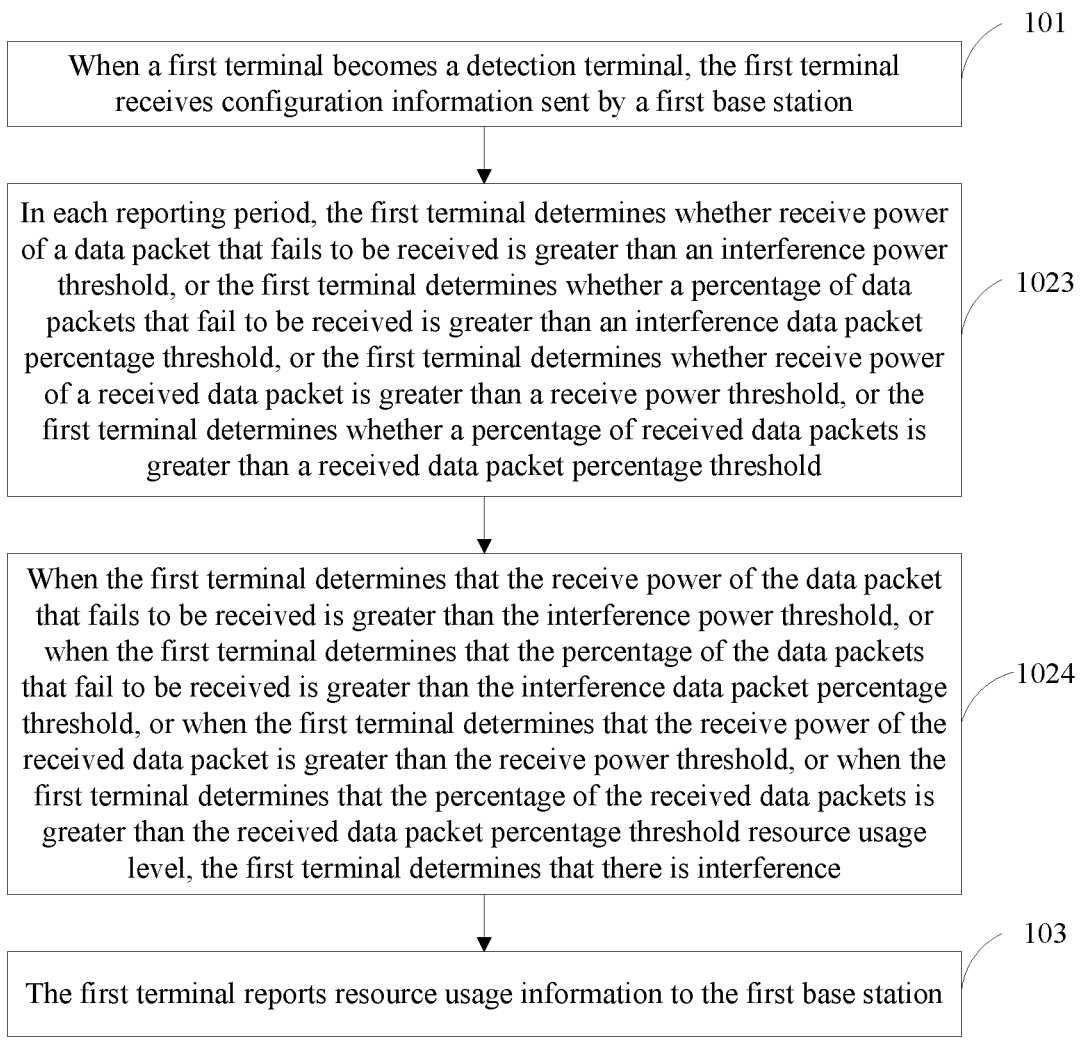
FIG. 9 is a method flowchart of another method for device-to-device inter-cell interference coordination according to the present disclosure.

In another implementation of this embodiment of the present disclosure, when the manner of triggering reporting of the resource usage information is the periodic triggering, based on FIG. 1, as shown in FIG. 9, step 102 specifically includes the following steps.

1023. In each reporting period, the first terminal determines whether receive power of a data packet that fails to be received is greater than the interference power threshold, or the first terminal determines whether a percentage of data packets that fail to be received is greater than the interference data packet percentage threshold, or the first terminal determines whether receive power of a received data packet is greater than the receive power threshold, or the first terminal determines whether a percentage of received data packets is greater than the received data packet percentage threshold.

1024. When the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, the first terminal determines that there is interference.

Figure 10:
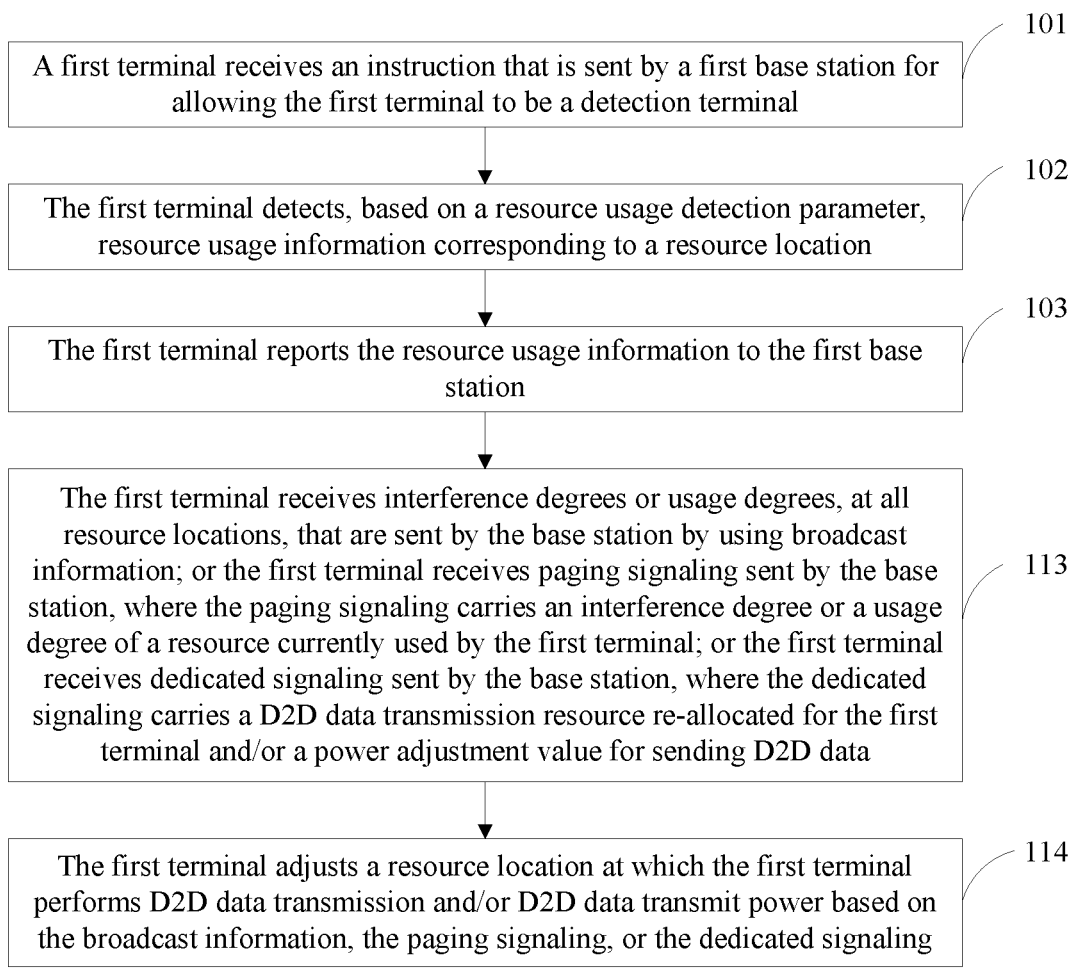
FIG. 10 is a method flowchart of another method for device-to-device inter-cell interference coordination according to the present disclosure.

In another implementation of this embodiment of the present disclosure, when the resource location is the resource location at which the first terminal currently performs D2D data transmission, based on the method shown in FIG. 1, as shown in FIG. 10, the following steps may be further performed after step 103.

113. The first terminal receives interference degrees or usage degrees, at all resource locations, that are sent by the base station by using broadcast information; or the first terminal receives paging signaling sent by the base station, where the paging signaling carries an interference degree or a usage degree of a resource currently used by the first terminal; or the first terminal receives dedicated signaling sent by the base station, where the dedicated signaling carries a D2D data transmission resource re-allocated for the first terminal and/or a power adjustment value for sending D2D data.

114. The first terminal adjusts a resource location at which the first terminal performs D2D data transmission and/or D2D data transmit power based on the broadcast information, the paging signaling, or the dedicated signaling.

Figure 11:
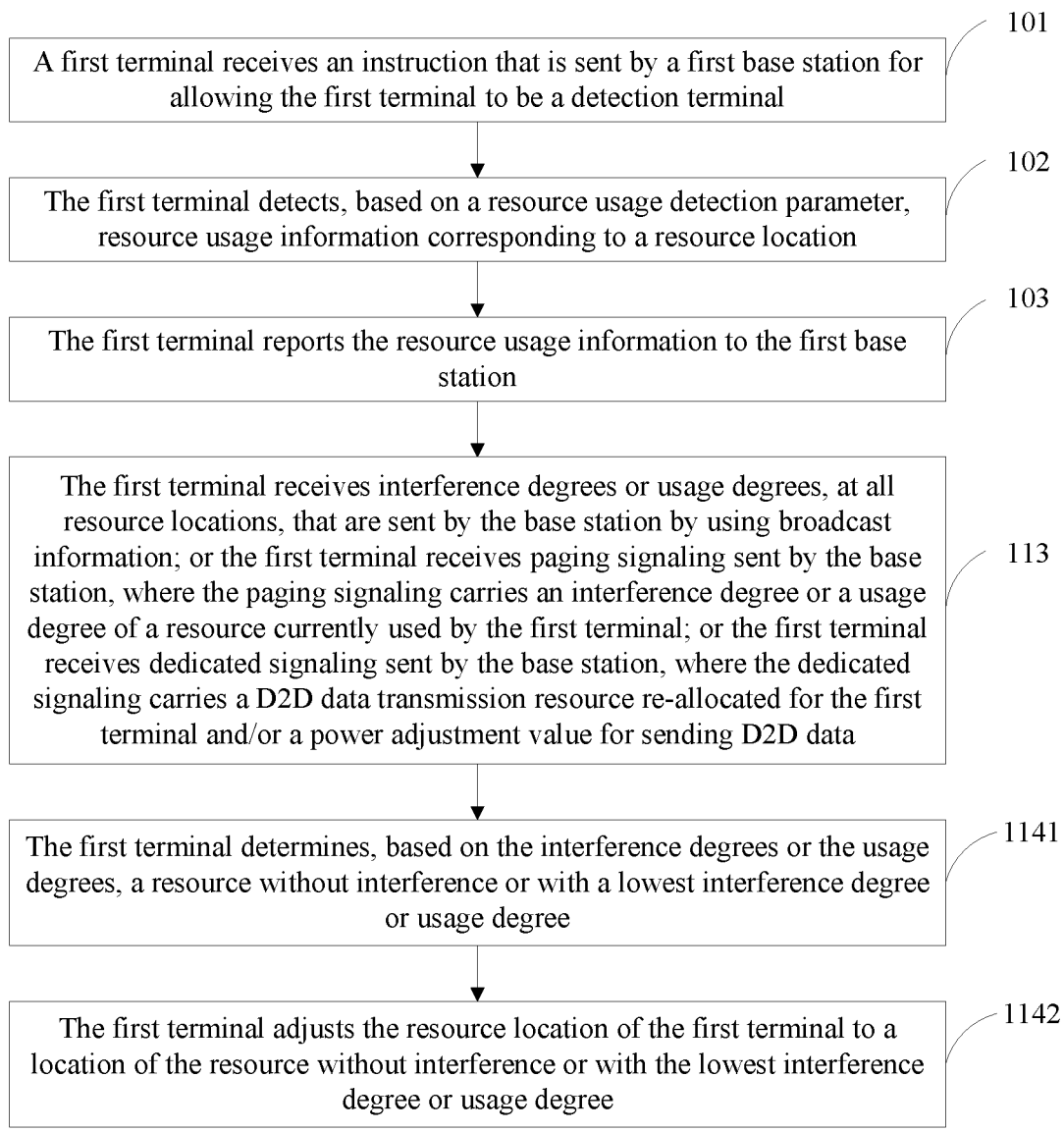
FIG. 11 is a method flowchart of another method for device-to-device inter-cell interference coordination according to the present disclosure.

In another implementation of this embodiment of the present disclosure, based on the method shown in FIG. 10, as shown in FIG. 11, step 114 specifically includes the following steps.

1141. The first terminal determines, based on the interference degrees or the usage degrees, a resource without interference or with a lowest interference degree or usage degree.

1142. The first terminal adjusts the resource location of the first terminal to a location of the resource without interference or with the lowest interference degree or usage degree.

Figure 12:
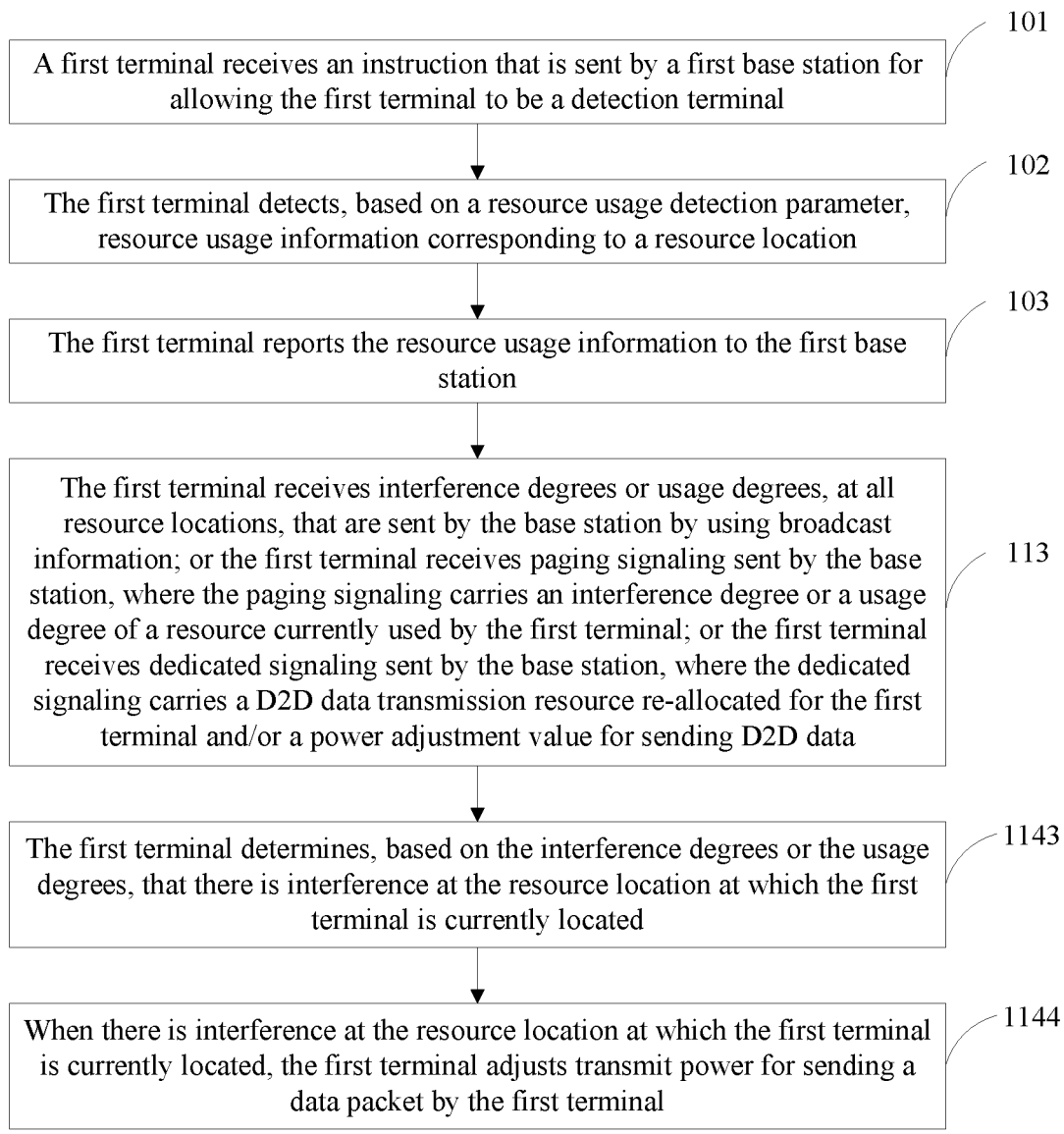
FIG. 12 is a method flowchart of another method for device-to-device inter-cell interference coordination according to the present disclosure.
Figure 13:
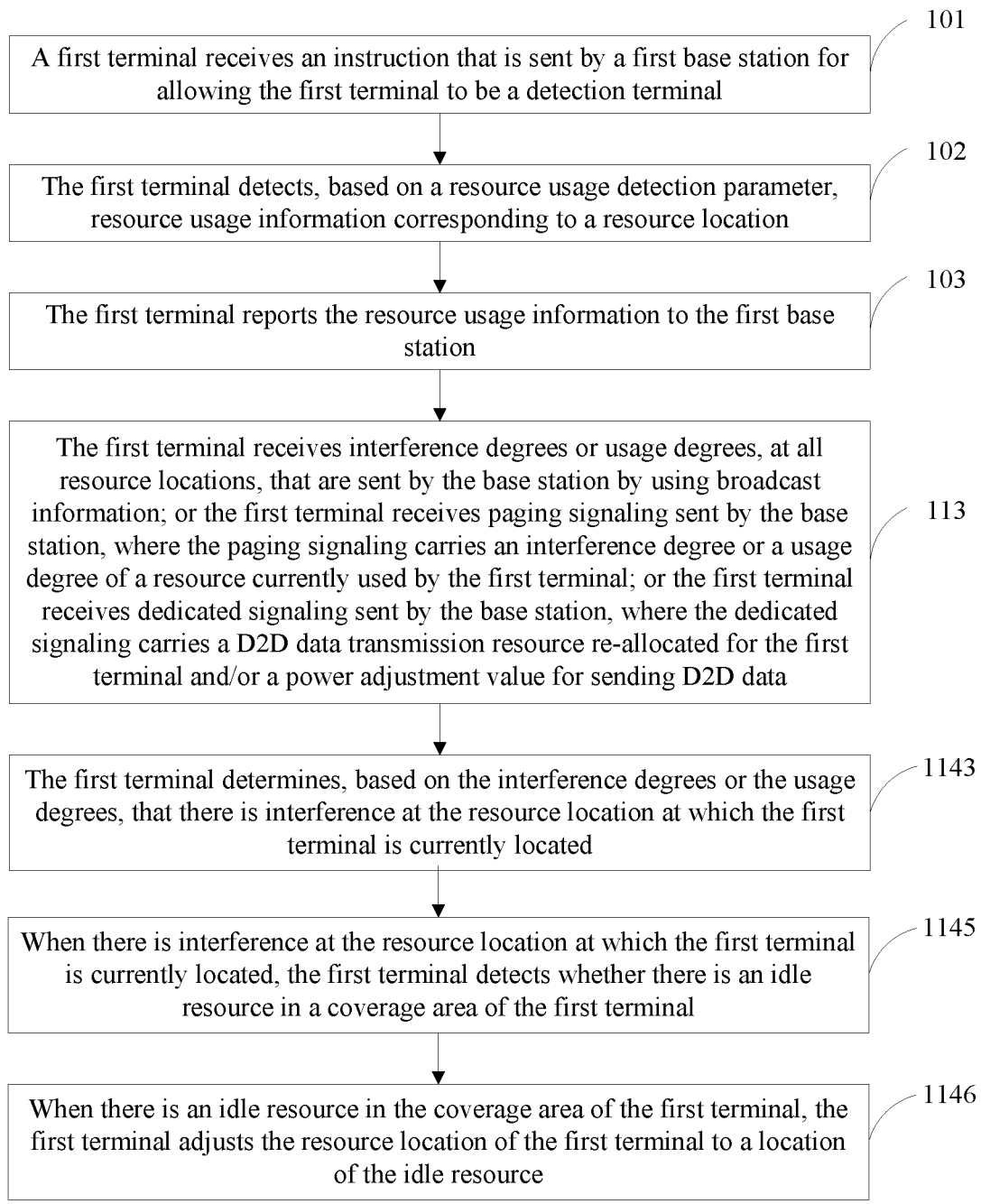
FIG. 13 is a method flowchart of another method for device-to-device inter-cell interference coordination according to the present disclosure.
Figure 14:
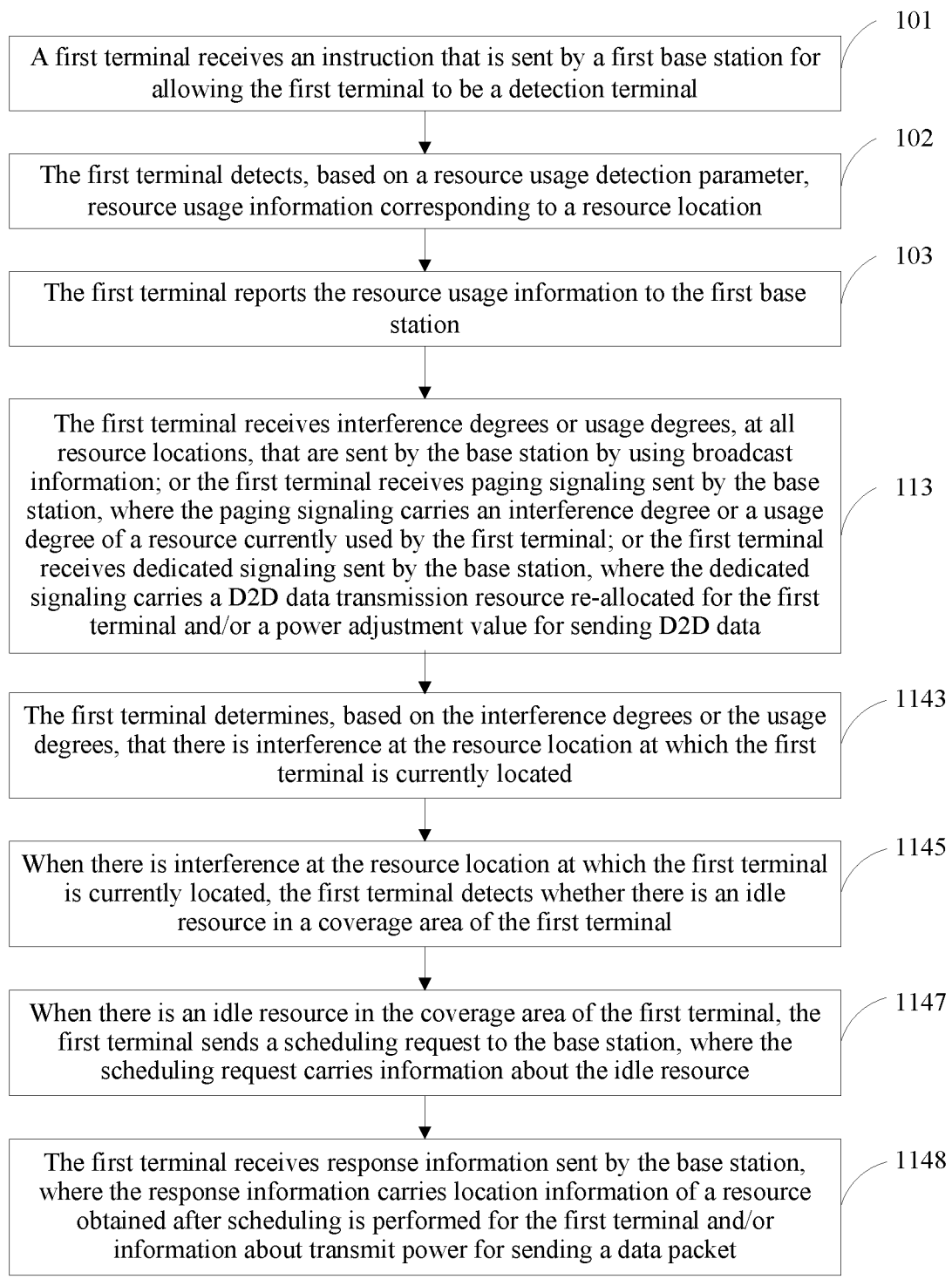
FIG. 14 is a method flowchart of another method for device-to-device inter-cell interference coordination according to the present disclosure.

In another implementation of this embodiment of the present disclosure, based on the method shown in FIG. 10, as shown in FIG. 12, FIG. 13, and FIG. 14, step 114 specifically includes the following steps.

1143. The first terminal determines, based on the interference degrees or the usage degrees, that there is interference at the resource location at which the first terminal is currently located.

Step 1144 or step 1145 is performed after step 1143.

1144. When there is interference at the resource location at which the first terminal is currently located, the first terminal adjusts transmit power for sending a data packet by the first terminal.

1145. When there is interference at the resource location at which the first terminal is currently located, the first terminal detects whether there is an idle resource in a coverage area of the first terminal.

Step 1146 or step 1147 is performed after step 1145.

1146. When there is an idle resource in the coverage area of the first terminal, the first terminal adjusts the resource location of the first terminal to a location of the idle resource.

1147. When there is an idle resource in the coverage area of the first terminal, the first terminal sends a scheduling request to the base station, where the scheduling request carries information about the idle resource.

1148. The first terminal receives response information sent by the base station, where the response information carries location information of a resource re-allocated for the first terminal and/or information about transmit power for sending a data packet.

Figure 15:
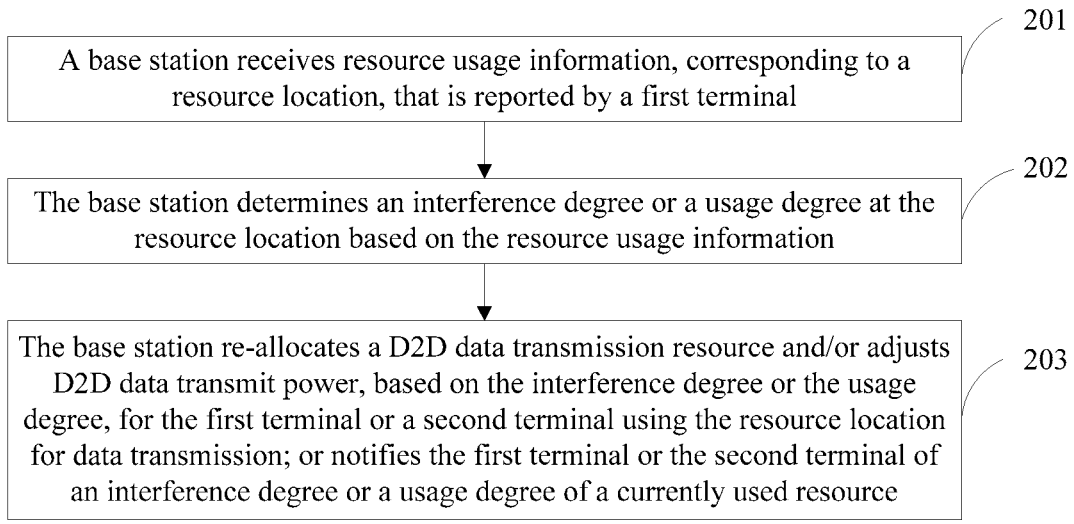
FIG. 15 is a method flowchart of another method for device-to-device inter-cell interference coordination according to the present disclosure.

Another embodiment of the present disclosure provides a method for device-to-device inter-cell interference coordination. As shown in FIG. 15, the method includes the following steps.

201. A base station receives resource usage information, corresponding to a resource location, that is reported by a first terminal.

The resource location is a resource location at which the first terminal currently performs D2D data transmission, or information about the resource location is carried in the configuration information. The resource usage information is sent after the first terminal becomes a detection terminal.

202. The base station determines an interference degree or a usage degree at the resource location based on the resource usage information.

203. The base station re-allocates a D2D data transmission resource and/or adjusts D2D data transmit power, based on the interference degree or the usage degree, for the first terminal or a second terminal using the resource location for data transmission; or notifies the first terminal or the second terminal of an interference degree or a usage degree of a currently used resource.

It should be noted that the resource usage detection parameter further includes a manner of triggering reporting of the resource usage information, a resource usage detection threshold, and an interference statistics manner; the resource usage detection threshold includes at least one of an interference power threshold, an interference data packet percentage threshold, a receive power threshold, or a received data packet percentage threshold; the manner of triggering reporting of the resource usage information includes periodic triggering and event triggering; and when the manner of triggering reporting of the resource usage information is the periodic triggering, the resource usage detection parameter further includes a reporting period.

In this embodiment of the present disclosure, a terminal is used as a detection terminal, and the detection terminal detects a resource configured by a base station or a current D2D data transmission resource, to obtain resource usage information, and reports the resource usage information to the base station; the base station can accurately notify a resource usage status based on the resource usage information reported by the detection terminal, and further adjust, in a timely manner, a D2D data transmission mode for the detection terminal or a second terminal using the resource location, thereby reducing interference on a D2D link of a terminal in a cell in which the terminal is located, and effectively improving suppression on inter-cell interference on the D2D link.

Figure 16:
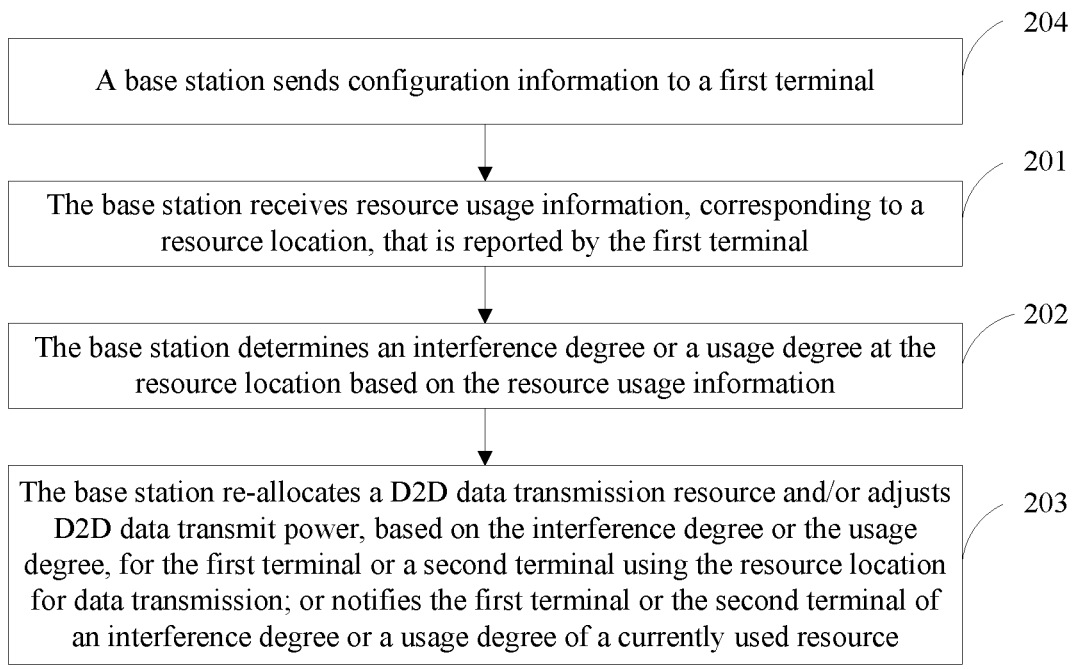
FIG. 16 is a method flowchart of another method for device-to-device inter-cell interference coordination according to the present disclosure.

In an implementation of this embodiment of the present disclosure, based on the method shown in FIG. 15, as shown in FIG. 16, the following step may be further performed before step 201.

204. The base station sends configuration information to the first terminal.

The configuration information includes the resource usage detection parameter. The detection terminal is configured to measure a resource usage level on a D2D link corresponding to the detection terminal. The resource usage detection parameter is used to configure a resource usage detection manner for the first terminal.

Figure 17:
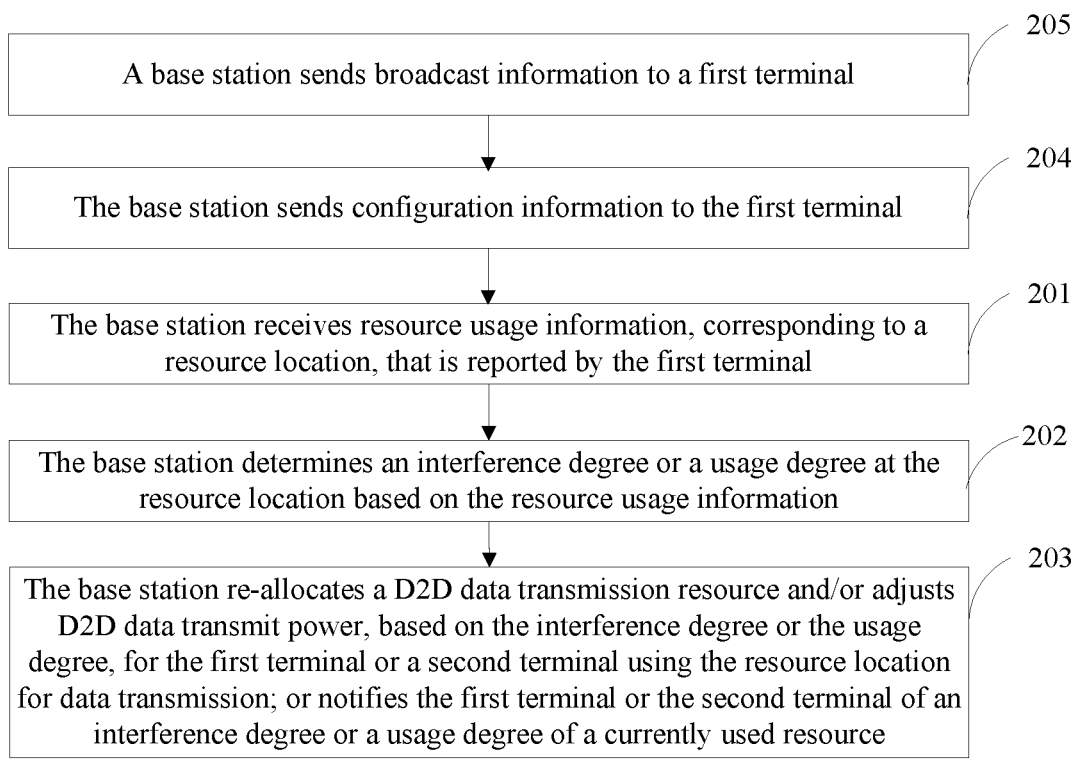
FIG. 17 is a method flowchart of another method for device-to-device inter-cell interference coordination according to the present disclosure.

In an implementation of this embodiment of the present disclosure, based on the method shown in FIG. 16, as shown in FIG. 17, the following step may be further performed before step 204.

205. The base station sends broadcast information to the first terminal.

The broadcast information includes a parameter of a preset condition for becoming the detection terminal, so that the first terminal determines, based on the preset condition, whether the first terminal becomes the detection terminal. The parameter of the preset condition includes at least one of the following: a signal power threshold used by the first terminal to receive a signal of the first base station; a resource list in which there is an orthogonal relationship between a resource frequency of a resource of a neighboring base station and a resource frequency of the first base station, where the neighboring base station is corresponding to a neighboring cell of a cell corresponding to the first base station; or a preset threshold, used by the first terminal to determine, based on a relationship between a generated random number and the preset threshold, whether the first terminal becomes the detection terminal.

In this implementation, the base station broadcasts the parameter of the preset condition for becoming the detection terminal; the first terminal may determine, based on information measured by the first terminal, whether the first terminal can become the detection terminal; and when the first terminal determines that the first terminal can become the detection terminal, the first terminal can become the detection terminal without a need to interact with the base station.

Figure 18:
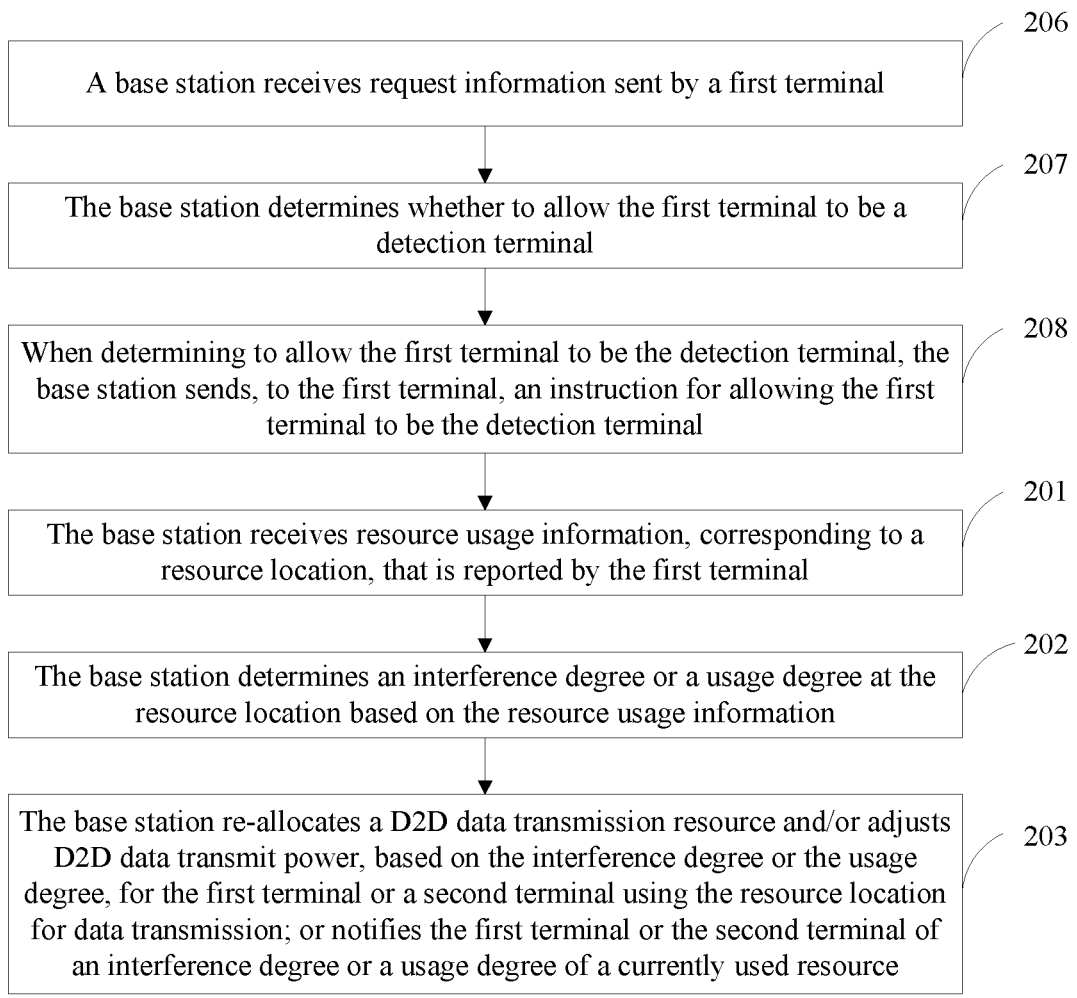
FIG. 18 is a method flowchart of another method for device-to-device inter-cell interference coordination according to the present disclosure.

In an implementation of this embodiment of the present disclosure, based on the method shown in FIG. 15, as shown in FIG. 18, the following steps may be further performed before step 201.

206. The base station receives request information sent by the first terminal.

The request information is used to request the base station to allow the first terminal to be the detection terminal.

207. The base station determines whether to allow the first terminal to be a detection terminal.

The base station may determine, based on a channel quality indicator (CQI), reference signal received quality (RSRP), and a timing advance (TA) that are reported by a terminal in a cell, location information reported by a serving cell or UE existing before handover, or the like, whether the terminal is located at a cell edge. When the terminal is located at the cell edge, the base station determines whether data sent by the terminal, such as scheduling request (SR) information, buffer status report (BSR) information, or MAC data, carries a temporary identifier of another detection terminal. When the data sent by the terminal does not carry a temporary identifier of another detection terminal, the base station determines that the terminal is not in a coverage area of another detection terminal. In this case, the terminal may be determined as a detection terminal for detecting D2D link resource usage information for UE at the cell edge and around the terminal. Then, the base station sends, to the terminal, an instruction indicating that the first terminal is a detection terminal.

208. When determining to allow the first terminal to be the detection terminal, the base station sends, to the first terminal, an instruction for allowing the first terminal to be the detection terminal.

It should be noted that the instruction for allowing the first terminal to be the detection terminal carries a temporary identifier allocated by the base station to the first terminal, or a size of the instruction for allowing the first terminal to be the detection terminal is 1 bit.

In this implementation, when the first terminal determines that the first terminal can become a detection terminal, the base station receives the request information sent by the first terminal, and then, the base station determines, based on a quantity and a distribution status of detection terminals in a cell, whether to allow the first terminal to be the detection terminal. This can avoid repeated detection caused by an excessive quantity or uneven distribution of detection terminals.

Figure 19:
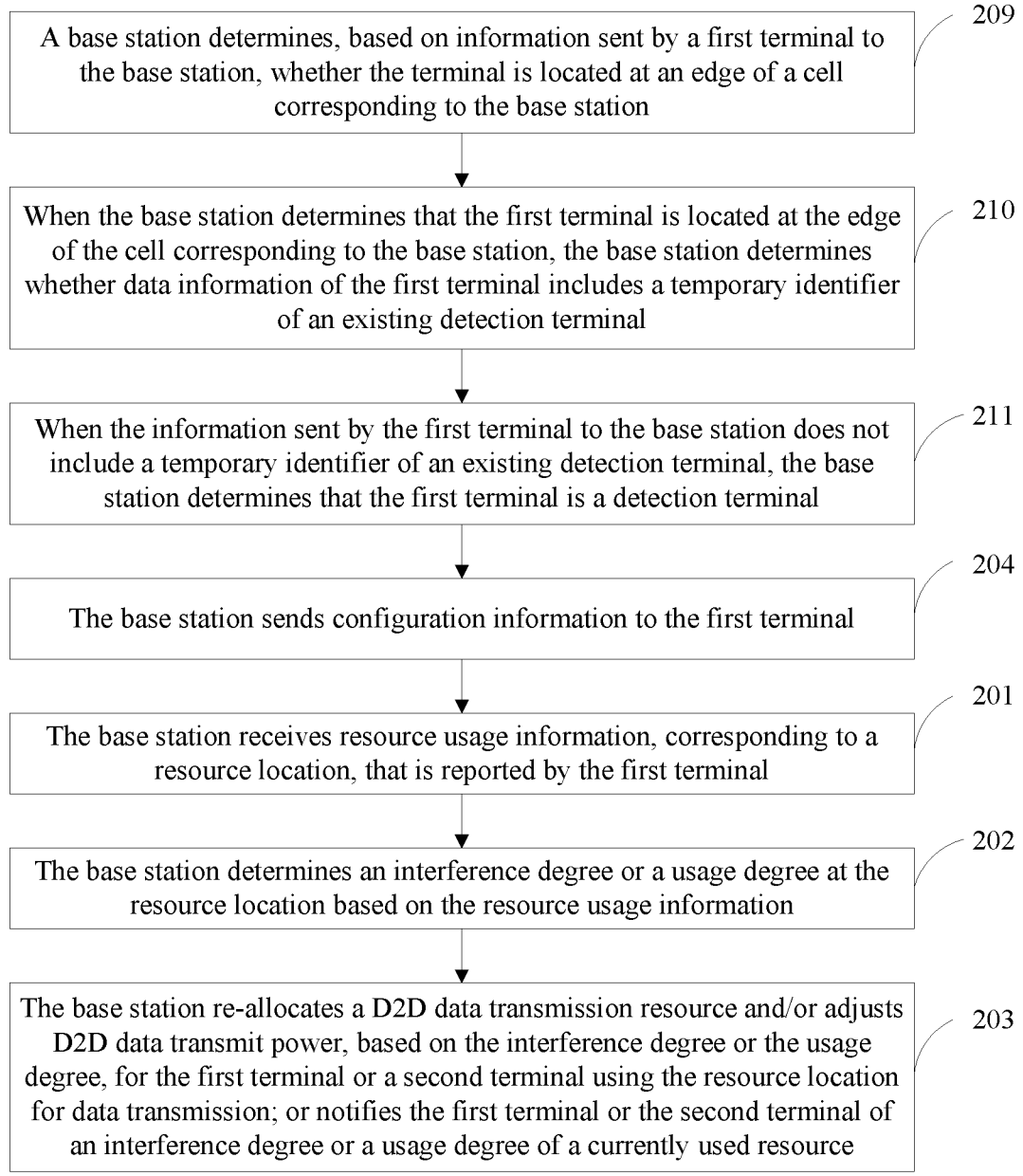
FIG. 19 is a method flowchart of another method for device-to-device inter-cell interference coordination according to the present disclosure.

In another implementation of this embodiment of the present disclosure, based on the method shown in FIG. 16, as shown in FIG. 19, the following steps may be further performed before step 204.

209. The base station determines, based on the information sent by the first terminal to the base station, whether the terminal is located at an edge of a cell corresponding to the base station.

210. When the base station determines that the first terminal is located at the edge of the cell corresponding to the base station, the base station determines whether data information of the first terminal includes a temporary identifier of an existing detection terminal.

211. When the information sent by the first terminal to the base station does not include a temporary identifier of an existing detection terminal, the base station determines that the first terminal is a detection terminal.

There is inter-cell interference in an edge area of a cell. Therefore, in this implementation, only when the first terminal is located at the cell edge, the base station allows the first terminal to become the detection terminal. Whether the data information of the first terminal includes a temporary identifier of an existing detection terminal indicates that the first terminal is in a detection area of another detection terminal, that is, there is already another detection terminal at the resource location at which the first terminal is located, and the first terminal does not need to perform resource usage detection. Therefore, when the data information of the first terminal does not include a temporary identifier of an existing detection terminal, the base station performs the step of sending configuration information to the first terminal that is determined as a detection terminal. This avoids repeated resource usage detection among detection terminals, and simplifies a data processing procedure.

Figure 20:
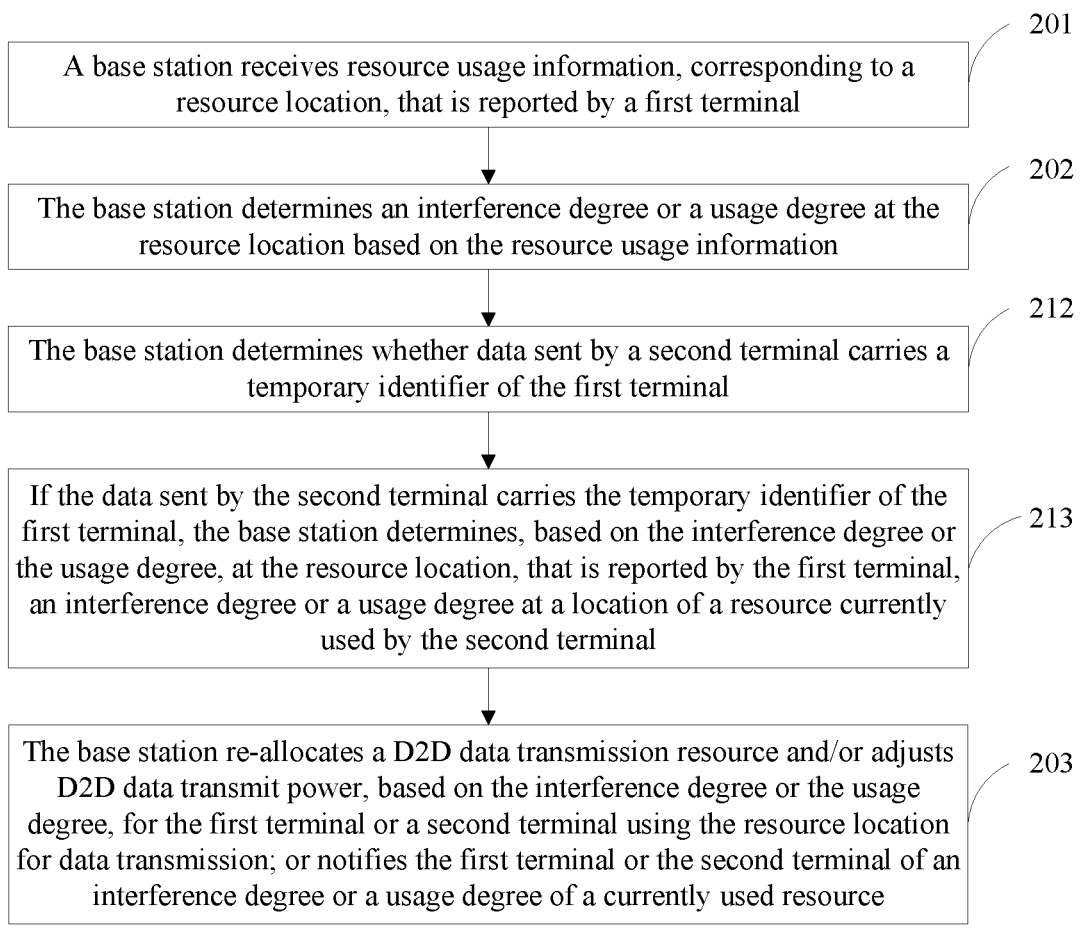
FIG. 20 is a method flowchart of another method for device-to-device inter-cell interference coordination according to the present disclosure.

In another implementation of this embodiment of the present disclosure, based on the method shown in FIG. 15, as shown in FIG. 20, the following steps may be further performed before step 203.

212. The base station determines whether data sent by the second terminal carries a temporary identifier of the first terminal.

213. If the data sent by the second terminal carries the temporary identifier of the first terminal, the base station determines, based on the interference degree or the usage degree, at the resource location, that is reported by the first terminal, an interference degree or a usage degree at a location of a resource currently used by the second terminal.

In this embodiment of the present disclosure, the base station determines whether the data sent by the second terminal carries the temporary identifier of the first terminal, and determines, based on the temporary identifier, that the second terminal is in a detection area of the first terminal, and further determines, based on the resource usage information reported by the first terminal, an interference status of the resource location at which the second terminal is located, so that the base station can perform scheduling for the second terminal more accurately.

Figure 21:
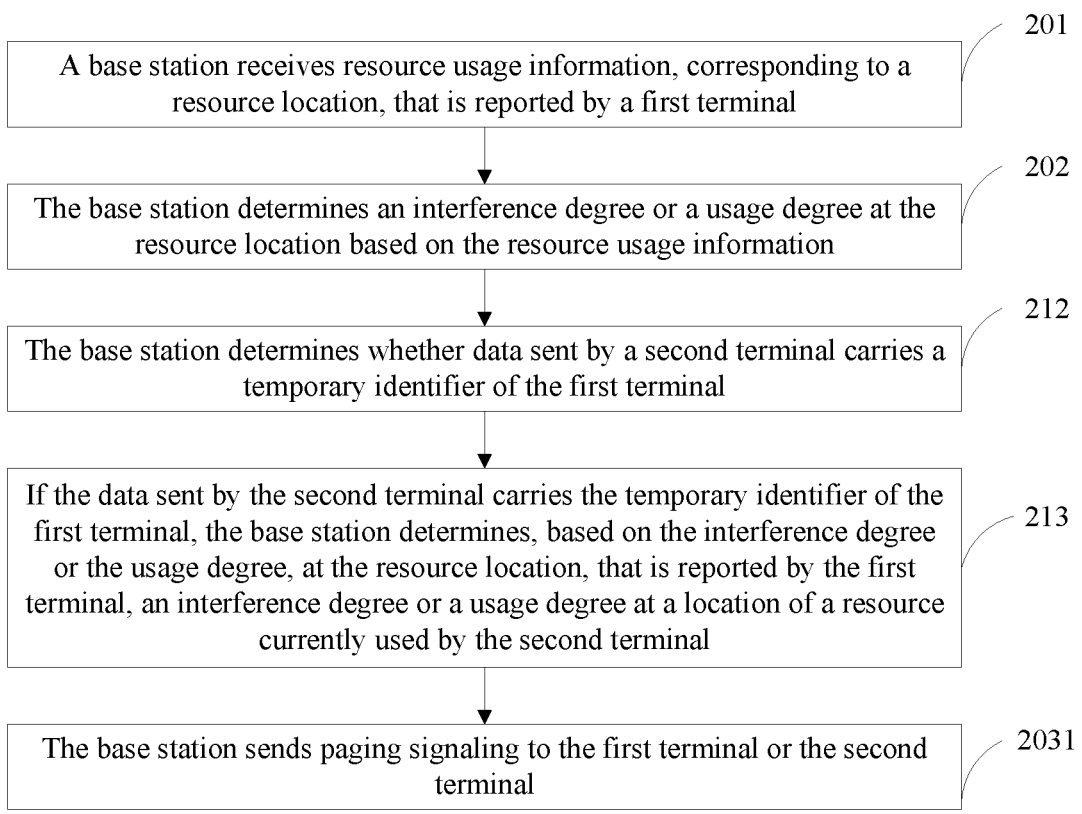
FIG. 21 is a method flowchart of another method for device-to-device inter-cell interference coordination according to the present disclosure.

In another implementation of this embodiment of the present disclosure, based on the method shown in FIG. 20, as shown in FIG. 21, step 203 may specifically include the following step.

2031. The base station sends paging signaling to the first terminal or the second terminal.

The paging signaling carries the D2D data transmission resource re-allocated for the first terminal or the second terminal and/or a power adjustment value for adjusting the D2D data transmit power.

Figure 22:
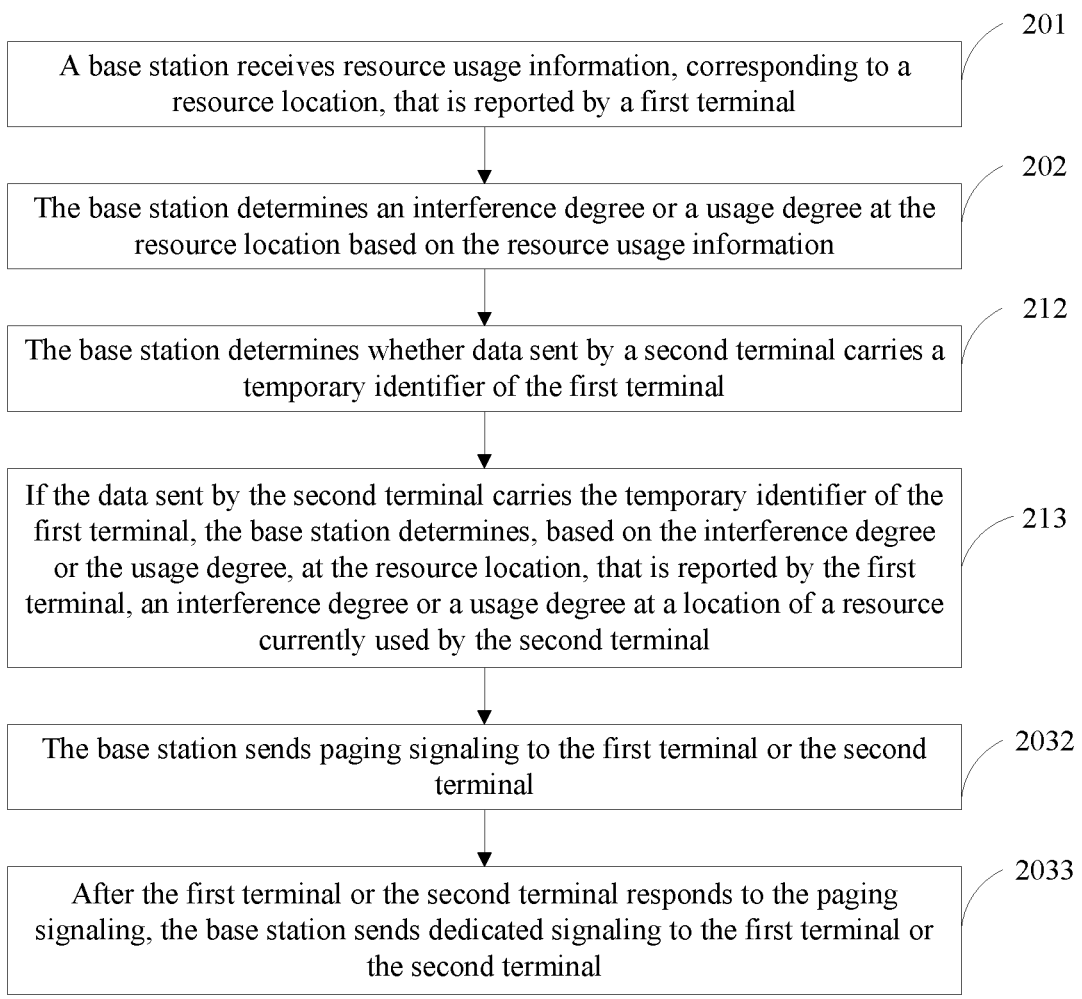
FIG. 22 is a method flowchart of another method for device-to-device inter-cell interference coordination according to the present disclosure.

Alternatively, as shown in FIG. 22, step 203 may specifically include the following steps.

2032. The base station sends paging signaling to the first terminal or the second terminal.

2033. After the first terminal or the second terminal responds to the paging signaling, the base station sends dedicated signaling to the first terminal or the second terminal.

The dedicated signaling carries the D2D data transmission resource re-allocated for the first terminal or the second terminal and/or a power adjustment value for adjusting the D2D data transmit power.

Figure 23:
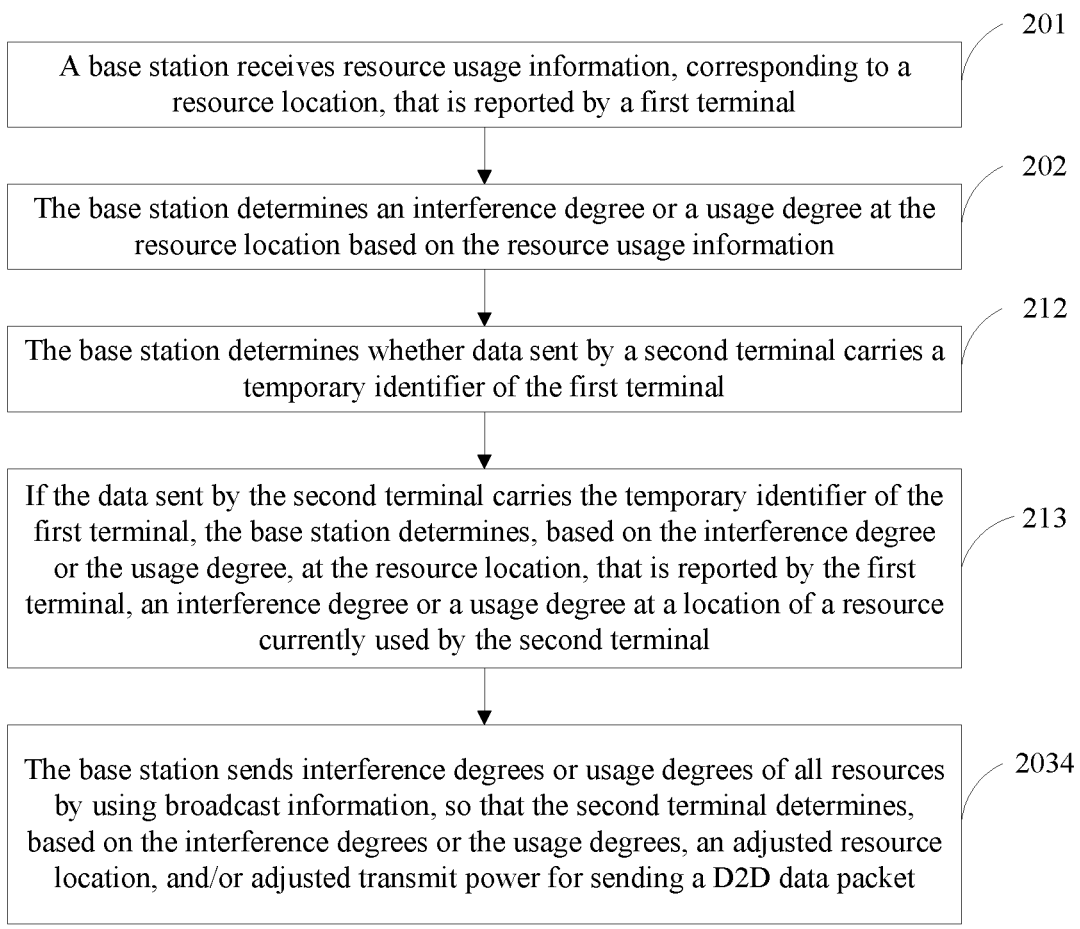
FIG. 23 is a method flowchart of another method for device-to-device inter-cell interference coordination according to the present disclosure.

In another implementation of this embodiment of the present disclosure, based on the method shown in FIG. 20, as shown in FIG. 23, step 203 may specifically include step 2034.

2034. The base station sends interference degrees or usage degrees of all resources by using broadcast information, so that the second terminal determines, based on the interference degrees or the usage degrees, an adjusted resource location, and/or adjusted transmit power for sending a D2D data packet.

Figure 24:
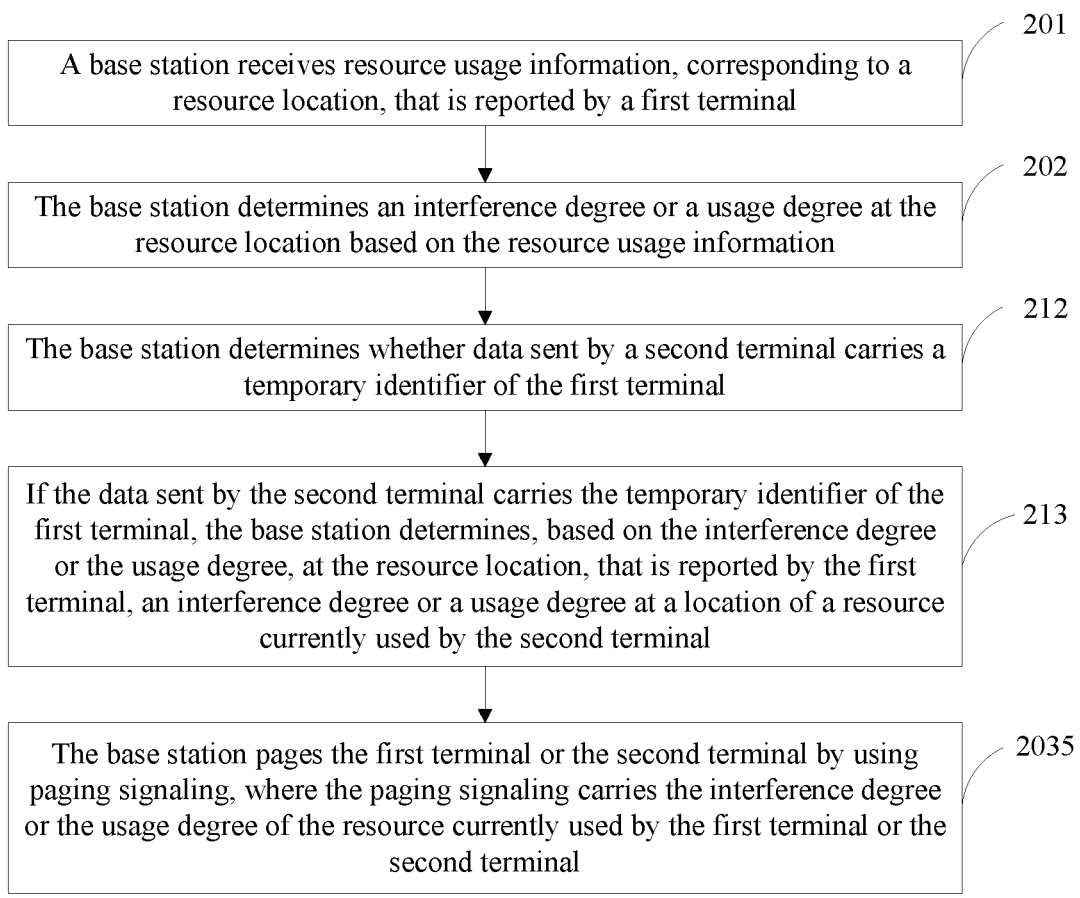
FIG. 24 is a method flowchart of another method for device-to-device inter-cell interference coordination according to the present disclosure.

Alternatively, as shown in FIG. 24, step 203 may specifically include step 2035.

2035. The base station pages the first terminal or the second terminal by using paging signaling, where the paging signaling carries the interference degree or the usage degree of the resource currently used by the first terminal or the second terminal.

The interference degree or the usage degree includes an interference parameter sequence. Each parameter in the interference parameter sequence is corresponding to one of all the resources. The interference parameter indicates whether there is interference on a resource corresponding to the interference parameter, or an interference degree of a resource corresponding to the interference parameter, or whether a resource corresponding to the interference parameter is used, or a usage degree of a resource corresponding to the interference parameter.

In this implementation, the base station can send the paging signaling and the dedicated signaling to the first terminal or the second terminal in a broadcast mode or in a paging mode, without a need to establish a connection between the base station and the first terminal or the second terminal. In this way, even if the first terminal or the second terminal is in an idle state, the base station can implement interference coordination for the terminal in the idle state, thereby expanding an application scenario of an interference coordination mechanism.

Figure 25:
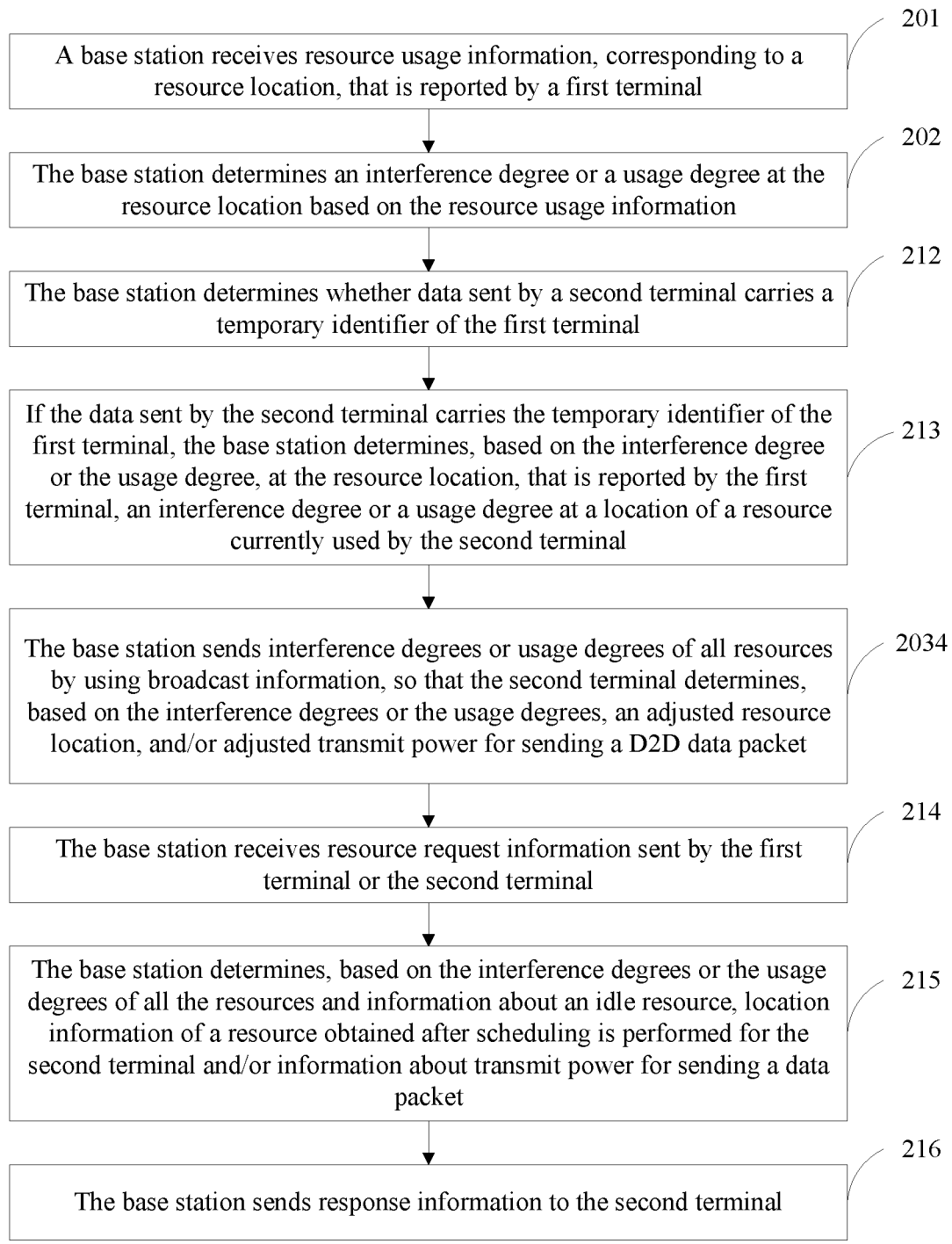
FIG. 25 is a method flowchart of another method for device-to-device inter-cell interference coordination according to the present disclosure.
Figure 26:
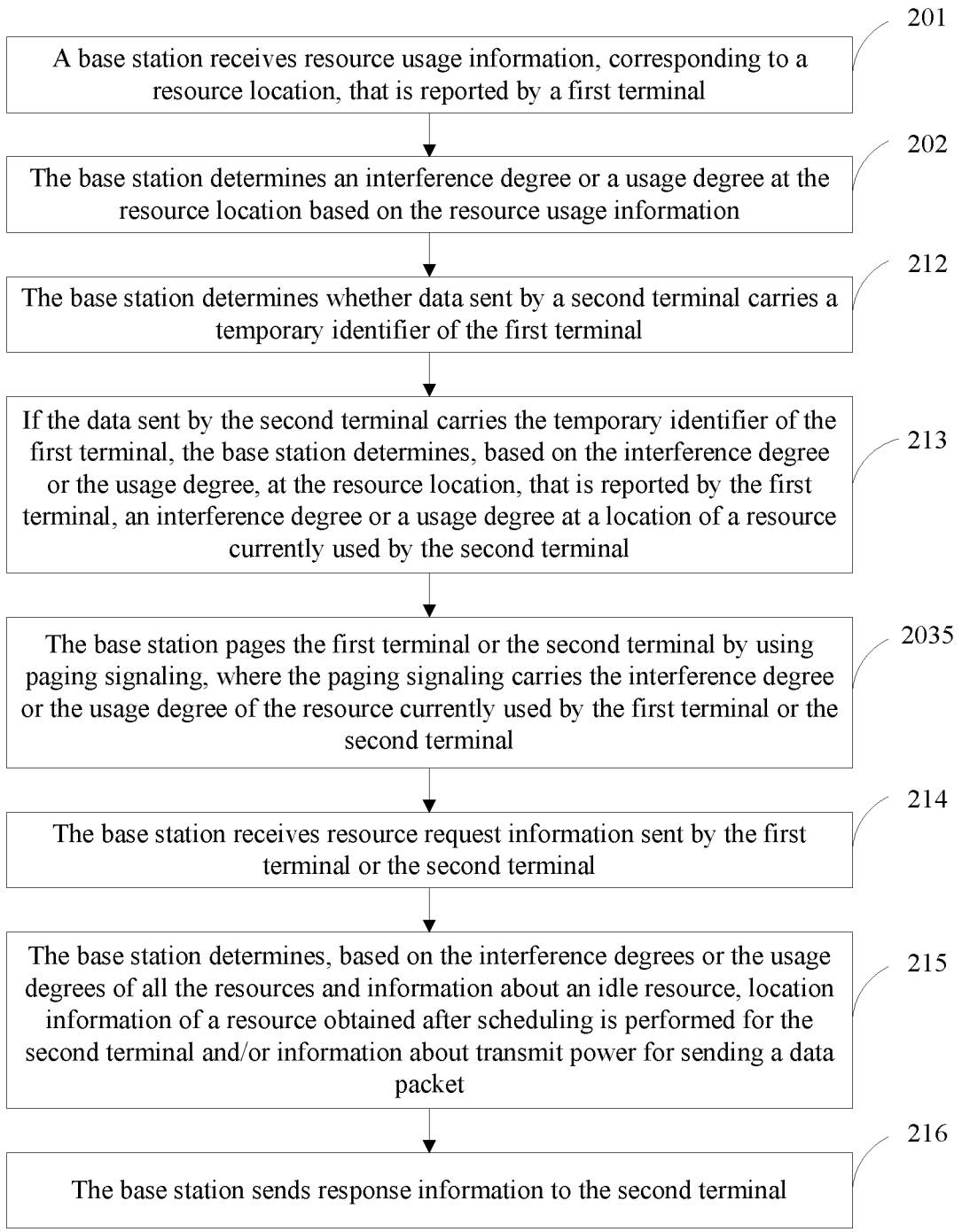
FIG. 26 is a method flowchart of another method for device-to-device inter-cell interference coordination according to the present disclosure.

In another implementation of this embodiment of the present disclosure, based on the method shown in FIG. 23 or FIG. 24, as shown in FIG. 25 or FIG. 26, the following steps may be further performed after step 2034 or step 2035.

214. The base station receives resource request information sent by the first terminal or the second terminal.

The resource request information carries information, detected by the second terminal, about an idle resource in an area of a cell corresponding to the base station.

215. The base station determines, based on the interference degrees or the usage degrees of all the resources and information about the idle resource, location information of a resource obtained after scheduling is performed for the second terminal and/or information about transmit power for sending a data packet.

216. The base station sends response information to the second terminal.

The response information carries location information of a resource re-scheduled by the base station for the second terminal and/or information about transmit power, adjusted by the base station for the second terminal, for sending a data packet.

In this implementation, after sending the resource usage information in a broadcast mode and/or sending resource configuration information to the second terminal, the base station receives a scheduling request from the second terminal that carries the information about the detected idle resource. The base station determines, based on the scheduling request and the resource usage information reported by the detection terminal, a resource to be re-allocated for the second terminal. In this way, the base station can perform scheduling for the second terminal more accurately by using information about a resource, in a surrounding environment, that is detected by the second terminal, and can accurately avoid interference.

Figure 27:
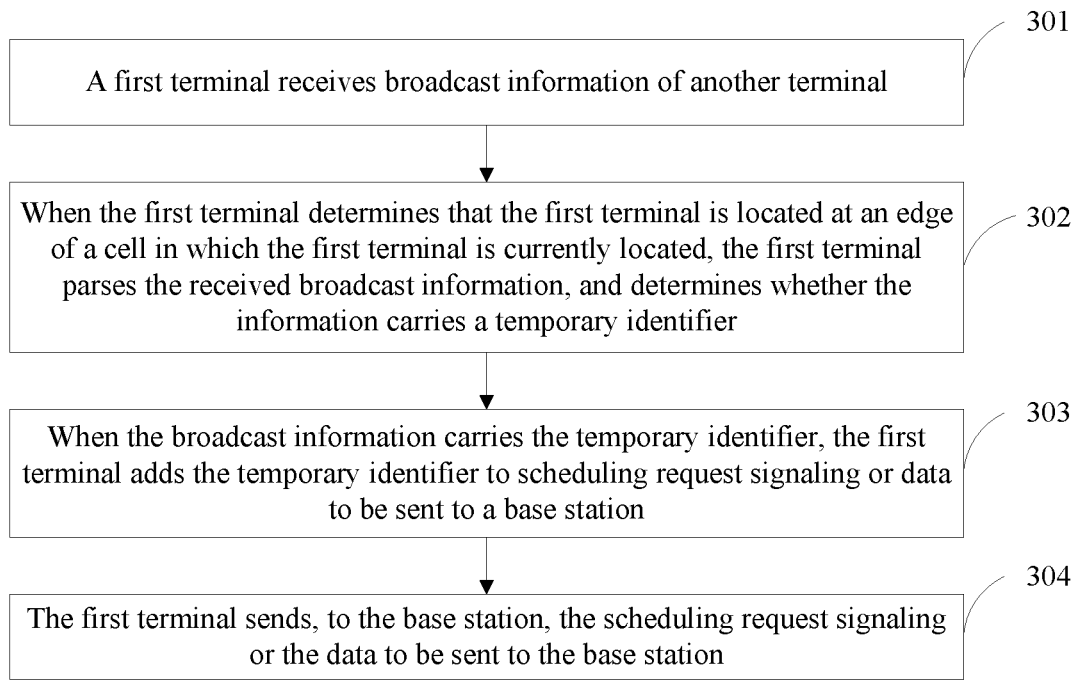
FIG. 27 is a method flowchart of another method for device-to-device inter-cell interference coordination according to the present disclosure.

Another embodiment of the present disclosure provides a method for device-to-device inter-cell interference coordination. As shown in FIG. 27, the method includes the following steps.

301. A first terminal receives broadcast information of another terminal.

302. When the first terminal determines that the first terminal is located at an edge of a cell in which the first terminal is currently located, the first terminal parses the received broadcast information, and determines whether the information carries a temporary identifier.

303. When the broadcast information carries the temporary identifier, the first terminal adds the temporary identifier to resource request signaling or data to be sent to the base station.

A resource request may be carried in scheduling request information, buffer status report information, MAC data, or radio resource control (RRC) signaling.

304. The first terminal sends, to the base station, the scheduling request signaling or the data to be sent to the base station.

The first terminal sends, to the base station, the scheduling request signaling or the data to be sent to the base station, so that the base station determines, based on the temporary identifier, an interference degree or a usage degree at a resource location at which the first terminal is located, and performs scheduling for the first terminal based on the interference degree or the usage degree.

It should be noted that the interference degree or the usage degree includes a resource usage parameter sequence, each parameter in the resource usage parameter sequence is corresponding to one of all resources, and the resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

In this embodiment of the present disclosure, the first terminal adds the temporary identifier to the resource request signaling or the data to be sent to the base station, and reports the resource request signaling or the data to the base station; and the base station determines a corresponding detection terminal based on the temporary identifier, and further determines, based on resource usage information reported by the detection terminal, an interference status at the resource location at which the first terminal is located, so that the base station can perform scheduling for the first terminal more accurately.

Figure 28:
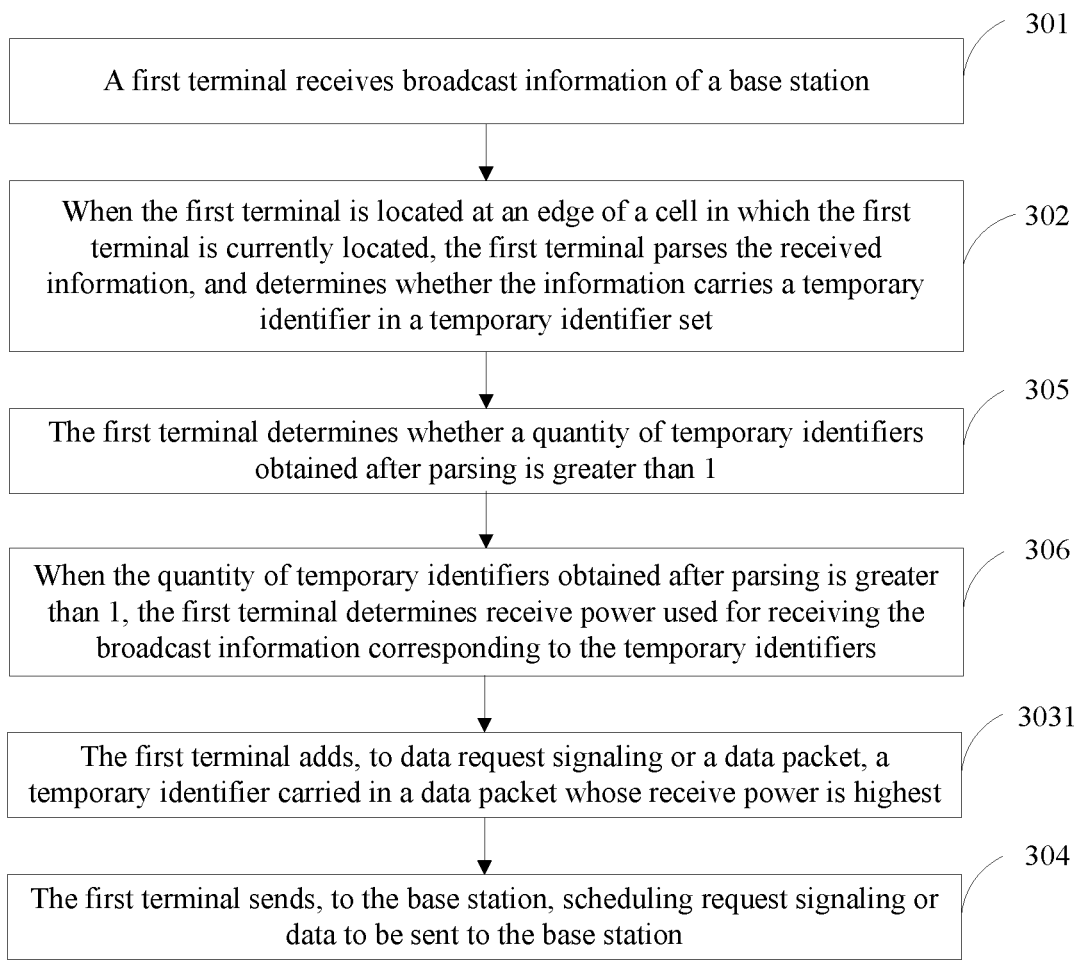
FIG. 28 is a method flowchart of another method for device-to-device inter-cell interference coordination according to the present disclosure.

In an implementation of this embodiment of the present disclosure, based on the method shown in FIG. 27, as shown in FIG. 28, the following steps may be further performed before step 303.

305. The first terminal determines whether a quantity of temporary identifiers obtained after parsing is greater than 1.

306. When the quantity of temporary identifiers obtained after parsing is greater than 1, the first terminal determines receive power used for receiving the broadcast information corresponding to the temporary identifiers.

Step 303 may specifically include the following step.

3031. The first terminal adds, to data request signaling or a data packet, a temporary identifier carried in a data packet whose receive power is highest.

In this implementation, when receiving a plurality of temporary identifiers, the first terminal may determine, from the plurality of temporary identifiers, the temporary identifier carried in the data packet whose receive power is highest, and add the temporary identifier to the data request signaling or MAC data, so as to report the temporary identifier to the base station. Larger receive power of a data packet indicates a shorter distance between the first terminal and the base station. In this way, an interference status determined by the base station based on the temporary identifier carried in the data packet whose receive power is highest is closest to the interference status at the resource location at which the first terminal is located, so that the base station can perform scheduling for the first terminal more accurately.

Figure 29:
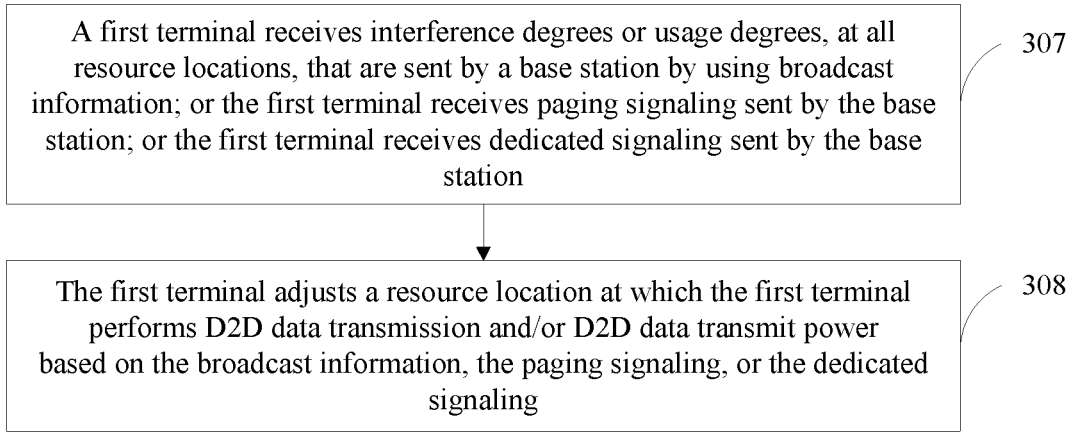
FIG. 29 is a method flowchart of another method for device-to-device inter-cell interference coordination according to the present disclosure.

In an implementation of this embodiment of the present disclosure, as shown in FIG. 29, the following steps may be further performed.

307. The first terminal receives interference degrees or usage degrees, at all resource locations, that are sent by the base station by using broadcast information; or the first terminal receives paging signaling sent by the base station; or the first terminal receives dedicated signaling sent by the base station.

The paging signaling carries an interference degree or a usage degree of a resource currently used by the first terminal. The dedicated signaling carries a D2D data transmission resource re-allocated for the first terminal and/or a power adjustment value for sending D2D data.

308. The first terminal adjusts a resource location at which the first terminal performs D2D data transmission and/or D2D data transmit power based on the broadcast information, the paging signaling, or the dedicated signaling.

In this implementation, when the first terminal is in an idle state, the base station may notify the first terminal of resource usage information or scheduling information without establishing a connection to the first terminal. In this case, interference coordination can also be implemented for a terminal in an idle state, thereby expanding an application scenario of an interference coordination mechanism.

Figure 30:
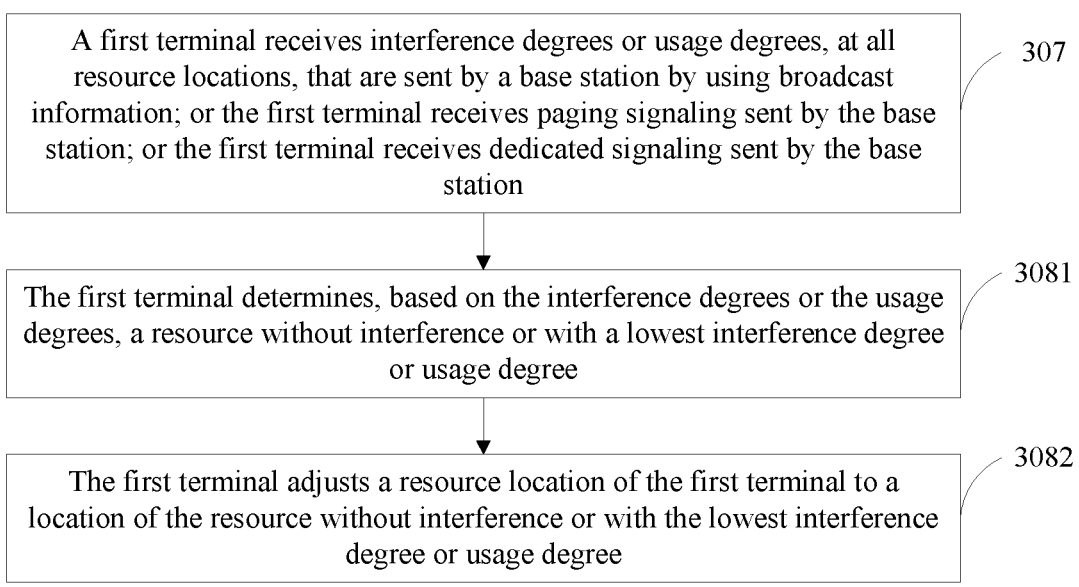
FIG. 30 is a method flowchart of another method for device-to-device inter-cell interference coordination according to the present disclosure.

In an implementation of this embodiment of the present disclosure, based on the method shown in FIG. 29, as shown in FIG. 30, step 308 may further specifically include the following steps.

3081. The first terminal determines, based on the interference degrees or the usage degrees, a resource without interference or with a lowest interference degree or usage degree.

3082. The first terminal adjusts the resource location of the first terminal to a location of the resource without interference or with the lowest interference degree or usage degree.

In this implementation, the first terminal may determine the resource without interference or with the lowest interference degree based on an interference parameter, and then adjust a resource to the resource without interference or with the lowest interference degree, to prevent interference of a neighboring cell from affecting a D2D link.

Figure 31:
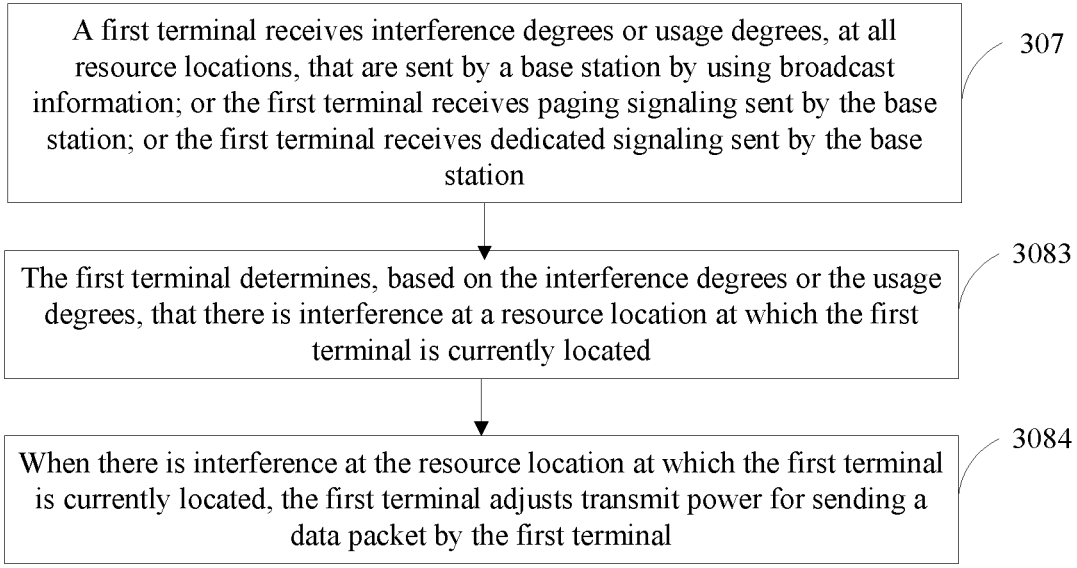
FIG. 31 is a method flowchart of another method for device-to-device inter-cell interference coordination according to the present disclosure.
Figure 32:
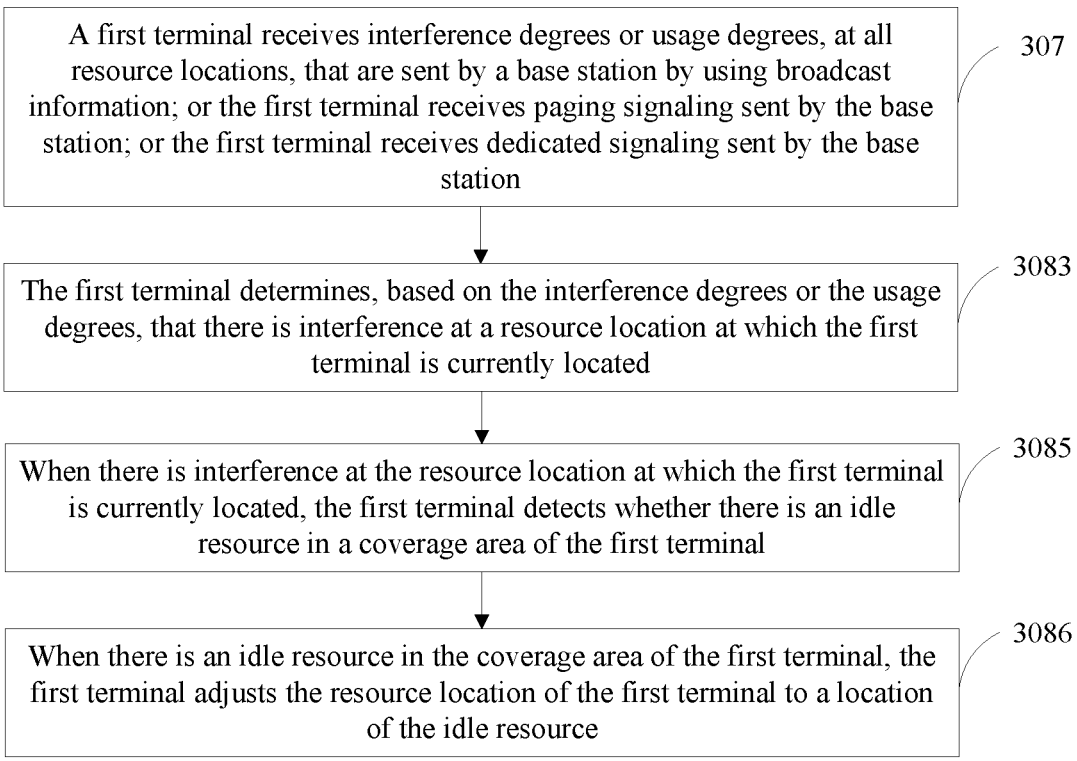
FIG. 32 is a method flowchart of another method for device-to-device inter-cell interference coordination according to the present disclosure.
Figure 33:
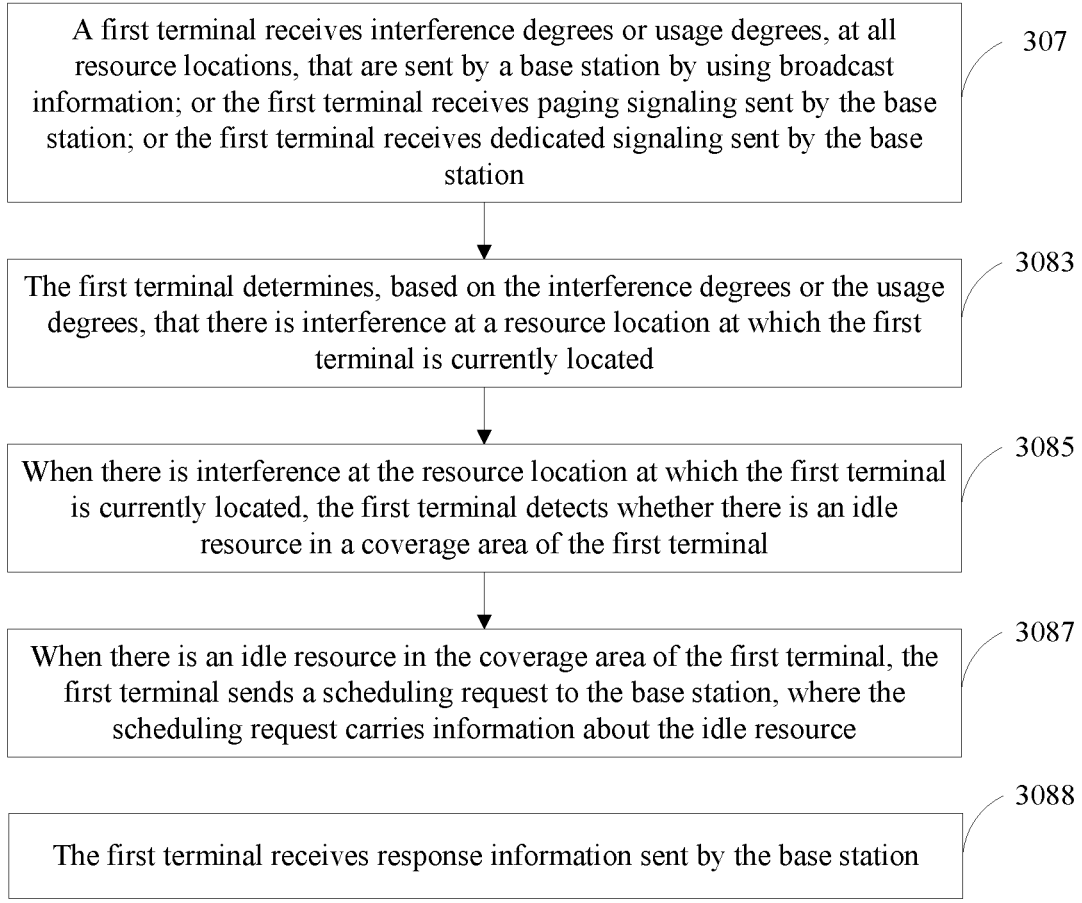
FIG. 33 is a method flowchart of another method for device-to-device inter-cell interference coordination according to the present disclosure.

In an implementation of this embodiment of the present disclosure, when the scheduling information is resource usage information corresponding to all resource locations, based on the method shown in FIG. 29, as shown in FIG. 31, FIG. 32, or FIG. 33, step 308 may further specifically include the following steps.

3083. The first terminal determines, based on the interference degrees or the usage degrees, that there is interference at a resource location at which the first terminal is currently located.

Step 3084 or step 3085 is performed after step 3083.

3084. When there is interference at the resource location at which the first terminal is currently located, the first terminal adjusts transmit power for sending a data packet by the first terminal.

3085. When there is interference at the resource location at which the first terminal is currently located, the first terminal detects whether there is an idle resource in a coverage area of the first terminal.

Step 3086 or step 3087 is performed after step 3085.

3086. When there is an idle resource in the coverage area of the first terminal, the first terminal adjusts the resource location of the first terminal to a location of the idle resource.

3087. When there is an idle resource in the coverage area of the first terminal, the first terminal sends a scheduling request to the base station, where the scheduling request carries information about the idle resource.

3088. The first terminal receives response information sent by the base station.

The response information carries location information of a resource obtained after scheduling is performed for the first terminal and/or information about transmit power for sending a data packet.

In this implementation, after determining, based on the resource usage information or the scheduling information, that there is interference at the resource location at which the first terminal is currently located, the first terminal may reduce impact of the interference by adjusting transmit power, and may further detect a surrounding resource, and after detecting a surrounding idle resource, negotiate with the base station on a resource location for adjustment, or directly adjust a resource to the detected idle resource. In this way, when the resource usage information or the scheduling information provided by the base station is not suitable for performing scheduling by the first base station, resource scheduling may be performed by the first base station based on information detected by the first base station, to prevent interference of a neighboring cell from affecting a D2D link.

Figure 34:
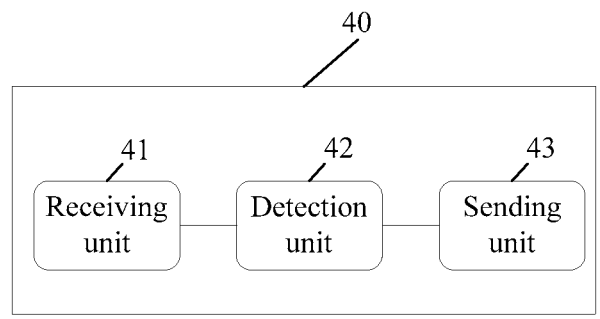
FIG. 34 is a schematic structural diagram of an apparatus for device-to-device inter-cell interference coordination according to the present disclosure.

Another embodiment of the present disclosure provides an apparatus 40 for device-to-device inter-cell interference coordination. As shown in FIG. 34, the apparatus 40 includes:

a receiving unit 41, configured to: when the first terminal becomes a detection terminal, receive configuration information sent by a first base station, where the configuration information includes a resource usage detection parameter, the detection terminal is configured to measure a resource usage level on a device-to-device D2D link corresponding to the detection terminal, and the resource usage detection parameter is used to configure a resource usage detection manner for the first terminal;

a detection unit 42, configured to detect, based on the resource usage detection parameter, resource usage information corresponding to a resource location, where the resource location is a resource location at which the first terminal currently performs D2D data transmission, or information about the resource location is carried in the configuration information; and a sending unit 43, configured to report the resource usage information to the first base station, so that the first base station adjusts, based on the resource usage information, a D2D data transmission mode for the first terminal or a second terminal using the resource location.

Figure 35:
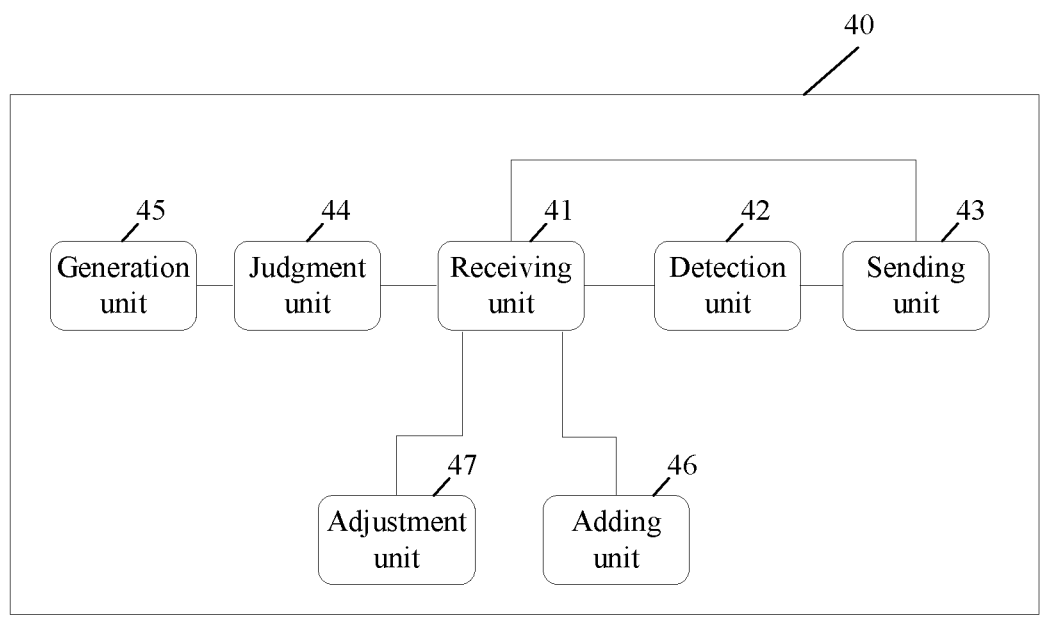
FIG. 35 is a schematic structural diagram of another apparatus for device-to-device inter-cell interference coordination according to the present disclosure.

Further, as shown in FIG. 35, the apparatus 40 may further include:

a judgment unit 44, configured to determine, based on a parameter of the preset condition, whether the first terminal can become the detection terminal, where the parameter of the preset condition is sent by the first base station by using broadcast information, or the parameter of the preset condition is preset by the first terminal.

The preset condition includes a first preset condition. The first preset condition includes a condition for determining that the first terminal is located at an edge of a cell in which the first terminal is currently located. A parameter of the first preset condition includes a signal power threshold used by the first terminal to receive a signal of the first base station.

Further, the judgment unit 44 is specifically configured to determine, based on the signal power threshold, whether the first terminal is located at the edge of the cell in which the first terminal is currently located; and configured to: when the first terminal is located at the edge of the cell in which the first terminal is currently located, determine that the first terminal becomes the detection terminal.

The preset condition includes a second preset condition. The second preset condition includes whether the first terminal receives a data packet that is sent by using a resource in a resource list. A parameter of the second preset condition includes that the resource list is a resource list in which there is an orthogonal relationship between a resource frequency of a resource of a second base station and a resource frequency of the first base station. The second base station is corresponding to a neighboring cell of a cell corresponding to the first base station. The resource list is sent by the first base station in a broadcast mode.

Further, the judgment unit 44 is specifically configured to: when the first terminal receives the data packet that is sent by using the resource in the resource list, determine that the first terminal becomes the detection terminal.

The preset condition includes a third preset condition. A parameter of the third preset condition includes a preset threshold and a relationship between a random number and the preset threshold. The random number is generated by the first terminal.

Further, as shown in FIG. 35, the apparatus 40 may further include:

a generation unit 45, configured to generate the random number by using a preset random sequence.

The judgment unit 44 is specifically configured to determine whether the random number and the preset threshold meet the relationship between the random number and the preset threshold; and configured to: if the random number and the preset threshold meet the relationship between the random number and the preset threshold, determine that the first terminal becomes the detection terminal.

Further, the judgment unit 44 is further configured to determine whether broadcast information that carries a first temporary identifier and that is sent by another terminal is received, where the first temporary identifier is added, after it is determined that the another terminal is the detection terminal, to the broadcast information sent by the another terminal; and configured to: if the first terminal does not receive the broadcast information that carries the first temporary identifier, perform the step of determining, by the first terminal based on a parameter of the preset condition, whether the first terminal can become the detection terminal.

Further, the sending unit 43 is further configured to send request information to the first base station, so as to request the first base station to allow the first terminal to become the detection terminal.

The receiving unit 41 is further configured to receive an instruction that is sent by the first base station for allowing the first terminal to be the detection terminal.

The configuration information further includes a second temporary identifier configured by the first base station for the first terminal.

Further, as shown in FIG. 35, the apparatus 40 may further include:

an adding unit 46, configured to add the second temporary identifier to a data packet to be sent by the first terminal.

The configuration information further includes a second temporary identifier configured by the first base station for the first terminal and a broadcast resource location at which the second temporary identifier is broadcast.

Further, the sending unit 43 is configured to periodically broadcast the second temporary identifier at the broadcast resource location.

The resource usage detection parameter further includes a manner of triggering reporting of the resource usage information, a resource usage detection threshold, and a resource usage statistics manner. The resource usage detection threshold includes at least one of an interference power threshold, an interference data packet percentage threshold, a receive power threshold, or a received data packet percentage threshold. The manner of triggering reporting of the resource usage information includes periodic triggering and event triggering. When the manner of triggering reporting of the resource usage information is the periodic triggering, the resource usage detection parameter further includes a reporting period.

Further, when the manner of triggering reporting of the resource usage information is the periodic triggering, the detection unit 42 is specifically configured to: in each reporting period, determine whether receive power of a data packet that fails to be received is greater than the interference power threshold; or determine, by the first terminal, whether a percentage of data packets that fail to be received is greater than the interference data packet percentage threshold; or determine, by the first terminal, whether receive power of a received data packet is greater than the receive power threshold; or determine, by the first terminal, whether a percentage of received data packets is greater than the received data packet percentage threshold; and configured to: when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, determine that there is interference.

Further, when the manner of triggering reporting of the resource usage information is the event triggering, the detection unit 42 is specifically configured to: determine whether receive power of a data packet that fails to be received is greater than the interference power threshold; or determine, by the first terminal, whether a percentage of data packets that fail to be received is greater than the interference data packet percentage threshold; or determine, by the first terminal, whether receive power of a received data packet is greater than the receive power threshold; or determine, by the first terminal, whether a percentage of received data packets is greater than the received data packet percentage threshold; and configured to: when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold, determine that there is interference.

The adjusting a D2D data transmission mode for a second resource includes: re-allocating a resource and/or adjusting D2D data transmit power for the second terminal; or notifying the second terminal of an interference degree or a usage degree of a currently used resource, and instructing the second terminal to adjust a used transmission resource and/or transmit power based on the interference degree or the usage degree. The second terminal may also be the first terminal if the resource location at which the first terminal reports the resource usage information is a resource location used by the first terminal for D2D data transmission. The interference degree or the usage degree includes a resource usage parameter sequence. Each parameter in the resource usage parameter sequence is corresponding to one of all resources. The resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

Further, the receiving unit 41 is further configured to: receive interference degrees or usage degrees, at all resource locations, that are sent by the base station by using broadcast information; or receive paging signaling sent by the base station, where the paging signaling carries an interference degree or a usage degree of a resource currently used by the first terminal; or receive dedicated signaling sent by the base station, where the dedicated signaling carries a D2D data transmission resource re-allocated for the first terminal and/or a power adjustment value for sending D2D data.

Further, as shown in FIG. 35, the apparatus 40 may further include:

an adjustment unit 47, configured to adjust a resource location at which the first terminal performs D2D data transmission and/or D2D data transmit power based on the broadcast information, the paging signaling, or the dedicated signaling.

Further, the adjustment unit 47 is specifically configured to determine, by the first terminal based on the interference degrees or the usage degrees, a resource without interference or with a lowest interference degree or usage degree; and configured to adjust the resource location of the first terminal to a location of the resource without interference or with the lowest interference degree or usage degree.

Further, the adjustment unit 47 is specifically configured to determine, based on the interference degrees or the usage degrees, that there is interference at a resource location at which the first terminal is currently located; and configured to: when there is interference at the resource location at which the first terminal is currently located, adjust transmit power for sending a data packet by the first terminal; or when there is interference at the resource location at which the first terminal is currently located, detect whether there is an idle resource in a coverage area of the first terminal; and configured to: when there is an idle resource in the coverage area of the first terminal, adjust the resource location of the first terminal to a location of the idle resource; or when there is an idle resource in the coverage area of the first terminal, send a scheduling request to the base station, where the scheduling request carries information about the idle resource; and configured to receive response information sent by the base station, where the response information carries location information of a resource obtained after scheduling is performed for the first terminal and/or information about transmit power for sending a data packet.

In this embodiment of the present disclosure, the apparatus 40 is used as a detection terminal, and the detection terminal detects a resource configured by a base station or a current D2D data transmission resource, to obtain resource usage information, and reports the resource usage information to the base station; the base station can accurately notify a resource usage status based on the resource usage information reported by the detection terminal, and further adjust, in a timely manner, a D2D data transmission mode for the detection terminal or a second terminal using the resource location, thereby reducing interference on a D2D link of a terminal in a cell in which the terminal is located, and effectively improving suppression on inter-cell interference on the D2D link.

Figure 36:
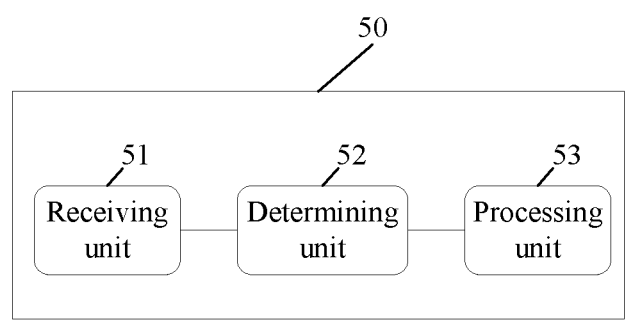
FIG. 36 is a schematic structural diagram of another apparatus for device-to-device inter-cell interference coordination according to the present disclosure.

Another embodiment of the present disclosure provides an apparatus 50 for device-to-device inter-cell interference coordination. As shown in FIG. 36, the apparatus 50 includes:

a receiving unit 51, configured to receive resource usage information, corresponding to a resource location, that is reported by a first terminal, where the resource location is a resource location at which the first terminal currently performs device-to-device D2D data transmission, or information about the resource location is carried in the configuration information, and the resource usage information is sent after the first terminal becomes a detection terminal;

a determining unit 52, configured to determine an interference degree or a usage degree at the resource location based on the resource usage information; and a processing unit 53, configured to re-allocate a D2D data transmission resource and/or adjust D2D data transmit power, based on the interference degree or the usage degree, for the first terminal or a second terminal using the resource location for data transmission; or notify the first terminal or the second terminal of an interference degree or a usage degree of a currently used resource.

Figure 37:
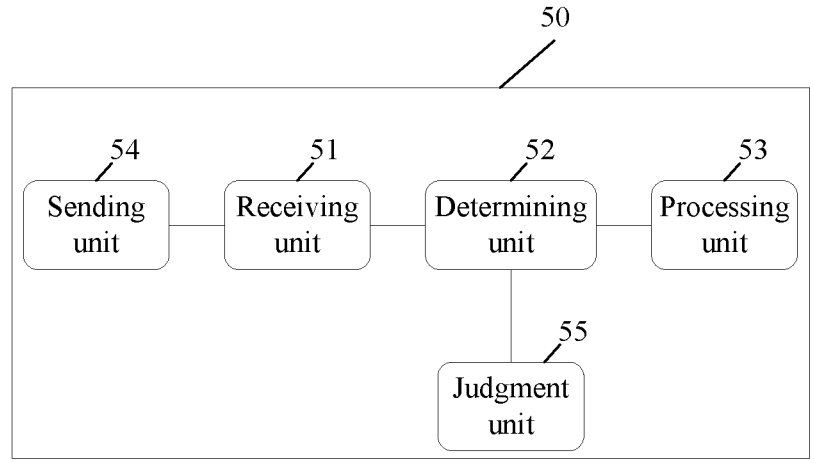
FIG. 37 is a schematic structural diagram of another apparatus for device-to-device inter-cell interference coordination according to the present disclosure.

Further, as shown in FIG. 37, the apparatus 50 may further include:

a sending unit 54, configured to send the configuration information to the first terminal, where the configuration information includes a resource usage detection parameter, the detection terminal is configured to measure a resource usage level on a D2D link corresponding to the detection terminal, and the resource usage detection parameter is used to configure a resource usage detection manner for the first terminal.

Further, the sending unit 54 is further configured to send broadcast information to the first terminal, where the broadcast information includes a parameter of a preset condition for becoming the detection terminal, so that the first terminal determines, based on the preset condition, whether the first terminal becomes the detection terminal. The parameter of the preset condition includes at least one of the following: a signal power threshold used by the first terminal to receive a signal of the first base station; a resource list in which there is an orthogonal relationship between a resource frequency of a resource of a neighboring base station and a resource frequency of the first base station, where the neighboring base station is corresponding to a neighboring cell of a cell corresponding to the first base station; or a preset threshold and a relationship between a random number and the preset threshold, where the random number is one of items generated by the first terminal.

Further, the sending unit 54 is further configured to receive request information sent by the first terminal, where the request information is used to request the base station to allow the first terminal to be the detection terminal.

The determining unit 52 is further configured to determine whether the first terminal is allowed to be the detection terminal.

The sending unit 54 is further configured to: when it is determined that the first terminal is allowed to be the detection terminal, send, to the first terminal, an instruction for allowing the first terminal to be the detection terminal.

The instruction for allowing the first terminal to be the detection terminal carries a temporary identifier allocated by the base station to the first terminal, or a size of the instruction for allowing the first terminal to be the detection terminal is 1 bit.

Further, the determining unit 53 is further configured to determine, based on the information sent by the first terminal to the base station, whether the terminal is located at an edge of a cell corresponding to the base station.

Further, as shown in FIG. 37, the apparatus 50 may further include:

a judgment unit 55, configured to: when the base station determines that the first terminal is located at the edge of the cell corresponding to the base station, determine whether data information of the first terminal includes a temporary identifier of an existing detection terminal.

The determining unit 52 is further configured to: when the information sent by the first terminal to the base station does not include a temporary identifier of an existing detection terminal, determine that the first terminal is the detection terminal.

Further, the processing unit 53 is specifically configured to determine whether data sent by the second terminal carries a temporary identifier of the first terminal; and configured to: if the data sent by the second terminal carries the temporary identifier of the first terminal, determine, based on the interference degree or the usage degree, at the resource location, that is reported by the first terminal, an interference degree or a usage degree at a location of a resource currently used by the second terminal.

Further, the processing unit 53 is specifically configured to: send paging signaling to the first terminal or the second terminal, where the paging signaling carries the D2D data transmission resource re-allocated for the first terminal or the second terminal and/or a power adjustment value for adjusting the D2D data transmit power; or send paging signaling to the first terminal or the second terminal; and configured to: after the first terminal or the second terminal responds to the paging signaling, send dedicated signaling to the first terminal or the second terminal, where the dedicated signaling carries the D2D data transmission resource re-allocated for the first terminal or the second terminal and/or a power adjustment value for adjusting the D2D data transmit power.

Further, the processing unit 53 is specifically configured to: send interference degrees or usage degrees of all resources by using broadcast information, so that the second terminal determines, based on the interference degrees or the usage degrees, an adjusted resource location, and/or adjusted transmit power for sending a D2D data packet; or page the first terminal or the second terminal by using paging signaling, where the paging signaling carries the interference degree or the usage degree of the resource currently used by the second terminal.

The interference degree or the usage degree includes a resource usage parameter sequence. Each parameter in the resource usage parameter sequence is corresponding to one of all the resources. The resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

Further, the receiving unit 51 is further configured to receive resource request information sent by the first terminal or the second terminal, where the resource request information carries information, detected by the second terminal, about an idle resource in an area of a cell corresponding to the base station.

The determining unit 52 is further configured to determine, based on the interference degrees or the usage degrees of all the resources and the information about the idle resource, location information of a resource obtained after scheduling is performed for the second terminal and/or information about transmit power for sending a data packet.

The sending unit 54 is further configured to send response information to the second terminal, where the response information carries location information of a resource re-scheduled by the base station for the second terminal and/or information about transmit power, adjusted by the base station for the second terminal, for sending a data packet.

The resource usage detection parameter further includes a manner of triggering reporting of the resource usage information, a resource usage detection threshold, and a resource usage statistics manner. The resource usage detection threshold includes at least one of an interference power threshold, an interference data packet percentage threshold, a receive power threshold, or a received data packet percentage threshold. The manner of triggering reporting of the resource usage information includes periodic triggering and event triggering. When the manner of triggering reporting of the resource usage information is the periodic triggering, the resource usage detection parameter further includes a reporting period.

In this embodiment of the present disclosure, a terminal is used as a detection terminal, and the detection terminal detects a resource configured by the apparatus 50 or a current D2D data transmission resource, to obtain resource usage information, and reports the resource usage information to the apparatus 50; the apparatus 50 can accurately notify a resource usage status based on the resource usage information reported by the detection terminal, and further adjust, in a timely manner, a D2D data transmission mode for the detection terminal or a second terminal using the resource location, thereby reducing interference on a D2D link of a terminal in a cell in which the terminal is located, and effectively improving suppression on inter-cell interference on the D2D link.

Figure 38:
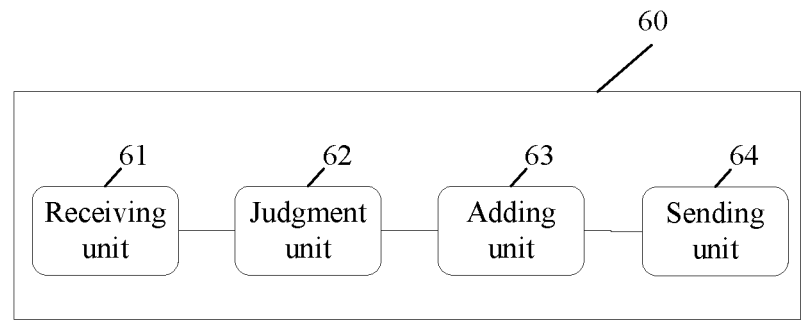
FIG. 38 is a schematic structural diagram of another apparatus for device-to-device inter-cell interference coordination according to the present disclosure.

Another embodiment of the present disclosure provides an apparatus 60 for device-to-device inter-cell interference coordination. As shown in FIG. 38, the apparatus 60 includes:

a receiving unit 61, configured to receive broadcast information of another terminal;

a judgment unit 62, configured to: when the first terminal determines that the first terminal is located at an edge of a cell in which the first terminal is currently located, parse the received broadcast information, and determine whether the information carries a temporary identifier;

an adding unit 63, configured to: when the broadcast information carries the temporary identifier, add the temporary identifier to scheduling request signaling or data to be sent to the base station; and a sending unit 64, configured to send, to the base station, the scheduling request signaling or the data to be sent to the base station, so that the base station determines, based on the temporary identifier, an interference degree or a usage degree at a resource location at which the first terminal is located, and performs scheduling for the first terminal based on the interference degree or the usage degree.

Further, the judgment unit 62 is further configured to determine whether a quantity of temporary identifiers is greater than 1.

Figure 39:
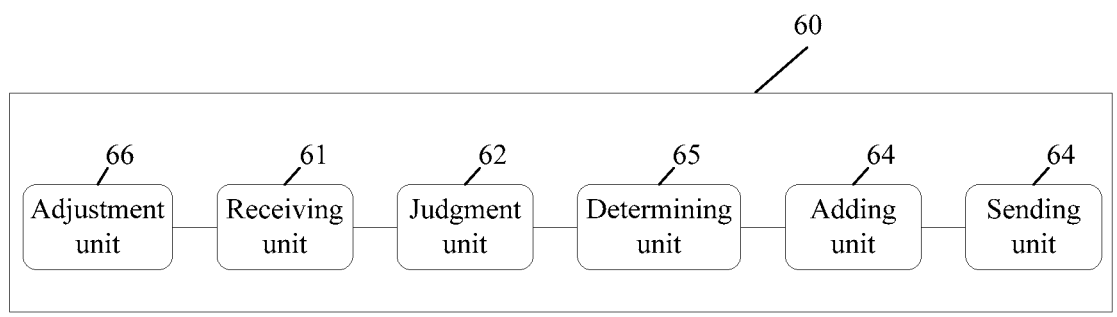
FIG. 39 is a schematic structural diagram of another apparatus for device-to-device inter-cell interference coordination according to the present disclosure.

As shown in FIG. 39, the apparatus 60 may further include:

a determining unit 65, configured to: when the quantity of temporary identifiers is greater than 1, determine receive power for receiving a data packet corresponding to the temporary identifiers.

The adding unit 63 is specifically configured to add, to the scheduling request signaling or the data to be sent to the base station, a temporary identifier carried in the data packet whose receive power is highest.

The interference degree or the usage degree includes a resource usage parameter sequence. Each parameter in the resource usage parameter sequence is corresponding to one of all resources. The resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

Further, the receiving unit 61 is further configured to: receive interference degrees or usage degrees, at all resource locations, that are sent by the base station by using broadcast information; or receive paging signaling sent by the base station, where the paging signaling carries an interference degree or a usage degree of a resource currently used by the first terminal; or receive dedicated signaling sent by the base station, where the dedicated signaling carries a transmission resource re-allocated for the first terminal and/or a transmit power adjustment value.

As shown in FIG. 39, the apparatus 60 may further include:

an adjustment unit 66, configured to adjust a resource location at which the first terminal performs device-to-device D2D data transmission and/or D2D data transmit power based on the broadcast information, the paging signaling, or the dedicated signaling.

Further, the adjustment unit 66 is specifically configured to determine, by the first terminal based on the interference degrees or the usage degrees, a resource without interference or with a lowest interference degree or usage degree; and configured to adjust the resource location of the first terminal to a location of the resource without interference or with the lowest interference degree or usage degree.

Further, the adjustment unit 66 is specifically configured to determine, based on the interference degrees or the usage degrees, that there is interference at a resource location at which the first terminal is currently located; and configured to: when there is interference at the resource location at which the first terminal is currently located, adjust transmit power for sending a data packet by the first terminal; or when there is interference at the resource location at which the first terminal is currently located, detect whether there is an idle resource in a coverage area of the first terminal; and configured to: when there is an idle resource in the coverage area of the first terminal, adjust the resource location of the first terminal to a location of the idle resource; or when there is an idle resource in the coverage area of the first terminal, send a scheduling request to the base station, where the scheduling request carries information about the idle resource; and configured to receive response information sent by the base station, where the response information carries location information of a resource obtained after scheduling is performed for the first terminal and/or information about transmit power for sending a data packet.

In this embodiment of the present disclosure, the apparatus 60 adds the temporary identifier to the resource request signaling or the data to be sent to the base station, and reports the resource request signaling or the data to the base station; and the base station determines a corresponding detection terminal based on the temporary identifier, and further determines, based on resource usage information reported by the detection terminal, an interference status of the resource location at which the apparatus 60 is located, so that the base station can perform scheduling for the apparatus 60 more accurately.

Figure 40:
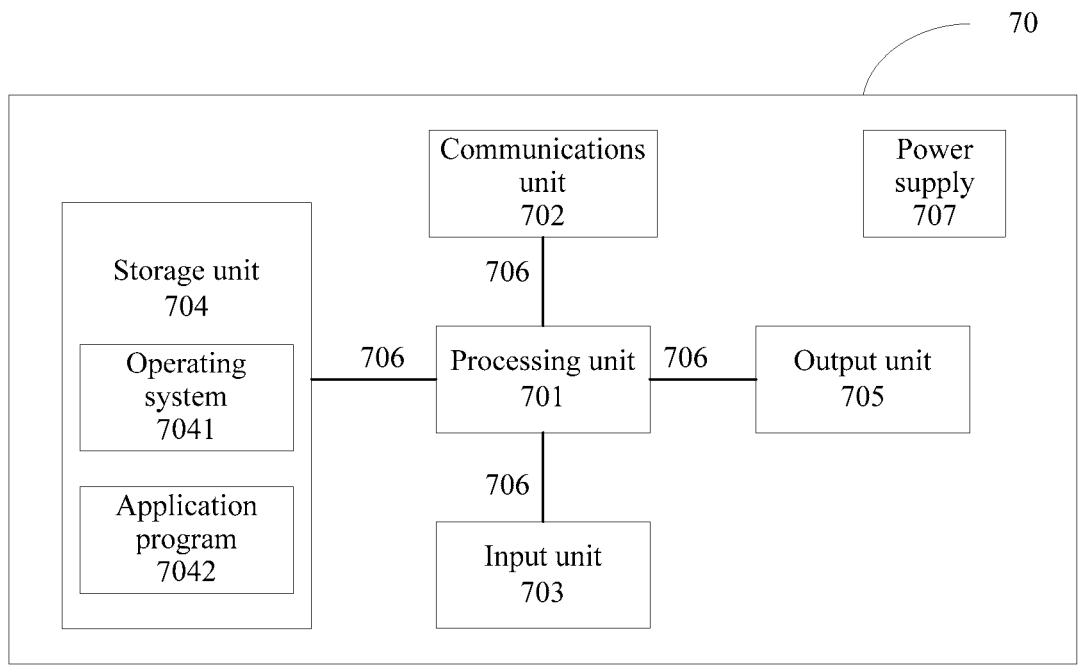
FIG. 40 is a schematic structural diagram of another terminal for device-to-device inter-cell interference coordination according to the present disclosure.

An embodiment of the present disclosure further provides a terminal 70 for device-to-device inter-cell interference coordination. As shown in FIG. 40, the terminal 70 includes at least one processing unit 701, such as a CPU, at least one communications unit 702 or another input unit 703, a storage unit 704, an output unit 705, at least one communications bus 706, and a power supply 707. The communications bus 706 is configured to implement communication between the components.

The processing unit 701 is a control center of the terminal 70, is connected to all parts of the entire terminal 70 by using various interfaces and lines, and executes various functions and/or data processing of the terminal 70 by running or executing a software program and/or a module stored in the storage unit and invoking data stored in the storage unit 704. The processing unit 701 may include an integrated circuit (IC). For example, the processing unit 701 may include a single packaged IC, or may be formed by connecting a plurality of packaged ICs that have a same function or different functions. For example, the processing unit 701 may include only a central processing unit (CPU), or may be a combination of a GPU, a digital signal processor (DSP), and a control chip (such as a baseband chip) in the communications unit. In an implementation of the present disclosure, the CPU may include a single computing core, or may include a plurality of computing cores.

The communications unit 702 is configured to establish a communication channel, so that the terminal 70 connects to a remote server by using the communication channel, and downloads media data from the remote server or uploads media data to the remote server. The communications unit 702 may include a communications module such as a wireless local area network (wireless LAN) module, a Bluetooth module, or a baseband module, and a radio frequency (RF) circuit corresponding to the communications module, and is configured to perform wireless local area network communication, Bluetooth communication, infrared communication, and/or cellular communications system communication, for example, Wideband Code Division Multiple Access (W-CDMA) and/or High Speed Downlink Packet Access (HSDPA). The communications module is configured to control communication of all the components of the terminal 70, and can support direct memory access.

In different implementations of the present disclosure, various communications modules in the communications unit 702 are usually presented in a form of an integrated circuit chip, and may be combined selectively without requiring that all the communications modules and corresponding antenna groups be included. For example, the communications unit 702 may include only a baseband chip, a radio frequency chip, and a corresponding antenna, to provide a communication function in a cellular communications system. Through a wireless communication connection established by the communications unit 702, for example, wireless local area network access or WCDMA access, the terminal 70 may connect to a cellular network or the Internet. In some optional implementations of the present disclosure, the communications module in the communications unit 702, such as the baseband module, may be integrated in the processing unit 701.

The input unit 703 is configured to implement interaction between a user and the terminal 70 and/or input information to the terminal 70. For example, the input unit 703 may receive digital or character information that is input by a user, to generate a signal input related to a user setting or function control. In a specific implementation of the present disclosure, the input unit 703 may be a touch panel, or may be another human-computer interaction interface such as an entity input key or a microphone, or may be another external information obtaining apparatus such as a camera. The touch panel, also referred to as a touchscreen or a touch control screen, may collect a touch operation performed by a user on or near the touch panel, such as an operation performed by the user on or near the touch panel by using any suitable object or accessory such as a finger or a stylus; and drive a corresponding connection apparatus based on a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and sends the contact coordinates to the processing unit 701. The touch controller may further receive and execute a command sent by the processing unit 701. In addition, the touch panel may be implemented by using a plurality of types, such as a resistive type, a capacitive type, an infrared type, and a surface acoustic wave type. In another implementation of the present disclosure, the entity input key used by the input unit 703 may include but is not limited to one or more of a physical keyboard, a function key (such as a volume control key or an on/off key), a trackball, a mouse, or a joystick. The input unit 703 in a form of a microphone may collect voice that is input by a user or from an environment, and convert the voice into a command, in a form of an electrical signal, that can be executed by the processing unit 701.

The storage unit 704 is configured to store the software program and the module. The processing unit 701 runs the software program and the module that are stored in the storage unit 704 to perform various function applications and data processing of the terminal 70. The storage unit 704 mainly includes a program storage area and a data storage area. The program storage area may store an operating system 7041, an application program 7042 required by at least one function, such as a sound play program or an image play program. The data storage area may store data (such as audio data and a phone book) created based on usage of the terminal 70 and the like. In a specific implementation of the present disclosure, the storage unit 704 may include a volatile memory, for example, a dynamic nonvolatile random access memory (NVRAM), a phase change random access memory (PRAM), or a magnetoresistive random access memory (MRAM); or may include a nonvolatile memory, for example, at least one magnetic disk storage device, an electrically erasable programmable read-only memory (EEPROM), or a flash memory device such as a NOR flash memory or a NAND flash memory. The nonvolatile memory stores the operating system 7041 and the application program 7042 that are executed by the processing unit 701. The processing unit 701 loads a running program and data from the nonvolatile memory to a memory, and stores digital content in a large-capacity storage apparatus. The operating system 7041 includes various components and/or drives that are configured to control and manage routine system tasks, such as memory management, storage device control, and power supply management, and that facilitate communication between various software and hardware. In this implementation of the present disclosure, the operating system may be an Android system, an iOS system, a Windows operating system, or the like; or may be an embedded operating system such as VxWorks.

The application program 7042 includes any application installed on the terminal 70, and includes but is not limited to a browser, an email, an instant messaging service, text processing, keyboard virtualization, a widget, encryption, digital copyright management, speech recognition, voice replication, positioning (for example, a function provided by the Global Positioning System), and music play.

The output unit 706 includes but is not limited to an image output unit and an audio output unit. The image output unit is configured to output a text, a picture, and/or a video. The image output unit may include a display panel, for example, a display panel configured in a form of an liquid crystal display (LCD), an organic light-emitting diode (OLED), a field emission display (FED), or the like. Alternatively, the image output unit may include a reflective display, for example, an electrophoretic display or a display using an interferometric modulation of light technology. The image output unit may include a single display or a plurality of displays of different sizes. In a specific implementation of the present disclosure, the touch panel used by the input unit 703 may also be used as the display panel of the output unit 706. For example, after detecting a touch operation on the touch panel or a gesture operation near the touch panel, the touch panel transfers information about the operation to the processing unit 701 to determine a type of a touch event, and then, the processing unit 701 provides a corresponding visual output on the display panel based on the type of the touch event. The input unit 703 and the output unit 706 may be used as two independent components to implement input and output functions of the terminal 70. However, in some embodiments, the touch panel and the display panel may be integrated to implement the input and output functions of the terminal 70. For example, the image output unit may display various graphical user interfaces (GUI) as virtual control components, including but not limited to a window, a scrollbar, an icon, and a clipboard, for a user to perform an operation by touching.

The audio output unit includes a digital-to-analog converter, configured to convert, from a digital format into an analog format, an audio signal that is output by the processing unit 701.

The power supply 707 is configured to supply power to different components of the terminal 70 to maintain running of the terminal 70. Based on a general understanding, the power supply 707 may be a built-in battery, such as a common lithium-ion battery or NiMH battery, or may include an external power supply that directly supplies power to the terminal 70, such as an AC adapter. In some implementations of the present disclosure, the power supply 707 may be further defined more extensively. For example, the power supply 707 may further include a power supply management system, a charging system, a power failure detection circuit, a power converter or an inverter, a power status indicator (such as a light emitting diode), and any other components associated with electric energy generation, management, and distribution of the terminal 70.

Specifically, the communications unit 702 is configured to: when the first terminal becomes a detection terminal, receive configuration information sent by a first base station. The configuration information includes a resource usage detection parameter. The detection terminal is configured to measure a resource usage level on a device-to-device D2D link corresponding to the detection terminal. The resource usage detection parameter is used to configure a resource usage detection manner for the first terminal.

The processing unit 701 is configured to detect, based on the resource usage detection parameter, resource usage information corresponding to a resource location. The resource location is a resource location at which the first terminal currently performs D2D data transmission, or information about the resource location is carried in the configuration information.

The communications unit 702 is further configured to report the resource usage information to the first base station, so that the first base station adjusts, based on the resource usage information, a D2D data transmission mode for the first terminal or a second terminal using the resource location.

In an implementation of this embodiment of the present disclosure, the processing unit 701 is further configured to determine, based on a parameter of the preset condition, whether the first terminal can become the detection terminal, where the parameter of the preset condition is sent by the first base station by using broadcast information, or the parameter of the preset condition is preset by the first terminal.

In another implementation of this embodiment of the present disclosure, the preset condition includes a first preset condition, the first preset condition includes a condition for determining that the first terminal is located at an edge of a cell in which the first terminal is currently located, and a parameter of the first preset condition includes a signal power threshold used by the first terminal to receive a signal of the first base station.

In another implementation of this embodiment of the present disclosure, the processing unit 701 is further configured to determine, based on the signal power threshold, whether the first terminal is located at the edge of the cell in which the first terminal is currently located; and configured to: when the first terminal is located at the edge of the cell in which the first terminal is currently located, determine that the first terminal becomes the detection terminal.

In another implementation of this embodiment of the present disclosure, the preset condition includes a second preset condition, the second preset condition includes whether the first terminal receives a data packet that is sent by using a resource in a resource list, a parameter of the second preset condition includes that the resource list is a resource list in which there is an orthogonal relationship between a resource frequency of a resource of a second base station and a resource frequency of the first base station, the second base station is corresponding to a neighboring cell of a cell corresponding to the first base station, and the resource list is sent by the first base station in a broadcast mode.

The processing unit 701 is further configured to: when the first terminal receives the data packet that is sent by using the resource in the resource list, determine that the first terminal becomes the detection terminal.

In another implementation of this embodiment of the present disclosure, the preset condition includes a third preset condition, a parameter of the third preset condition includes a preset threshold and a relationship between a random number and the preset threshold, and the random number is generated by the first terminal.

The processing unit 701 is further configured to generate, by the first terminal, the random number by using a preset random sequence; and configured to determine whether the random number and the preset threshold meet the relationship between the random number and the preset threshold; and configured to: if the random number and the preset threshold meet the relationship between the random number and the preset threshold, determine that the first terminal becomes the detection terminal.

In another implementation of this embodiment of the present disclosure, the processing unit 701 is further configured to determine whether broadcast information that carries a first temporary identifier and that is sent by another terminal is received, where the first temporary identifier is added, after it is determined that the another terminal is the detection terminal, to the broadcast information sent by the another terminal; and configured to: if the first terminal does not receive the broadcast information that carries the first temporary identifier, perform the step of determining, by the first terminal based on a parameter of the preset condition, whether the first terminal can become the detection terminal.

In another implementation of this embodiment of the present disclosure, the communications unit 702 is further configured to send request information to the first base station, so as to request the first base station to allow the first terminal to become the detection terminal; and configured to receive an instruction that is sent by the first base station for allowing the first terminal to be the detection terminal.

In another implementation of this embodiment of the present disclosure, the configuration information further includes a second temporary identifier configured by the first base station for the first terminal.

The processing unit 701 is further configured to add the second temporary identifier to a data packet to be sent by the first terminal.

In another implementation of this embodiment of the present disclosure, the configuration information further includes a second temporary identifier configured by the first base station for the first terminal and a broadcast resource location at which the second temporary identifier is broadcast.

The communications unit 702 is further configured to periodically broadcast the second temporary identifier at the broadcast resource location.

In another implementation of this embodiment of the present disclosure, the resource usage detection parameter further includes a manner of triggering reporting of the resource usage information, a resource usage detection threshold, and a resource usage statistics manner. The resource usage detection threshold includes at least one of an interference power threshold, an interference data packet percentage threshold, a receive power threshold, or a received data packet percentage threshold. The manner of triggering reporting of the resource usage information includes periodic triggering and event triggering. When the manner of triggering reporting of the resource usage information is the periodic triggering, the resource usage detection parameter further includes a reporting period.

In another implementation of this embodiment of the present disclosure, when the manner of triggering reporting of the resource usage information is the periodic triggering, the processing unit 701 is further configured to: in each reporting period, determine whether receive power of a data packet that fails to be received is greater than the interference power threshold; or determine, by the first terminal, whether a percentage of data packets that fail to be received is greater than the interference data packet percentage threshold; or determine, by the first terminal, whether receive power of a received data packet is greater than the receive power threshold; or determine, by the first terminal, whether a percentage of received data packets is greater than the received data packet percentage threshold; and configured to: when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold resource usage level, determine that there is interference.

In another implementation of this embodiment of the present disclosure, when the manner of triggering reporting of the resource usage information is the event triggering, the processing unit 701 is further configured to: determine whether receive power of a data packet that fails to be received is greater than the interference power threshold; or determine, by the first terminal, whether a percentage of data packets that fail to be received is greater than the interference data packet percentage threshold; or determine, by the first terminal, whether receive power of a received data packet is greater than the receive power threshold; or determine, by the first terminal, whether a percentage of received data packets is greater than the received data packet percentage threshold; and configured to: when the first terminal determines that the receive power of the data packet that fails to be received is greater than the interference power threshold, or when the first terminal determines that the percentage of the data packets that fail to be received is greater than the interference data packet percentage threshold, or when the first terminal determines that the receive power of the received data packet is greater than the receive power threshold, or when the first terminal determines that the percentage of the received data packets is greater than the received data packet percentage threshold, determine that there is interference.

In another implementation of this embodiment of the present disclosure, the adjusting a D2D data transmission mode for a second resource includes: re-allocating a resource and/or adjusting D2D data transmit power for the second terminal; or notifying the second terminal of an interference degree or a usage degree of a currently used resource, and instructing the second terminal to adjust a used transmission resource and/or adjust transmit power based on the interference degree or the usage degree.

In another implementation of this embodiment of the present disclosure, the second terminal may also be the first terminal if the resource location at which the first terminal reports the resource usage information is a resource location used by the first terminal for D2D data transmission.

In another implementation of this embodiment of the present disclosure, the interference degree or the usage degree includes a resource usage parameter sequence. Each parameter in the resource usage parameter sequence is corresponding to one of all resources. The resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

In another implementation of this embodiment of the present disclosure, the communications unit 702 is further configured to: receive interference degrees or usage degrees, at all resource locations, that are sent by the base station by using broadcast information; or receive paging signaling sent by the base station, where the paging signaling carries an interference degree or a usage degree of a resource currently used by the first terminal; or receive dedicated signaling sent by the base station, where the dedicated signaling carries a D2D data transmission resource re-allocated for the first terminal and/or a power adjustment value for sending D2D data; and configured to adjust a resource location at which the first terminal performs D2D data transmission and/or D2D data transmit power based on the broadcast information, the paging signaling, or the dedicated signaling.

In another implementation of this embodiment of the present disclosure, the processing unit 701 is further configured to determine, by the first terminal based on the interference degrees or the usage degrees, a resource without interference or with a lowest interference degree or usage degree; and configured to adjust the resource location of the first terminal to a location of the resource without interference or with the lowest interference degree or usage degree.

In another implementation of this embodiment of the present disclosure, the processing unit 701 is further configured to determine, based on the interference degrees or the usage degrees, that there is interference at a resource location at which the first terminal is currently located; and configured to: when there is interference at the resource location at which the first terminal is currently located, adjust transmit power for sending a data packet by the first terminal; or when there is interference at the resource location at which the first terminal is currently located, detect whether there is an idle resource in a coverage area of the first terminal; and configured to: when there is an idle resource in the coverage area of the first terminal, adjust the resource location of the first terminal to a location of the idle resource.

The communications unit 702 is further configured to send a scheduling request to the base station when there is an idle resource in the coverage area of the first terminal, where the scheduling request carries information about the idle resource; and configured to receive response information sent by the base station, where the response information carries location information of a resource obtained after scheduling is performed for the first terminal and/or information about transmit power for sending a data packet.

In this embodiment of the present disclosure, the terminal 70 is used as a detection terminal, and the detection terminal detects a resource configured by a base station or a current D2D data transmission resource, to obtain resource usage information, and reports the resource usage information to the base station; the base station can accurately notify a resource usage status based on the resource usage information reported by the detection terminal, and further adjust, in a timely manner, a D2D data transmission mode for the detection terminal or a second terminal using the resource location, thereby reducing interference on a D2D link of a terminal in a cell in which the terminal is located, and effectively improving suppression on inter-cell interference on the D2D link.

Figure 41:
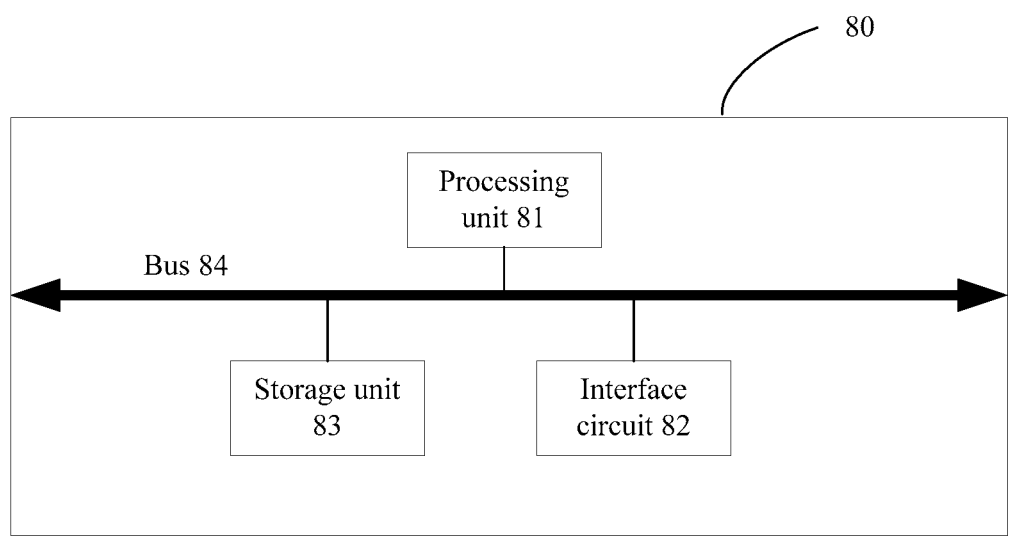
FIG. 41 is a schematic structural diagram of another base station for device-to-device inter-cell interference coordination according to the present disclosure.

An embodiment of the present disclosure further provides a base station 80 for device-to-device inter-cell interference coordination. As shown in FIG. 41, the base station 80 includes a processing unit 81 and an interface circuit 82. In the figure, a storage unit 83 and a bus 84 are further shown. The processing unit 81, the interface circuit 82, and the storage unit 83 connect to and communicate with each other by using the bus 84.

It should be noted that the processing unit 81 herein may be one processing component, or may represent a plurality of processing components. For example, the processing component may be a central processing unit (CPU), or may be an application-specific integrated circuit (ASIC), or may be configured as one or more integrated circuits that implement this embodiment of the present disclosure, for example, one or more microprocessing units (DSP), or one or more field programmable gate arrays (FPGA).

The storage unit 83 may be one storage apparatus, or may represent a plurality of storage components, and is configured to store executable program code, a parameter or data that is required for running of an access network management device, and the like. In addition, the storage unit 83 may include a random access memory (RAM), or may include a non-volatile memory, such as a magnetic disk storage unit or a flash memory (Flash).

The bus 84 may be an industry standard architecture (ISA) bus, a Peripheral Component Interconnect (PCI) bus, an extended industry standard architecture (EISA) bus, or the like. The bus 84 may be classified into an address bus, a data bus, a control bus, and the like. For ease of representation, the bus is represented by using only one bold line in FIG. 41. However, it does not mean that there is only one bus or one type of bus.

The base station 80 may further include an input/output apparatus that is connected to the bus 84, so as to connect to other parts, such as the processing unit 81, by using the bus 84.

The processing unit 81 invokes the program code in the storage unit 83, to perform an operation that is performed by a CN network element in the foregoing method embodiments.

Specifically, the processing unit 81 is configured to receive, by using the interface circuit 82, resource usage information, corresponding to a resource location, that is reported by a first terminal, where the resource location is a resource location at which the first terminal currently performs device-to-device D2D data transmission, or information about the resource location is carried in the configuration information, and the resource usage information is sent after the first terminal becomes a detection terminal; and configured to determine an interference degree or a usage degree at the resource location based on the resource usage information; and configured to: re-allocate a D2D data transmission resource and/or adjust D2D data transmit power, based on the interference degree or the usage degree, for the first terminal or a second terminal using the resource location for data transmission; or notify the first terminal or the second terminal of an interference degree or a usage degree of a currently used resource.

In an implementation of this embodiment of the present disclosure, the processing unit 81 is further configured to send the configuration information to the first terminal by using the interface circuit 82, the configuration information includes a resource usage detection parameter, the detection terminal is configured to measure a resource usage level on a D2D link corresponding to the detection terminal, and the resource usage detection parameter is used to configure a resource usage detection manner for the first terminal.

In another implementation of this embodiment of the present disclosure, the processing unit 81 is further configured to send broadcast information to the first terminal by using the interface circuit 82, where the broadcast information includes a parameter of a preset condition for becoming the detection terminal, so that the first terminal determines, based on the preset condition, whether the first terminal becomes the detection terminal; and the parameter of the preset condition includes at least one of the following: a signal power threshold used by the first terminal to receive a signal of the first base station; a resource list in which there is an orthogonal relationship between a resource frequency of a resource of a neighboring base station and a resource frequency of the first base station, where the neighboring base station is corresponding to a neighboring cell of a cell corresponding to the first base station; or a preset threshold and a relationship between a random number and the preset threshold, where the random number is one of items generated by the first terminal.

In another implementation of this embodiment of the present disclosure, the processing unit 81 is further configured to receive, by using the interface circuit 82, request information sent by the first terminal, where the request information is used to request the base station to allow the first terminal to be the detection terminal; and configured to determine whether the first terminal is allowed to be the detection terminal; and configured to: when it is determined that the first terminal is allowed to be the detection terminal, send, to the first terminal by using the interface circuit 82, an instruction for allowing the first terminal to be the detection terminal.

In another implementation of this embodiment of the present disclosure, the instruction for allowing the first terminal to be the detection terminal carries a temporary identifier allocated by the base station to the first terminal, or a size of the instruction for allowing the first terminal to be the detection terminal is 1 bit.

In another implementation of this embodiment of the present disclosure, the processing unit 81 is further configured to determine, based on the information sent by the first terminal to the base station, whether the terminal is located at an edge of a cell corresponding to the base station; and configured to: when the base station determines that the first terminal is located at the edge of the cell corresponding to the base station, determine whether data information of the first terminal includes a temporary identifier of an existing detection terminal; and configured to: when the information sent by the first terminal to the base station does not include a temporary identifier of an existing detection terminal, determine that the first terminal is the detection terminal.

In another implementation of this embodiment of the present disclosure, the processing unit 81 is further configured to determine whether data sent by the second terminal carries the temporary identifier of the first terminal; and configured to: if the data sent by the second terminal carries the temporary identifier of the first terminal, determine, based on the interference degree or the usage degree, at the resource location, that is reported by the first terminal, an interference degree or a usage degree at a location of a resource currently used by the second terminal.

In another implementation of this embodiment of the present disclosure, the processing unit 81 is further configured to: send paging signaling to the first terminal or the second terminal by using the interface circuit 82, where the paging signaling carries the D2D data transmission resource re-allocated for the first terminal or the second terminal and/or a power adjustment value for adjusting the D2D data transmit power; or send paging signaling to the first terminal or the second terminal; and configured to: after the first terminal or the second terminal responds to the paging signaling, send dedicated signaling to the first terminal or the second terminal by using the interface circuit 82, where the dedicated signaling carries the D2D data transmission resource re-allocated for the first terminal or the second terminal and/or a power adjustment value for adjusting the D2D data transmit power.

In another implementation of this embodiment of the present disclosure, the processing unit 81 is further configured to: send, by using the interface circuit 82, interference degrees or usage degrees of all resources by using broadcast information, so that the second terminal determines, based on the interference degrees or the usage degrees, an adjusted resource location, and/or adjusted transmit power for sending a D2D data packet; or page the first terminal or the second terminal by using paging signaling, where the paging signaling carries the interference degree or the usage degree of the resource currently used by the second terminal.

In another implementation of this embodiment of the present disclosure, the interference degree or the usage degree includes a resource usage parameter sequence. Each parameter in the resource usage parameter sequence is corresponding to one of all the resources. The resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

In another implementation of this embodiment of the present disclosure, the processing unit 81 is further configured to receive, by using the interface circuit 82, resource request information sent by the first terminal or the second terminal, where the resource request information carries information, detected by the second terminal, about an idle resource in an area of a cell corresponding to the base station; and configured to determine, based on the interference degrees or the usage degrees of all the resources and the information about the idle resource, location information of a resource obtained after scheduling is performed for the second terminal and/or information about transmit power for sending a data packet; and configured to send, by using the interface circuit 82, response information to the second terminal, where the response information carries location information of a resource re-scheduled by the base station for the second terminal and/or information about transmit power, adjusted by the base station for the second terminal, for sending a data packet.

In another implementation of this embodiment of the present disclosure, the resource usage detection parameter further includes a manner of triggering reporting of the resource usage information, a resource usage detection threshold, and a resource usage statistics manner. The resource usage detection threshold includes at least one of an interference power threshold, an interference data packet percentage threshold, a receive power threshold, or a received data packet percentage threshold. The manner of triggering reporting of the resource usage information includes periodic triggering and event triggering. When the manner of triggering reporting of the resource usage information is the periodic triggering, the resource usage detection parameter further includes a reporting period.

In this embodiment of the present disclosure, a terminal is used as a detection terminal, and the detection terminal detects a resource configured by the base station 80 or a current D2D data transmission resource, to obtain resource usage information, and reports the resource usage information to the base station 80; the base station 80 can accurately notify a resource usage status based on the resource usage information reported by the detection terminal, and further adjust, in a timely manner, a D2D data transmission mode for the detection terminal or a second terminal using the resource location, thereby reducing interference on a D2D link of a terminal in a cell in which the terminal is located, and effectively improving suppression on inter-cell interference on the D2D link.

Figure 42:
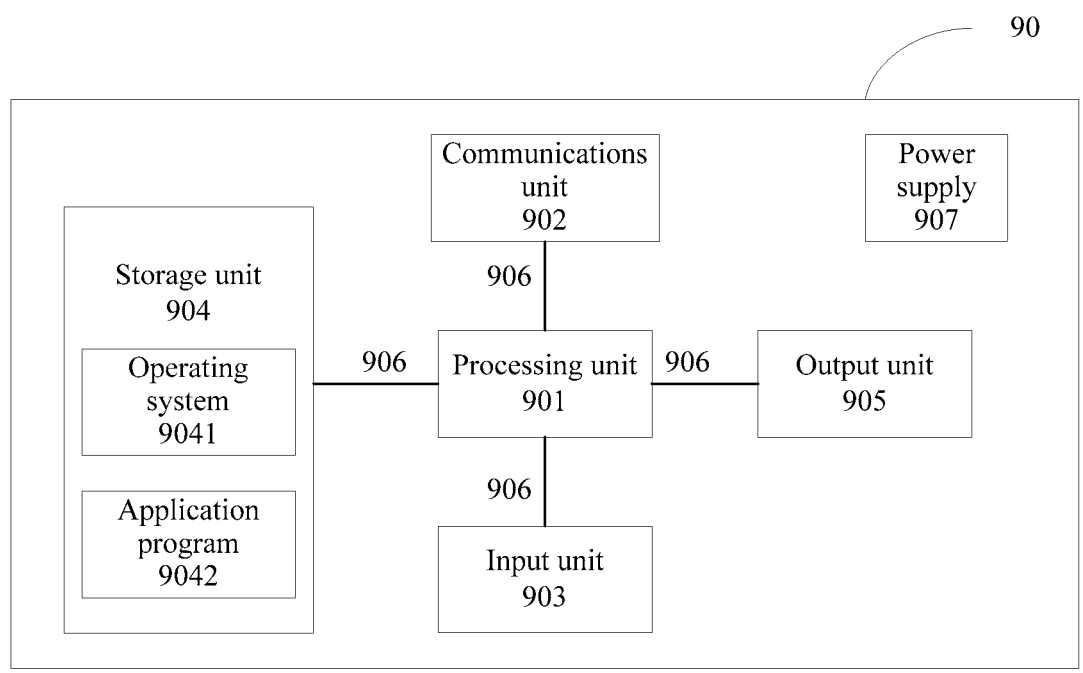
FIG. 42 is a schematic structural diagram of another terminal for device-to-device inter-cell interference coordination according to the present disclosure.

An embodiment of the present disclosure further provides a terminal 90 for device-to-device inter-cell interference coordination. As shown in FIG. 42, the terminal 90 includes at least one processing unit 901, such as a CPU, at least one communications unit 902 or another input unit 903, a storage unit 904, an output unit 905, at least one communications bus 906, and a power supply 907. The communications bus 906 is configured to implement communication between the components.

The processing unit 901 is a control center of the terminal 90, is connected to all parts of the entire terminal 90 by using various interfaces and lines, and executes various functions and/or data processing of the terminal 90 by running or executing a software program and/or a module stored in the storage unit and invoking data stored in the storage unit 904. The processing unit 901 may include an integrated circuit (IC). For example, the processing unit 901 may include a single packaged IC, or may be formed by connecting a plurality of packaged ICs that have a same function or different functions. For example, the processing unit 901 may include only a central processing unit (CPU), or may be a combination of a GPU, a digital signal processor (DSP), and a control chip (such as a baseband chip) in the communications unit. In an implementation of the present disclosure, the CPU may include a single computing core, or may include a plurality of computing cores.

The communications unit 902 is configured to establish a communication channel, so that the terminal 90 connects to a remote server by using the communication channel, and downloads media data from the remote server or uploads media data to the remote server. The communications unit 902 may include a communications module such as a wireless local area network (wireless LAN) module, a Bluetooth module, or a baseband module, and a radio frequency (RF) circuit corresponding to the communications module, and is configured to perform wireless local area network communication, Bluetooth communication, infrared communication, and/or cellular communications system communication, for example, Wideband Code Division Multiple Access (W-CDMA) and/or High Speed Downlink Packet Access (HSDPA). The communications module is configured to control communication of all the components of the terminal 90, and can support direct memory access.

In different implementations of the present disclosure, various communications modules in the communications unit 902 are usually presented in a form of an integrated circuit chip, and may be combined selectively without requiring that all the communications modules and corresponding antenna groups be included. For example, the communications unit 902 may include only a baseband chip, a radio frequency chip, and a corresponding antenna, to provide a communication function in a cellular communications system. Through a wireless communication connection established by the communications unit 902, for example, wireless local area network access or WCDMA access, the terminal 90 may connect to a cellular network or the Internet. In some optional implementations of the present disclosure, the communications module in the communications unit 902, such as the baseband module, may be integrated in the processing unit 901.

The input unit 903 is configured to implement interaction between a user and the terminal 90 and/or input information to the terminal 90. For example, the input unit 903 may receive digital or character information that is input by a user, to generate a signal input related to a user setting or function control. In a specific implementation of the present disclosure, the input unit 903 may be a touch panel, or may be another human-computer interaction interface such as an entity input key or a microphone, or may be another external information obtaining apparatus such as a camera. The touch panel, also referred to as a touchscreen or a touch control screen, may collect a touch operation performed by a user on or near the touch panel, such as an operation performed by the user on or near the touch panel by using any suitable object or accessory such as a finger or a stylus; and drive a corresponding connection apparatus based on a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and sends the contact coordinates to the processing unit 901. The touch controller may further receive and execute a command sent by the processing unit 901. In addition, the touch panel may be implemented by using a plurality of types, such as a resistive type, a capacitive type, an infrared type, and a surface acoustic wave type. In another implementation of the present disclosure, the entity input key used by the input unit 903 may include but is not limited to one or more of a physical keyboard, a function key (such as a volume control key or an on/off key), a trackball, a mouse, or a joystick. The input unit 903 in a form of a microphone may collect voice that is input by a user or from an environment, and convert the voice into a command, in a form of an electrical signal, that can be executed by the processing unit 901.

The storage unit 904 is configured to store the software program and the module. The processing unit 901 runs the software program and the module that are stored in the storage unit 904 to perform various function applications and data processing of the terminal 90. The storage unit 904 mainly includes a program storage area and a data storage area. The program storage area may store an operating system 9041, an application program 9042 required by at least one function, such as a sound play program or an image play program. The data storage area may store data (such as audio data and a phone book) created based on usage of the terminal 90 and the like. In a specific implementation of the present disclosure, the storage unit 904 may include a volatile memory, for example, a dynamic nonvolatile random access memory (NVRAM), a phase change random access memory (PRAM), or a magnetoresistive random access memory (MRAM); or may include a nonvolatile memory, for example, at least one magnetic disk storage device, an electrically erasable programmable read-only memory (EEPROM), or a flash memory device such as a NOR flash memory or a NAND flash memory. The nonvolatile memory stores the operating system 9041 and the application program 9042 that are executed by the processing unit 901. The processing unit 901 loads a running program and data from the nonvolatile memory to a memory, and stores digital content in a large-capacity storage apparatus. The operating system 9041 includes various components and/or drives that are configured to control and manage routine system tasks, such as memory management, storage device control, and power supply management, and that facilitate communication between various software and hardware. In this implementation of the present disclosure, the operating system may be an Android system, an iOS system, a Windows operating system, or the like; or may be an embedded operating system such as VxWorks.

The application program 9042 includes any application installed on the terminal 90, and includes but is not limited to a browser, an email, an instant messaging service, text processing, keyboard virtualization, a widget, encryption, digital copyright management, speech recognition, voice replication, positioning (for example, a function provided by the Global Positioning System), and music play.

The output unit 906 includes but is not limited to an image output unit and an audio output unit. The image output unit is configured to output a text, a picture, and/or a video. The image output unit may include a display panel, for example, a display panel configured in a form of an liquid crystal display (LCD), an organic light-emitting diode (OLED), a field emission display (FED), or the like. Alternatively, the image output unit may include a reflective display, for example, an electrophoretic display or a display using an interferometric modulation of light technology. The image output unit may include a single display or a plurality of displays of different sizes. In a specific implementation of the present disclosure, the touch panel used by the input unit 903 may also be used as the display panel of the output unit 906. For example, after detecting a touch operation on the touch panel or a gesture operation near the touch panel, the touch panel transfers information about the operation to the processing unit 901 to determine a type of a touch event, and then, the processing unit 901 provides a corresponding visual output on the display panel based on the type of the touch event. The input unit 903 and the output unit 906 may be used as two independent components to implement input and output functions of the terminal 90. However, in some embodiments, the touch panel and the display panel may be integrated to implement the input and output functions of the terminal 90. For example, the image output unit may display various graphical user interfaces (GUI) as virtual control components, including but not limited to a window, a scrollbar, an icon, and a clipboard, for a user to perform an operation by touching.

The audio output unit includes a digital-to-analog converter, configured to convert, from a digital format into an analog format, an audio signal that is output by the processing unit 901.

The power supply 907 is configured to supply power to different components of the terminal 90 to maintain running of the terminal 90. Based on a general understanding, the power supply 907 may be a built-in battery, such as a common lithium-ion battery or NiMH battery, or may include an external power supply that directly supplies power to the terminal 90, such as an AC adapter. In some implementations of the present disclosure, the power supply 907 may be further defined more extensively. For example, the power supply 907 may further include a power supply management system, a charging system, a power failure detection circuit, a power converter or an inverter, a power status indicator (such as a light emitting diode), and any other components associated with electric energy generation, management, and distribution of the terminal 90.

Specifically, the communications unit 902 is configured to receive broadcast information of another terminal.

The processing unit 901 is configured to: when the first terminal determines that the first terminal is located at an edge of a cell in which the first terminal is currently located, parse the received broadcast information, and determine whether the information carries a temporary identifier; and configured to: when the broadcast information carries the temporary identifier, add the temporary identifier to scheduling request signaling or data to be sent to the base station.

The communications unit 902 is further configured to send, to the base station, the scheduling request signaling or the data to be sent to the base station, so that the base station determines, based on the temporary identifier, an interference degree or a usage degree at a resource location at which the first terminal is located, and performs scheduling for the first terminal based on the interference degree or the usage degree.

In an implementation of this embodiment of the present disclosure, the processing unit 901 is further configured to determine whether a quantity of temporary identifiers is greater than 1; and configured to: when the quantity of temporary identifiers is greater than 1, determine received power for receiving a data packet corresponding to the temporary identifiers; and configured to add, to the scheduling request signaling or the data to be sent to the base station, a temporary identifier carried in the data packet whose receive power is highest.

In another implementation of this embodiment of the present disclosure, the interference degree or the usage degree includes a resource usage parameter sequence. Each parameter in the resource usage parameter sequence is corresponding to one of all resources. The resource usage parameter indicates whether there is interference on a resource corresponding to the resource usage parameter, or an interference degree of a resource corresponding to the resource usage parameter, or whether a resource corresponding to the resource usage parameter is used, or a usage degree of a resource corresponding to the resource usage parameter.

In another implementation of this embodiment of the present disclosure, the communications unit 902 is further configured to: receive interference degrees or usage degrees, at all resource locations, that are sent by the base station by using broadcast information; or receive, by the first terminal, paging signaling sent by the base station, where the paging signaling carries an interference degree or a usage degree of a resource currently used by the first terminal; or receive dedicated signaling sent by the base station, where the dedicated signaling carries a transmission resource re-allocated for the first terminal and/or a transmit power adjustment value.

The processing unit 901 is further configured to adjust a resource location at which the first terminal performs device-to-device D2D data transmission and/or D2D data transmit power based on the broadcast information, the paging signaling, or the dedicated signaling.

In another implementation of this embodiment of the present disclosure, the processing unit 901 is further configured to determine, by the first terminal based on the interference degrees or the usage degrees, a resource without interference or with a lowest interference degree or usage degree; and configured to adjust the resource location of the first terminal to a location of the resource without interference or with the lowest interference degree or usage degree.

In another implementation of this embodiment of the present disclosure, the processing unit 901 is further configured to determine, based on the interference degrees or the usage degrees, that there is interference at a resource location at which the first terminal is currently located; and configured to: when there is interference at the resource location at which the first terminal is currently located, adjust transmit power for sending a data packet by the first terminal; or when there is interference at the resource location at which the first terminal is currently located, detect whether there is an idle resource in a coverage area of the first terminal; and configured to: when there is an idle resource in the coverage area of the first terminal, adjust the resource location of the first terminal to a location of the idle resource.

The communications unit 902 is further configured to send a scheduling request to the base station when there is an idle resource in the coverage area of the first terminal, where the scheduling request carries information about the idle resource; and configured to receive response information sent by the base station, where the response information carries location information of a resource obtained after scheduling is performed for the first terminal and/or information about transmit power for sending a data packet.

In this embodiment of the present disclosure, the terminal 90 adds the temporary identifier to the resource request signaling or the data to be sent to the base station, and reports the resource request signaling or the data to the base station; and the base station determines a corresponding detection terminal based on the temporary identifier, and further determines, based on resource usage information reported by the detection terminal, an interference status of a resource location at which the terminal 90 is located, so that the base station can perform scheduling for the terminal 90 more accurately.

The apparatuses, provided in the embodiments of the present disclosure, for device-to-device inter-cell interference coordination may implement the method embodiments provided in the foregoing. For a specific function implementation, refer to the descriptions in the method embodiments. Details are not described herein again. The methods and apparatuses, provided in the embodiments of the present disclosure, for device-to-device inter-cell interference coordination may be applicable to inter-cell interference coordination performed by a base station, but no limitation is imposed thereto.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), a random access memory (RAM), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for device-to-device inter-cell interference coordination, the method comprising:
   receiving, by a first terminal, configuration information sent by a base station, wherein the configuration information comprises a resource usage detection parameter configured to configure a resource usage detection manner for the first terminal to measure a resource usage level on a device-to-device (D2D) link corresponding to the first terminal, the resource detection parameter further specifying a reporting period;
   detecting, in the reporting period, by the first terminal according to the resource usage detection manner configured by the resource usage detection parameter, resource usage information corresponding to a resource location, wherein the resource location is a resource location at which the first terminal currently performs D2D data transmission, or information about the resource location is carried in the configuration information; and
   reporting, by the first terminal the resource usage information to the base station for enabling the base station to adjust, based on the resource usage information, a D2D data transmission mode for the first terminal or a second terminal using the resource location,
   wherein before receiving, by the first terminal, configuration information sent by the base station, the method further comprises:
   determining, by the first terminal based on a parameter of a preset condition, whether the first terminal is eligible to become a detection terminal, wherein the parameter of the preset condition is sent by the base station by using broadcast information, or the parameter of the preset condition is preset by the first terminal.

2. The method according to claim 1, wherein the preset condition comprises a first preset condition that comprises a condition for determining that the first terminal is located at an edge of a cell in which the first terminal is currently located, and a parameter of the first preset condition comprises a signal power threshold used by the first terminal to receive a signal of the base station.

3. The method according to claim 2, wherein determining, by the first terminal based on a parameter of the preset condition, whether the first terminal is eligible to become a detection terminal comprises:
   determining, by the first terminal based on the signal power threshold, whether the first terminal is located at the edge of the cell in which the first terminal is currently located; and
   when the first terminal is located at the edge of the cell in which the first terminal is currently located, determining, by the first terminal, that the first terminal becomes a detection terminal.

4. A method for device-to-device inter-cell interference coordination, the method comprising:
   transmitting, by a base station, configuration information to a first terminal, wherein the configuration information comprises a resource usage detection parameter configured to configure a resource usage detection manner for the first terminal to measure a resource usage level on a device-to-device (D2D) link corresponding to the first terminal, the resource detection parameter further specifying a reporting period;
   receiving, by the base station, resource usage information corresponding to a resource location reported by a first terminal, wherein the resource location is a resource location at which the first terminal currently performs device-to-device (D2D) data transmission, and the resource usage information is sent after the first terminal becomes a detection terminal;
   determining, by the base station, an interference degree or a usage degree at the resource location based on the resource usage information; and
   re-allocating, by the base station, a D2D data transmission resource and/or adjusting D2D data transmit power, based on the interference degree or the usage degree, for the first terminal or a second terminal using the resource location for data transmission,
   wherein before sending, by the base station, the configuration information to the first terminal, the method further comprises:
   sending, by the base station, broadcast information to the first terminal, wherein the broadcast information comprises a parameter of a preset condition for becoming the detection terminal and for enabling the first terminal to determine, based on the preset condition, whether the first terminal becomes the detection terminal; and
   the parameter of the preset condition comprises at least one of the following:
   a signal power threshold used by the first terminal to receive a signal of the base station,
   a resource list in which there is an orthogonal relationship between a resource frequency of a resource of a neighboring base station and a resource frequency of the base station, wherein the neighboring base station is corresponding to a neighboring cell of a cell corresponding to the base station, or
   a preset threshold and a relationship between a random number and the preset threshold, wherein the random number is one of items generated by the first terminal.

5. The method according to claim 4, wherein before receiving, by the base station, resource usage information, corresponding to a resource location reported by a first terminal, the method further comprises:

sending, by the base station, the configuration information to the first terminal, wherein the configuration information comprises a resource usage detection parameter, the first terminal is configured to measure a resource usage level on a D2D link corresponding to the first terminal, and the resource usage detection parameter facilitates a configuration of a resource usage detection manner for the first terminal.

6. The method according to claim 4, wherein before receiving, by the base station, resource usage information, corresponding to the resource location reported by the first terminal, the method further comprises:
receiving, by the base station, request information sent by the first terminal, wherein the request information is configured to request the base station to allow the first terminal to be the detection terminal;
determining, by the base station, whether to allow the first terminal to be the detection terminal; and
when determining to allow the first terminal to be the detection terminal, sending, by the base station to the first terminal, an instruction for allowing the first terminal to be the detection terminal.

7. A first terminal for device-to-device inter-cell interference coordination, the first terminal comprising:
a receiver, configured to: receive configuration information sent by a base station, wherein the configuration information comprises a resource usage detection parameter configured to configure a resource usage detection manner for the first terminal to measure a resource usage level on a device-to-device (D2D) link corresponding to the first terminal, the resource detection parameter further specifying a reporting period;
a processor, configured to detect, in the reporting period, according to the resource usage detection manner configured by the resource usage information corresponding to a resource location, wherein the resource location is a resource location at which the first terminal currently performs D2D data transmission, or information about the resource location is carried in the configuration information; and
a transmitter, configured to report, the resource usage information to the base station for enabling the base station to adjust, based on the resource usage information, a D2D data transmission mode for the first terminal or a second terminal using the resource location,
wherein the processor is further configured to:
determine, based on a parameter of a preset condition, whether the first terminal is eligible to become a detection terminal, wherein the parameter of the preset condition is sent by the base station by using broadcast information, or the parameter of the preset condition is preset by the first terminal.

8. The first terminal according to claim 7, wherein the preset condition comprises a first preset condition that comprises a condition for determining that the first terminal is located at an edge of a cell in which the first terminal is currently located, and a parameter of the first preset condition comprises a signal power threshold used by the first terminal to receive a signal of the base station.

9. The first terminal according to claim 8, wherein the processor is configured to:
determine, based on the signal power threshold, whether the first terminal is located at the edge of the cell in which the first terminal is currently located; and
when the first terminal is located at the edge of the cell in which the first terminal is currently located, determine that the first terminal becomes the detection terminal.

10. A base station for device-to-device inter-cell interference coordination, the base station comprising:
an interface circuit; and
a processor coupled to the interface circuit and configured to:
transmit configuration information to a first terminal, wherein the configuration information comprises a resource usage detection parameter configured to configure a resource usage detection manner for the first terminal to measure a resource usage level on a device-to-device (D2D) link corresponding to the first terminal, the resource detection parameter further specifying a reporting period;
receive, by using the interface circuit, resource usage information, corresponding to a resource location, reported by a first terminal, wherein the resource location is a resource location at which the first terminal currently performs device-to-device (D2D) data transmission, and the resource usage information is sent after the first terminal becomes a detection terminal during a reporting period,
determine an interference degree or a usage degree at the resource location based on the resource usage information, and
re-allocate a D2D data transmission resource and/or adjust D2D data transmit power, based on the interference degree or the usage degree, for the first terminal or a second terminal using the resource location for data transmission,
wherein the processor is further configured to:
send broadcast information to the first terminal by using the interface circuit, wherein the broadcast information comprises a parameter of a preset condition for becoming the detection terminal and for enabling the first terminal to determine, based on the preset condition, whether the first terminal becomes the detection terminal, and wherein the parameter of the preset condition comprises at least one of the following:
a signal power threshold used by the first terminal to receive a signal of the base station;
a resource list in which there is an orthogonal relationship between a resource frequency of a resource of a neighboring base station and a resource frequency of the base station, wherein the neighboring base station is corresponding to a neighboring cell of a cell corresponding to the base station; or
a preset threshold and a relationship between a random number and the preset threshold, wherein the random number is one of items generated by the first terminal.

11. The base station according to claim 10, wherein the processor is further configured to:
send the configuration information to the first terminal by using the interface circuit, wherein the configuration information comprises a resource usage detection parameter, the detection terminal is configured to measure a resource usage level on a D2D link corresponding to the detection terminal, and the resource usage detection parameter facilitates a configuration of a resource usage detection manner for the first terminal.

12. The base station according to claim 10, wherein the processor is further configured to:
receive, by using the interface circuit, request information sent by the first terminal, wherein the request information is used to request the base station to allow the first terminal to be the detection terminal;
determine whether the first terminal is allowed to be the detection terminal; and when it is determined that the first terminal is allowed to be the detection terminal, send, to the first terminal by using the interface circuit, an instruction for allowing the first terminal to be the detection terminal.

\* \* \* \* \*